United States Patent
Asada et al.

(10) Patent No.: US 12,437,563 B2
(45) Date of Patent: Oct. 7, 2025

(54) ANALYSIS METHOD AND ANALYZER

(71) Applicant: SYSMEX CORPORATION, Kobe (JP)

(72) Inventors: Shoichiro Asada, Kobe (JP); Konobu Kimura, Kobe (JP); Masamichi Tanaka, Kobe (JP); Kenichiro Suzuki, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 591 days.

(21) Appl. No.: 17/691,793

(22) Filed: Mar. 10, 2022

(65) Prior Publication Data

US 2022/0292855 A1    Sep. 15, 2022

(30) Foreign Application Priority Data

Mar. 12, 2021 (JP) ................. 2021-040829
Mar. 12, 2021 (JP) ................. 2021-040830
Mar. 12, 2021 (JP) ................. 2021-040831

(51) Int. Cl.
*G06V 20/69* (2022.01)
*G01N 15/1404* (2024.01)
(Continued)

(52) U.S. Cl.
CPC ....... *G06V 20/698* (2022.01); *G01N 15/1404* (2013.01); *G01N 15/1429* (2013.01);
(Continued)

(58) Field of Classification Search
None
See application file for complete search history.

(56) References Cited

U.S. PATENT DOCUMENTS 11,098,275 B2 * 8/2021 Ota .................... G06V 20/698
2014/0273068 A1 * 9/2014 Wanders ............. G01N 15/147
435/29
(Continued)

FOREIGN PATENT DOCUMENTS

JP    H9-259027 A    10/1997
JP    2004-112580 A    4/2004
(Continued)

OTHER PUBLICATIONS

Japanese Office Action issued on Sep. 10, 2024 in corresponding Japanese patent application No. 2021-040829 (10 pages).
(Continued)

*Primary Examiner* — Tsung Yin Tsai
(74) *Attorney, Agent, or Firm* — Crowell & Moring LLP

(57) ABSTRACT

Disclosed is an analysis method for a specimen using an analyzer connected to a host computer, the analysis method including: obtaining, with respect to each of a plurality of cells contained in the specimen, feature data of the cell; generating classification information in which each of the cells is classified into a plurality of cell types, by analyzing the feature data with use of an artificial intelligence algorithm and performing classifying; generating a measurement result of the specimen on the basis of the classification information; displaying, on a display part of the analyzer, the measurement result and at least a part of the classification information; and transmitting, to the host computer, output data that includes the measurement result and in which at least a part of the classification information has been removed.

22 Claims, 71 Drawing Sheets

(51) Int. Cl.

| | | |
|---|---|---|
| *G01N 15/1429* | (2024.01) | |
| *G01N 15/1434* | (2024.01) | |
| *G01N 33/49* | (2006.01) | |
| *G01N 35/00* | (2006.01) | |
| *G06N 3/08* | (2023.01) | |
| *G06T 7/00* | (2017.01) | |

(52) U.S. Cl.
CPC ......... *G01N 15/1434* (2013.01); *G01N 33/49* (2013.01); *G01N 33/4915* (2013.01); *G01N 35/00871* (2013.01); *G06N 3/08* (2013.01); *G06T 7/0012* (2013.01); *G01N 2035/00891* (2013.01); *G06T 2207/30024* (2013.01); *G06T 2207/30242* (2013.01)

(56) References Cited

U.S. PATENT DOCUMENTS

| | | | |
|---|---|---|---|
| 2016/0061711 A1 | 3/2016 | Deka | |
| 2018/0089496 A1* | 3/2018 | Molin | G06V 20/698 |
| 2019/0347467 A1* | 11/2019 | Ohsaka | G06N 3/08 |
| 2020/0072727 A1* | 3/2020 | Lin | G06V 20/698 |
| 2020/0096515 A1* | 3/2020 | Nagai | G01N 35/02 |
| 2020/0105376 A1 | 4/2020 | Lai et al. | |
| 2020/0340909 A1 | 10/2020 | Ohsaka et al. | |
| 2021/0071256 A1* | 3/2021 | Quigley | G06N 3/08 |
| 2022/0292855 A1* | 9/2022 | Asada | G01N 33/49 |

FOREIGN PATENT DOCUMENTS

| | | | | |
|---|---|---|---|---|
| JP | 2006-275707 A | 10/2006 | | |
| JP | 2012-233710 A | 11/2012 | | |
| JP | 2014-219420 A | 11/2014 | | |
| JP | 2016-514267 A | 5/2016 | | |
| JP | 2017-53799 A | 3/2017 | | |
| JP | 2018-100976 A | 6/2018 | | |
| JP | 2018-169317 A | 11/2018 | | |
| JP | 2020-522697 A | 7/2020 | | |
| JP | 2020-153946 A | 9/2020 | | |
| WO | 2020/196074 A1 | 10/2020 | | |
| WO | WO-2021022050 A1 * | 2/2021 | ........ | B01L 3/502715 |

OTHER PUBLICATIONS

Japanese Office Action issued on Sep. 10, 2024 in corresponding Japanese patent application No. 2021-040830 (10 pages).
Japanese Office Action issued on Sep. 10, 2024 in corresponding Japanese patent application No. 2021-040831 (8 pages).
Extended European search report, issued on Aug. 23, 2022, pp. 1-8, European patent application No. 22159682.8, European Patent Office, The Hague.
Extended European search report, issued on Aug. 23, 2022, pp. 1-8, in European patent application No. 22159681.0, European Patent Office, The Hague.
European search report, issued on Aug. 23, 2022, pp. 1-8 in European patent application No. 22159680.2, European Patent Office, The Hague.
Communication pursuant to Article 94(3) EPC issued on Aug. 27, 2024 in corresponding European patent application No. 22159682.8 (6 pages).
Communication pursuant to Article 94(3) EPC issued on Aug. 27, 2024 in corresponding European patent application No. 22159681.0 (6 pages).
Communication pursuant to Article 94(3) EPC issued on Aug. 27, 2024 in corresponding European patent application No. 22159680.2 (5 pages).
Office Action issued in U.S. Appl. No. 17/691,761 dated Aug. 25, 2025, (25 pages).

* cited by examiner

FIG. 8

| CELL TYPE | LABEL VALUE |
|---|---|
| NOT APPLICABLE (NONE) | 0 |
| NEUTROPHIL (NEUT) | 1 |
| LYMPHOCYTE (LYMPH) | 2 |
| MONOCYTE (MONO) | 3 |
| EOSINOPHIL (EO) | 4 |
| BASOPHIL (BASO) | 5 |
| IMMATURE GRANULOCYTE (IG) | 6 |
| BLAST (Blast) | 7 |
| ABNORMAL LYMPHOCYTE (Abn LYMPH) | 8 |

FIRST EXAMPLE OF TEST RESULT DISPLAYING PROCESS
(CELL EXTRACTION BASED ON FEATURE PARAMETER/INDIVIDUAL DISPLAY)

THIRD EXAMPLE OF TEST RESULT DISPLAYING PROCESS
(CELL EXTRACTION BASED ON FEATURE PARAMETER/STATISTIC DISPLAY)

FOURTH EXAMPLE OF TEST RESULT DISPLAYING PROCESS
(CELL EXTRACTION BASD ON EXTRACTION CONDITION/GRAPH DISPLAY)

FIFTH EXAMPLE OF TEST RESULT DISPLAYING PROCESS
(CELL EXTRACTION BASED ON RESEARCH INFORMATION/GRAPH DISPLAY)

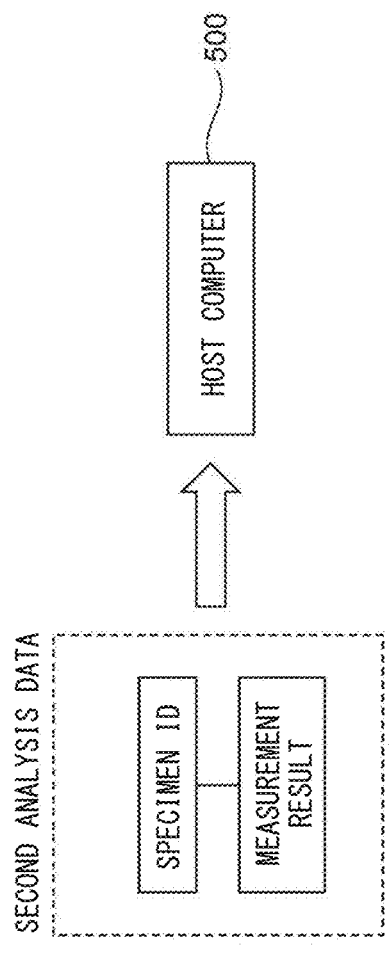
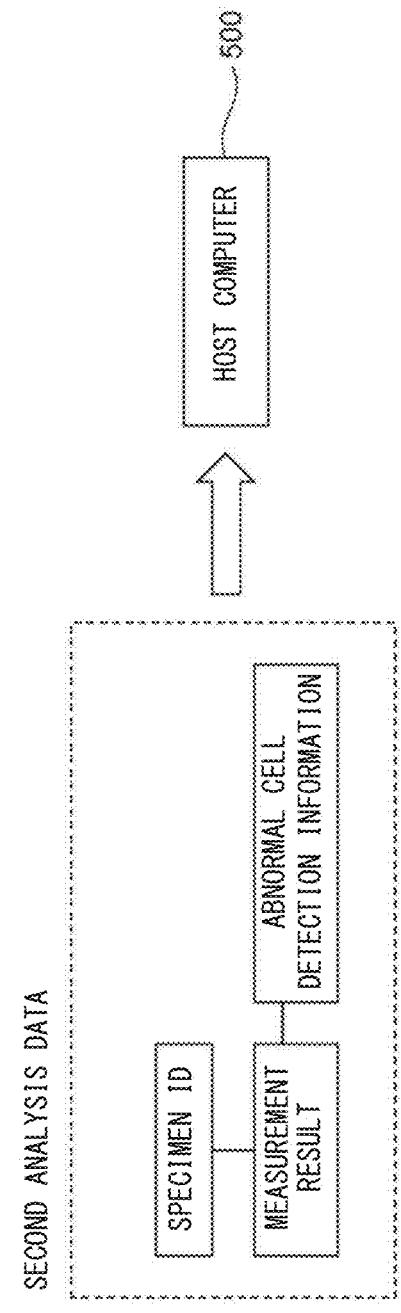

FIG. 46A

PLEASE SELECT CELL TYPE OF WHICH INFORMATION IS TO BE TRANSMITTED TO HOST COMPUTER.

☐ NEUTROPHIL
☐ LYMPHOCYTE
☐ MONOCYTE
☐ EOSINOPHIL
☐ BASOPHIL
☐ IMMATURE GRANULOCYTE
☐ BLAST
...

PLEASE SELECT CELL TYPE RANGE FOR WHICH INFORMATION IS TO BE TRANSMITTED TO HOST COMPUTER.

☐ MAIN CELL TYPE ONLY
☐ MINOR CELL TYPES OTHER THAN MAIN CELL TYPE
☐ ALL CELL TYPES
☐ DO NOT TRANSMIT

[ OK ] — 962

961

FIG. 53A CALCULATION OF PRODUCT OF MATRIX $$C_{ij} = \sum_{k=1}^{n} a_{ik} \times b_{kj}$$

```
for(int i=0; i<n; i++){
  for(int j=0; j<n; j++){
    for(int k=0; k<n; k++){
      c[i][j] += a[i][k]*b[k][j]
    }
  }
}
```

FIG. 53B CALCULATION PROCESS BY PARALLEL-PROCESSING PROCESSOR

```
for(int k=0; k<n; k++){
  c[0][0] += a[0][k]*b[k][0]
}
```

```
for(int k=0; k<n; k++){
  c[0][1] += a[0][k]*b[k][1]
}
```

```
for(int k=0; k<n; k++){
  c[1][0] += a[1][k]*b[k][0]
}
```

```
for(int k=0; k<n; k++){
  c[1][1] += a[1][k]*b[k][1]
}
```

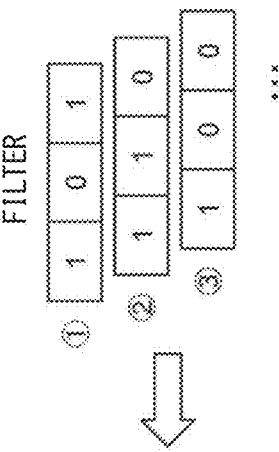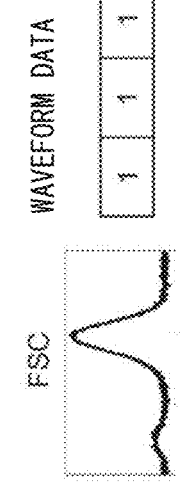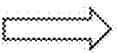
FIG. 55A
FIG. 55B

ANALYSIS METHOD AND ANALYZER

RELATED APPLICATIONS

This application claims priority to Japanese Patent Application No. 2021-040831, filed on Mar. 12, 2021, No. 2021-040830, filed on Mar. 12, 2021, and No. 2021-040829, filed on Mar. 12, 2021, the entire contents of which are incorporated herein by reference.

BACKGROUND OF THE INVENTION

1. Field of the Invention

The present invention relates to an analysis method and an analyzer for analyzing cells in a specimen.

2. Description of the Related Art

Japanese Laid-open Patent Publication No. 2016-514267 (translation of PCT International Application) describes a method for classifying white blood cells into subpopulations by using parameters based on fluorescence and light scattering obtained by causing blood cells to flow in a flow cell. In this method, white blood cell subpopulations are classified on the basis of a plurality of parameters including axial light loss (ALL), intermediate angle scatters (IAS), fluorescence (FL1), and depolarized side scatter (PSS), which are generated as a result of applying light to each blood cell flowing in the flow cell. The classified white blood cell subpopulations are displayed on a scattergram.

SUMMARY OF THE INVENTION

The scope of the present invention is defined solely by the appended claims, and is not affected to any degree by the statements within this summary.

In such a conventional cell classification method as disclosed in Japanese Laid-open Patent Publication No. 2016-514267 (translation of PCT International Application), one cell is alternatively classified into one classification. However, for example, neutrophils that are the same in terms of type may have different morphological features due to the difference in maturity, and thus may include some neutrophils that have morphological features similar to those of immature granulocytes. In the conventional cell classification method, even when a cell that has a feature of a normal cell such as a neutrophil and a feature of an abnormal cell such as an immature granulocyte is included, such a cell is alternatively classified into one type, which does not lead to more detailed analysis in some cases. In addition, when the amount of information to be provided to a user in order to enable detailed analysis when compared with a conventional method is increased, it is also necessary to cope with a problem of increase in the volume of data.

An analysis method of the present invention is for a specimen using an analyzer connected to a host computer. The analysis method includes: obtaining, with respect to each of a plurality of cells contained in the specimen, feature data of the cell; generating classification information in which each of the cells is classified into a plurality of cell types, by analyzing the feature data with use of an artificial intelligence algorithm and performing classifying; generating a measurement result of the specimen on the basis of the classification information; displaying, on a display part of the analyzer, the measurement result and at least a part of the classification information; and transmitting, to the host computer, output data that includes the measurement result and in which at least a part of the classification information has been removed.

An analyzer of the present invention includes: a measurement unit configured to, with respect to each of a plurality of cells contained in a specimen, obtain feature data of the cell; a processor configured to generate classification information in which each of the cells is classified into a plurality of cell types, by analyzing the feature data with use of an artificial intelligence algorithm and performing classifying, the processor being configured to generate a measurement result of a specimen on the basis of the classification information; and a display part configured to display the measurement result and at least a part of the classification information. The processor transmits, to a host computer connected to the analyzer, output data that includes the measurement result and in which at least a part of the classification information has been removed.

According to the present invention, information that leads to detailed analysis of a specimen containing a cell that has features of a plurality of cell types can be provided while increase in the data communication load to the host computer is avoided.

BRIEF DESCRIPTION OF THE DRAWINGS

FIG. 8 shows cell types to be analyzed by the deep learning algorithm.

FIG. 45A shows an example of the structure of output data;

FIG. 45B shows an example of the structure of output data;

FIG. 46A shows an example of a screen for receiving settings regarding output data;

FIG. 46B shows an example of the screen for receiving settings regarding output data;

FIG. 53A shows an outline of a matrix operation executed by the parallel-processing processor;

FIG. 53B shows an outline of a matrix operation executed by the parallel-processing processor;

FIG. 55A shows an outline of an arithmetic process regarding a convolution layer;

FIG. 55B shows an outline of an arithmetic process regarding a convolution layer;

DETAILED DESCRIPTION OF THE PREFERRED EMBODIMENTS

Figure 1:
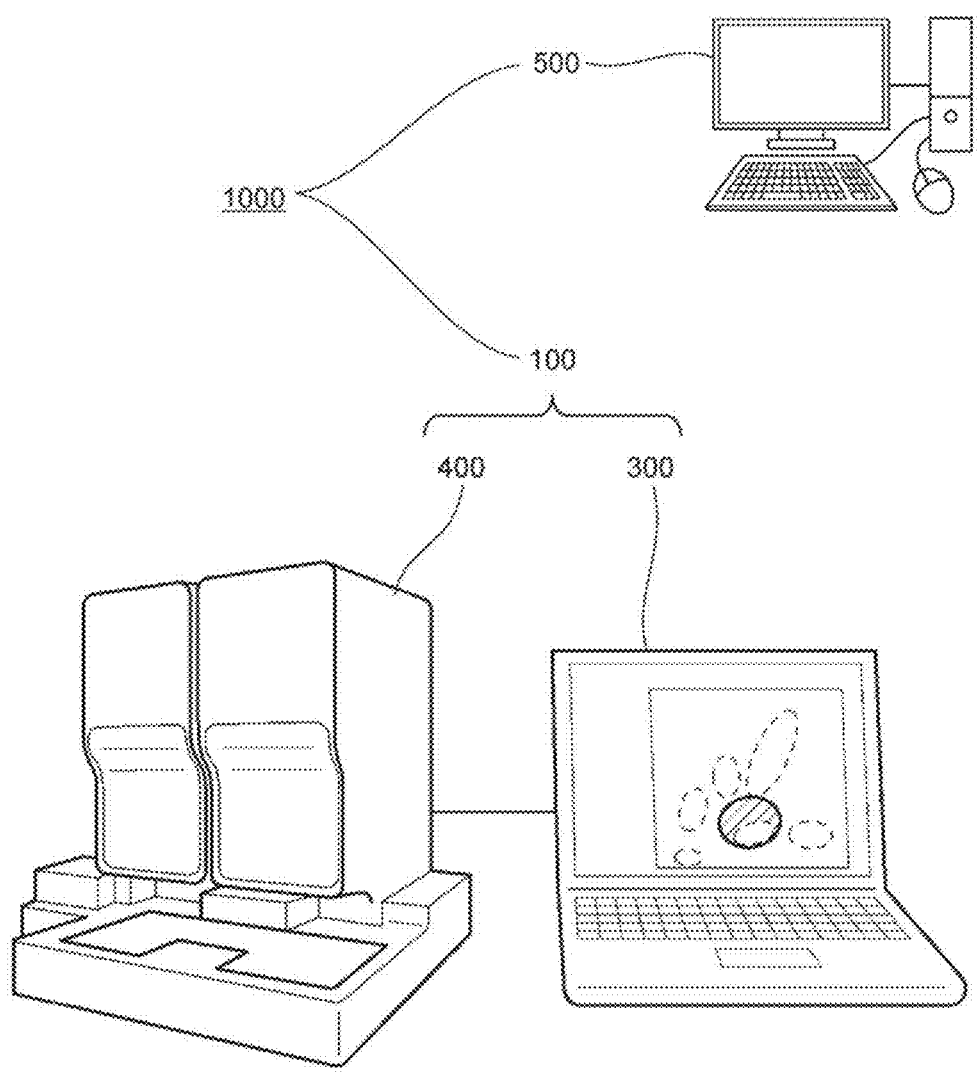
FIG. 1 shows a cell analyzer and a host computer.

Hereinafter, the outline and an embodiment of the present invention will be described in detail with reference to the accompanying drawings. In the following description and drawings, the same reference character denotes the same or similar components, and description regarding the same or similar components is omitted.

An analysis method described below is a method in which with respect to each of a plurality of cells contained in a specimen, feature data of the cell is obtained; and classification information in which each of the cells is classified into a plurality of cell types, by analyzing feature data with use of an artificial intelligence algorithm and performing classification, is generated.

The specimen may be a biological sample collected from a subject. For example, the biological sample can include peripheral blood such as venous blood or arterial blood, urine, and body fluid other than blood and urine. The body fluid other than blood and urine can include bone marrow fluid, ascites, pleural fluid, cerebrospinal fluid, and the like. Hereinafter, body fluid other than blood and urine may be simply referred to as "body fluid". A blood sample is a sample of which the number of cells can be counted and the cell types of the cells can be determined, i.e., a sample in a state of containing cells. Preferably, the blood sample is whole blood. Blood is preferably peripheral blood. An example of blood includes peripheral blood collected by using an anticoagulant agent such as ethylenediaminetetraacetate (sodium salt or potassium salt), heparin sodium, or the like. Peripheral blood may be collected from an artery or may be collected from a vein.

Cell types that are classified according to this analysis method are based on cell types according to morphological classification, and are different in accordance with the type of the biological sample. When the biological sample is blood and when the blood has been collected from a healthy individual, cell types to be determined in the present embodiment include red blood cell, nucleated cell such as white blood cell, platelet, and the like, for example. Nucleated cell includes neutrophil, lymphocyte, monocyte, eosinophil, and basophil, for example. Neutrophil includes segmented neutrophil and band neutrophil, for example.

When blood has been collected from a non-healthy individual, nucleated cell includes abnormal cell.

Abnormal cells mean cells that are not usually observed in peripheral blood of a healthy individual. Abnormal cells may include lymphocytic abnormal cells. Lymphocytic abnormal cells may include atypical lymphocytes (reactive lymphocytes), abnormal lymphocytes including mature lymphoma, and plasma cells, for example. Abnormal cells may include blasts. Blasts include myeloblasts, lymphoblasts, proerythroblasts, basophilic erythroblasts, polychromatic erythroblasts, orthochromatic erythroblasts, promegaloblasts, basophilic megaloblasts, polychromatic megaloblasts, orthochromatic megaloblasts, and the like. Abnormal cells may include megakaryocytes. Abnormal cells may include immature granulocytes. Immature granulocytes include promyelocytes, myelocytes, metamyelocyte, and the like, for example.

Abnormal cells may include other abnormal cells that are not contained in peripheral blood of a healthy individual. Examples of abnormal cells are cells that appear when a person has a disease, and are tumor cells, for example. In the case of the hematopoietic system, examples of diseases are: myelodysplastic syndrome; leukemia such as acute myeloblastic leukemia, acute promyelocytic leukemia, acute myelomonocytic leukemia, acute monocytic leukemia, erythroleukemia, acute megakaryoblastic leukemia, acute myeloid leukemia, acute lymphoblastic leukemia, lymphoblastic leukemia, chronic myelogenous leukemia, chronic lymphocytic leukemia, or the like; malignant lymphoma such as Hodgkin's lymphoma, non-Hodgkin's lymphoma, or the like; or multiple myeloma.

When the biological sample is urine, cell types include, for example, red blood cell, white blood cell, epithelial cell of transitional epithelium, squamous epithelium, etc., and the like. Abnormal cells can include, for example, bacteria, fungi such as filamentous fungi and yeast, tumor cells, and the like.

When the biological sample is body fluid that usually does not contain blood components, such as ascites, pleural fluid, or spinal fluid, cell types can include red blood cell, white blood cell, and large cell, for example. The "large cell" here means a cell that is separated from an inner membrane of a body cavity or a peritoneum of a viscus, and that is larger than white blood cells. For example, mesothelial cells, histiocytes, tumor cells, and the like correspond to the "large cell".

When the biological sample is bone marrow fluid, cell types can include, as normal cells, mature blood cell and immature hematopoietic cell. The mature blood cells include, for example, red blood cells, nucleated cells such as white blood cells, platelets, and the like. Nucleated cells such as white blood cells include, for example, neutrophils, lymphocytes, plasma cells, monocytes, eosinophils, and basophils. Neutrophils include segmented neutrophils and band neutrophils, for example. Immature hematopoietic cells include, for example, hematopoietic stem cells, immature granulocytic cells, immature lymphoid cells, immature monocytic cells, immature erythroid cells, megakaryocytic cells, mesenchymal cells, and the like. Immature granulocytes can include, for example, cells such as metamyelocytes, myelocytes, promyelocytes, and myeloblasts. Immature lymphoid cells include, for example, lymphoblasts and the like. Immature monocytic cells include monoblasts and the like. Immature erythroid cells include, for example, nucleated erythrocytes such as proerythroblasts, basophilic erythroblasts, polychromatic erythroblasts, orthochromatic erythroblasts, promegaloblasts, basophilic megaloblasts, polychromatic megaloblasts, and orthochromatic megaloblasts. Megakaryocytic cells include, for example, megakaryoblasts, and the like.

Examples of abnormal cells that can be contained in bone marrow include hematopoietic tumor cells of: myelodysplastic syndrome; leukemia such as acute myeloblastic leukemia, acute promyelocytic leukemia, acute myelomonocytic leukemia, acute monocytic leukemia, erythroleukemia, acute megakaryoblastic leukemia, acute myeloid leukemia, acute lymphoblastic leukemia, lymphoblastic leukemia, chronic myelogenous leukemia, or chronic lymphocytic leukemia; malignant lymphoma such as Hodgkin's lymphoma or non-Hodgkin's lymphoma; or multiple myeloma, which have been described above, and metastasized tumor cells of a malignant tumor developed in an organ other than bone marrow.

This analysis method is suitably performed by using a cell analyzer which analyzes a specimen containing cells. The cell analyzer may include a measurement unit which obtains, with respect to each of a plurality of cells contained in the specimen, feature data of the cell; and a controller which analyzes the feature data with use of an artificial intelligence algorithm, thereby classifying each of the cells into a plurality of cell types. An example of such a cell analyzer will be described below.

1. Basic Configuration

With reference to FIG. 1, a basic configuration of a cell analyzer is described. FIG. 1 is a schematic diagram showing an appearance of a cell analyzer 100. The cell analyzer 100 is an apparatus that analyzes a specimen derived from an organism in accordance with a test order transmitted from a host computer 500. The cell analyzer 100 includes a measurement unit 400 and a processing unit 300. The host computer 500 and the cell analyzer 100 are collectively referred to as a test system 1000.

2. Configuration of Measurement Unit

Figure 2:
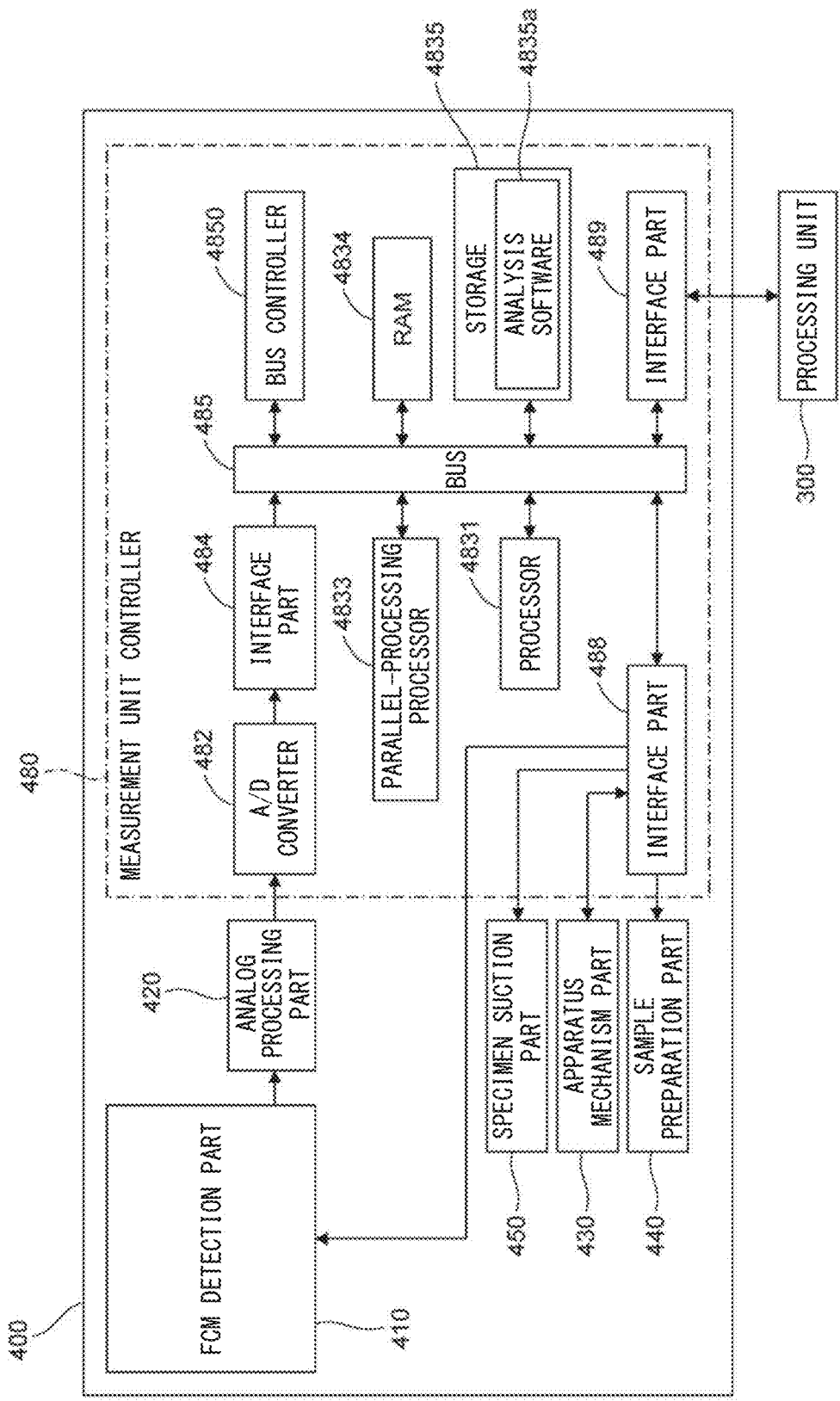
FIG. 2 is a block diagram of a measurement unit.

With reference to FIG. 2, a configuration of the measurement unit 400 is described. FIG. 2 shows an example of a block diagram of the measurement unit 400. As shown in FIG. 2, the measurement unit 400 includes: a specimen suction part 450 which suctions a specimen; a sample preparation part 440 which prepares a measurement sample from the suctioned specimen; an FCM detection part 410 which detects each blood cell in the measurement sample; an analog processing part 420 which processes an analog signal outputted from the FCM detection part 410; a measurement unit controller 480 which converts the signal processed by the analog processing part 420 into a digital signal and analyzes the digital signal; and an apparatus mechanism part 430.

Figure 3:
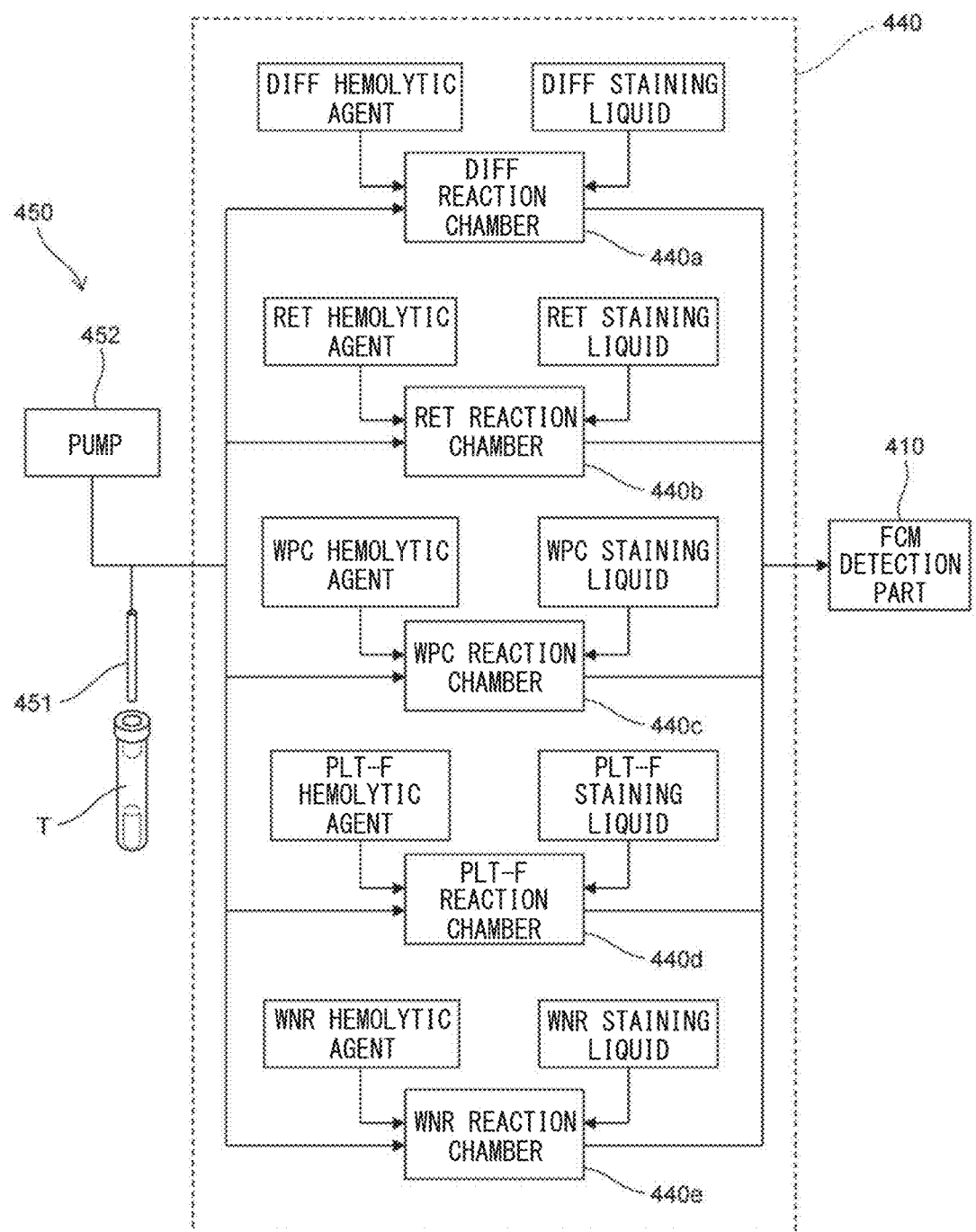
FIG. 3 is a block diagram of a sample preparation part.

FIG. 3 is a schematic diagram for describing the specimen suction part 450 and the sample preparation part 440. The specimen suction part 450 includes a nozzle 451 for suctioning a blood specimen from a blood collection tube T; and a pump 452 for providing a negative pressure/positive pressure to the nozzle 451. The nozzle 451 is moved in upwardly and downwardly by the apparatus mechanism part 430, to be inserted into the blood collection tube T. When the pump 452 provides a negative pressure in a state where the nozzle 451 is inserted in the blood collection tube T, the blood specimen is suctioned via the nozzle 451.

The sample preparation part 440 includes five reaction chambers 440a to 440e. The reaction chambers 440a to 440e are used in measurement channels of DIFF, RET, WPC, PLT-F, and WNR, respectively. Each reaction chamber has connected thereto, via flow paths, a hemolytic agent container containing a hemolytic agent and a staining liquid container containing a staining liquid, which serve as reagents for the corresponding measurement channel. One reaction chamber and reagents (a hemolytic agent and a staining liquid) connected thereto form a measurement channel. For example, the DIFF measurement channel is configured by a DIFF hemolytic agent and a DIFF staining liquid which serve as DIFF measurement reagents; and the reaction chamber 440*a*. The other measurement channels are configured in similar manners. Here, an example of a configuration in which one measurement channel includes one hemolytic agent and one staining liquid is shown. However, one measurement channel may not necessarily include both of a hemolytic agent and a staining liquid, and a plurality of measurement channels may share one reagent.

Through horizontal and up-down movement by the apparatus mechanism part 430, the nozzle 451 having suctioned a blood specimen accesses, from above, a reaction chamber, among the reaction chambers 440*a* to 440*e*, that corresponds to a measurement channel that corresponds to an order, and the nozzle 451 discharges the suctioned blood specimen. The sample preparation part 440 supplies a corresponding hemolytic agent and a corresponding staining liquid to the reaction chamber having the blood specimen discharged therein, to mix the blood specimen, the hemolytic agent, and the staining liquid in the reaction chamber, thereby preparing a measurement sample. The prepared measurement sample is supplied from the reaction chamber to the FCM detection part 410 via a flow path, to be subjected to measurement of cells according to flow cytometry.

Figure 4:
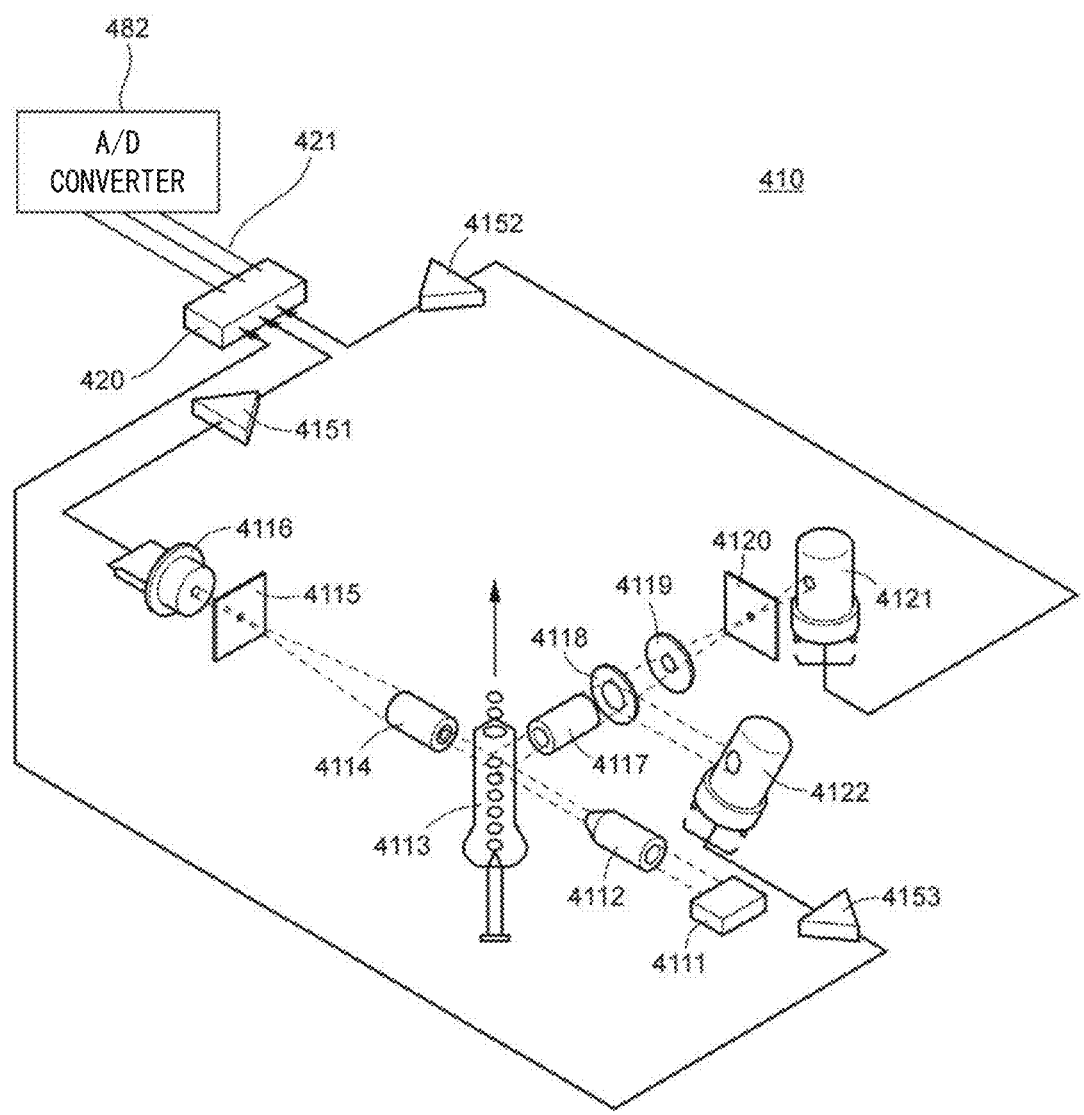
FIG. 4 is a schematic diagram of an FCM detection part.

FIG. 4 shows a configuration example of an optical system of the FCM detection part 410. As shown in FIG. 4, in measurement performed by a flow cytometer, when each cell contained in a measurement sample passes through a flow cell (sheath flow cell) 4113 provided in the flow cytometer, a light source 4111 applies light to a flow cell 4113, and scattered light and fluorescence emitted from the cell in the flow cell 4113 due to this light are detected by light-receiving elements 4116, 4121, 4122.

In FIG. 4, light emitted from a laser diode being the light source 4111 is applied via a light application lens system 4112 to each cell passing through the flow cell 4113.

As shown in FIG. 4, forward scattered light emitted from a particle passing through the flow cell 4113 is received by the light-receiving element 4116 via a condenser lens 4114 and a pin hole part 4115. The light-receiving element 4116 is a photodiode, for example. Side scattered light is received by a light-receiving element 4121 via a condenser lens 4117, a dichroic mirror 4118, a bandpass filter 4119, and a pin hole part 4120. The light-receiving element 4121 is a photomultiplier, for example. Side fluorescence is received by a light-receiving element 4122 via the condenser lens 4117 and the dichroic mirror 4118. The light-receiving element 4122 is a photomultiplier, for example. As the light-receiving element 4116, an avalanche photodiode or a photomultiplier may be used, instead of a photodiode. As the light-receiving element 4121 and the light-receiving element 4122, a photodiode or an avalanche photodiode may be used.

Reception light signals outputted from the respective light-receiving elements 4116, 4121, 4122 are inputted to the analog processing part 420 via amplifiers 4151, 4152, 4153, respectively. The analog processing part 420 is connected via signal transmission paths 421 to an A/D converter 482 of the measurement unit controller 480 described later.

With reference back to FIG. 2, the analog processing part 420 performs processes such as noise removal and smoothing onto each analog signal inputted from the FCM detection part 410, and outputs the processed analog signal to the measurement unit controller 480.

The measurement unit controller 480 includes the A/D converter 482, a processor 4831, a RAM 4834, a storage 4835, a bus controller 4850, a parallel-processing processor 4833, a bus 485, and an interface part 489 connected to the processing unit 300. The measurement unit controller 480 includes an interface part 484 provided between the bus 485 and the A/D converter 482. The measurement unit controller 480 further includes an interface part 488 provided between various types of hardware (i.e., the specimen suction part 450, the apparatus mechanism part 430, the sample preparation part 440, the FCM detection part 410) and the bus 485.

The A/D converter 482 samples the analog signal outputted from the analog processing part 420 at a predetermined sampling rate (e.g., sampling at 1024 points at a 10 nanosecond interval, sampling at 128 points at an 80 nanosecond interval, sampling at 64 points at a 160 nanosecond interval, or the like), and converts the analog signal into a digital signal. The A/D converter 482 converts the analog signal that is from the measurement start of the specimen to the measurement end, into a digital signal. When a plurality of types of analog signals (e.g., analog signals respectively corresponding to forward scattered light intensity, side scattered light intensity, and fluorescence intensity) are generated through measurement in a certain measurement channel, the A/D converter 482 converts each analog signal that is from the measurement start to the measurement end, into a digital signal. As described with reference to FIG. 4, three types of analog signals (i.e., forward scattered light signal, side scattered light signal, and fluorescence signal) are inputted via a plurality of corresponding signal transmission paths 421 to the A/D converter 482. The A/D converter 482 converts each of the analog signals inputted from the plurality of signal transmission paths 421, into a digital signal.

Figure 5:
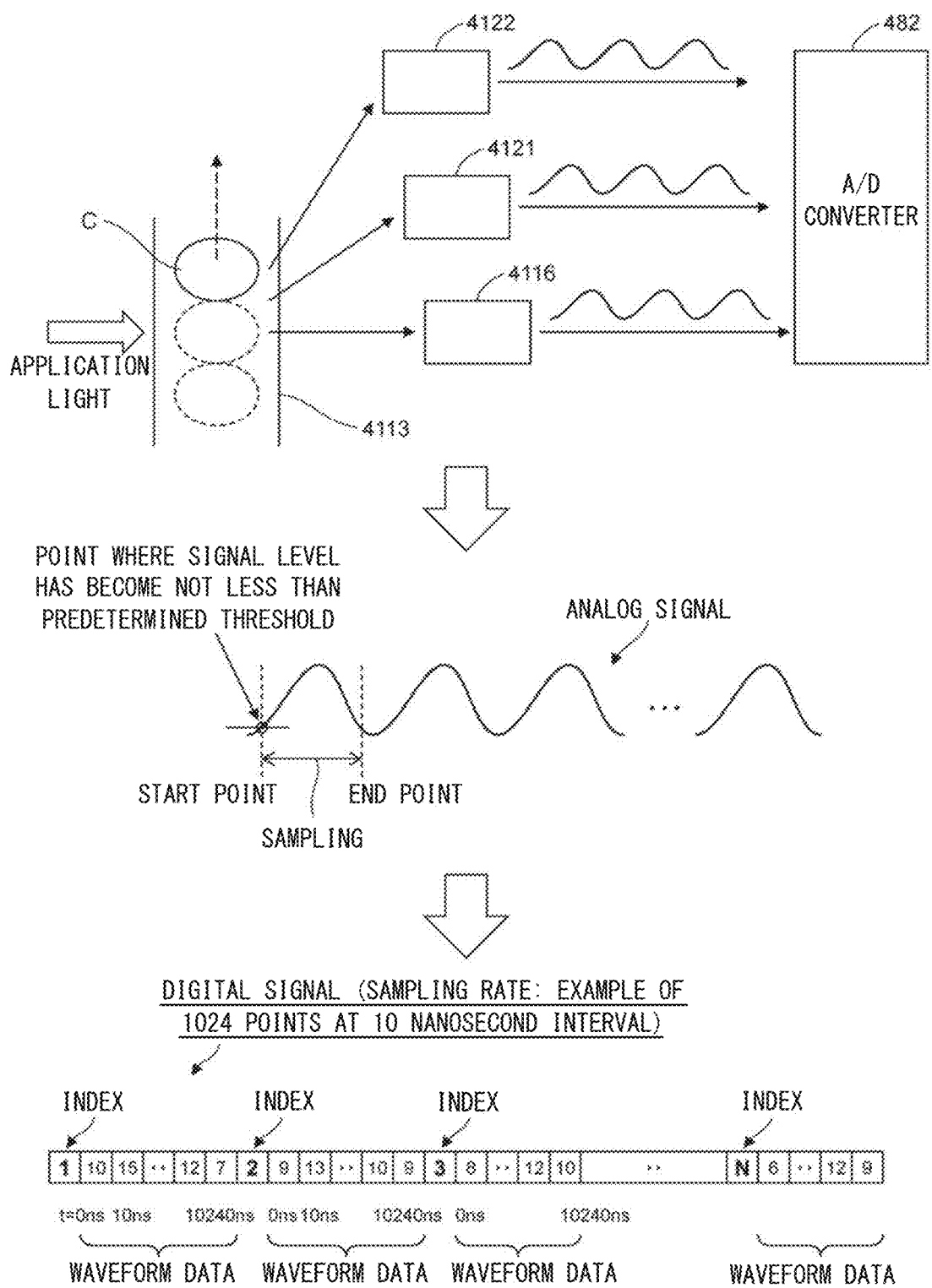
FIG. 5 illustrates a process of generating a digital signal performed by an A/D converter.

FIG. 5 is a schematic diagram for describing a process of sampling of an analog signal performed by the A/D converter 482. When a measurement sample containing a cell C is caused to flow in the flow cell 4113, and light is applied to the flow cell 4113, forward scattered light is generated in a forward direction with respect to the advancing direction of light. Similarly, side scattered light and side fluorescence are generated to a side direction with respect to the advancing direction of light. The forward scattered light is received by the light-receiving element 4116, and a signal corresponding to the amount of the received light is outputted. The side scattered light is received by the light-receiving element 4121, and a signal corresponding to the amount of the received light is outputted. The side fluorescence is received by the light-receiving element 4122, and a signal corresponding to the amount of the received light is outputted. In association with passage through the flow cell 4113 of a plurality of cells contained in the measurement sample, an analog signal which represents change in the signal associated with a lapse of time is outputted from each of the light-receiving elements 4116, 4121, 4122. The analog signal corresponding to forward scattered light is referred to as a "forward scattered light signal", an analog signal corresponding to side scattered light is referred to as a "side scattered light signal", and an analog signal corresponding to side fluorescence is referred to as a "fluorescence signal". One pulse of each analog signal corresponds to one cell.

The analog signals are inputted to the A/D converter 482. From a start point, which is the time point when the level of the forward scattered light signal, among the analog signals inputted from the light-receiving elements 4116, 4121, 4122, has reached a level set as a predetermined threshold, the A/D converter 482 samples the forward scattered light signal, the side scattered light signal, and the fluorescence signal. The A/D converter 482 samples the respective analog signals at a predetermined sampling rate (e.g., sampling at 1024 points at a 10 nanosecond interval, sampling at 128 points at an 80 nanosecond interval, sampling at 64 points at a 160 nanosecond interval, or the like). The sampling time is fixed irrespective of the size of the pulse. The sampling time is set so as to be longer than the time between the rise and fall of the level of the analog signal during passage of one cell through the beam spot of the flow cell 4113. Accordingly, matrix data that has, as elements, values indicating the analog signal level at a plurality of time points is obtained as a digital signal that corresponds to one cell. In this manner, the A/D converter 482 generates a digital signal of forward scattered light, a digital signal of side scattered light, and a digital signal of side fluorescence that correspond to one cell. The A/D conversion is repeated until the number of cells for which the digital signals have been obtained reaches a predetermined number, or until a predetermined time has lapsed from the start of causing the measurement sample to flow in the flow cell 4113. Accordingly, as shown in FIG. 5, with respect to N cells in the measurement sample, digital signals obtained by digitizing the waveforms of the analog signals of each cell is obtained. In the present specification, a set of sampling data of each cell included in each digital signal (in the example in FIG. 5, the set of 1024 digital values from t=0 ns to t=10240 ns) is referred to as waveform data.

Each piece of waveform data generated by the A/D converter 482 is provided with an index for identifying the corresponding cell. As the indexes, for example, integers of 1 to N are provided in the order of the generated pieces of waveform data, and the waveform data of forward scattered light, the waveform data of side scattered light, and the waveform data of side fluorescence are each provided with the same index. The index corresponds to a cell ID included in a cell data structure described later.

Since one piece of waveform data corresponds to one cell, the index corresponds to the cell that has been measured. Since an identical index is provided to the pieces of the waveform data that correspond to the same cell, a deep learning algorithm described later can analyze the waveform data of forward scattered light, the waveform data of side scattered light, and the waveform data of fluorescence that correspond to an individual cell; and classify the type of the cell.

Figure 6:
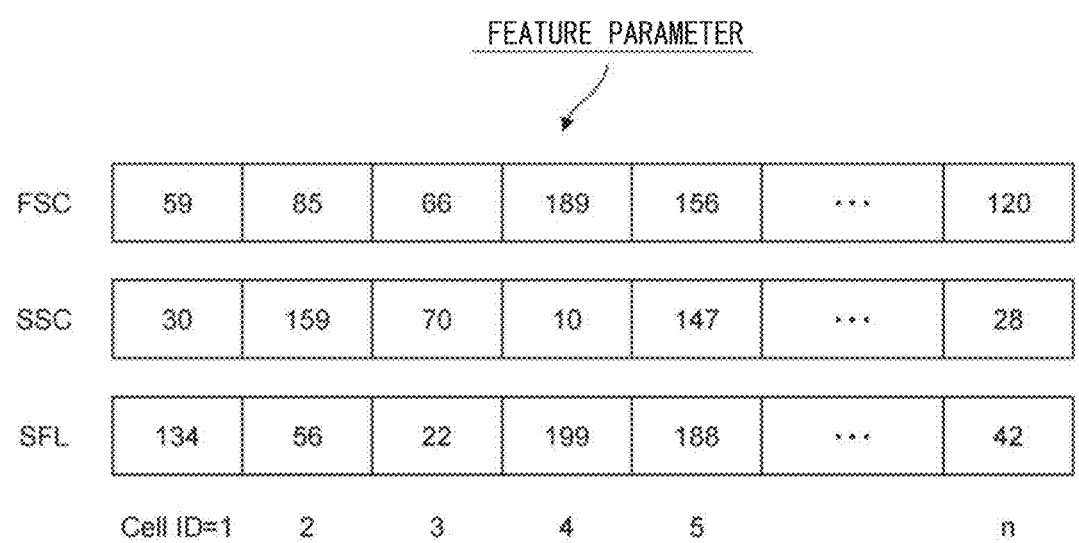
FIG. 6 illustrates a structure of feature parameter data.

In addition to generation of waveform data that corresponds to each cell, the A/D converter 482 calculates peak values of pulses of each signal, and generates feature parameter data. FIG. 6 is a schematic diagram showing an example of feature parameter data. In parallel with the process of converting each analog signal of each cell into digital values in order to generate waveform data, the A/D converter 482 sequentially stores the maximum value of digital values included in the waveform data of each cell from the head column of feature parameter data. The column N stores the value of the cell for which the N-th waveform data has been generated. The position of the column matches the index provided at the head of the waveform data. That is, the digital value corresponding to the waveform data having an index "N" is stored in the column N. The maximum value of the digital values corresponds to the peak height of the corresponding pulse of the analog signal of the cell. Therefore, with respect to each of the forward scattered light signal, the side scattered light signal, and the side fluorescence signal, through extraction of the maximum value of the digital values included in the waveform data of each cell, the peak value (referred to as FSCP) of the pulse of the forward scattered light signal, the peak value (referred to as SSCP) of the pulse of the side scattered light signal, and the peak value (referred to as SFLP) of the pulse of the side fluorescence signal can be obtained for each cell.

With reference back to FIG. 2, the A/D converter 482 inputs the generated digital signals and feature parameter data to the bus 485. The bus controller 4850 transmits the digital signals outputted from the A/D converter 482, to the RAM 4834, through DMA (Direct Memory Access) transfer, for example. The RAM 4834 stores the digital signals and the feature parameter data.

The processor 4831 is connected to the interface part 489, the interface part 488, the interface part 484, the RAM 4834, and the storage 4835 via the bus 485. The processor 4831 is connected to the parallel-processing processor 4833 via the bus 485. The processing unit 300 is connected to components of the measurement unit 400 via the interface part 489 and the bus 485. The bus 485 is a transmission line having a data transfer rate of not less than several hundred MB/s. The bus 485 may be a transmission line having a data transfer rate of not less than 1 GB/s, for example. The bus 485 performs data transfer in accordance with the PCI-Express or PCI-X standard, for example.

Using the parallel-processing processor 4833, the processor 4831 analyzes each digital signal by executing analysis software 4835a stored in the storage 4835.

The processor 4831 is a CPU (Central Processing Unit), for example. The parallel-processing processor 4833 executes, in parallel, a plurality of arithmetic processes which are at least a part of the process regarding analysis of waveform data. The parallel-processing processor 4833 is a GPU (Graphics Processing Unit), an FPGA (Field Programmable Gate Array), or an ASIC (Application Specific Integrated Circuit), for example. When the parallel-processing processor 4833 is an FPGA, the parallel-processing processor 4833 may have programed therein in advance an arithmetic process regarding a deep learning algorithm 60 realized by the analysis software 4835a, for example. When the parallel-processing processor 4833 is an ASIC, the parallel-processing processor 4833 may have incorporated therein in advance a circuit for executing the arithmetic process regarding the deep learning algorithm 60, or may have a programmable module built therein in addition to such an incorporated circuit, for example. As the parallel-processing processor 4833, GeForce, Quadro, TITAN, Jetson, or the like of NVIDIA Corporation is suitably used, for example.

Figure 7:
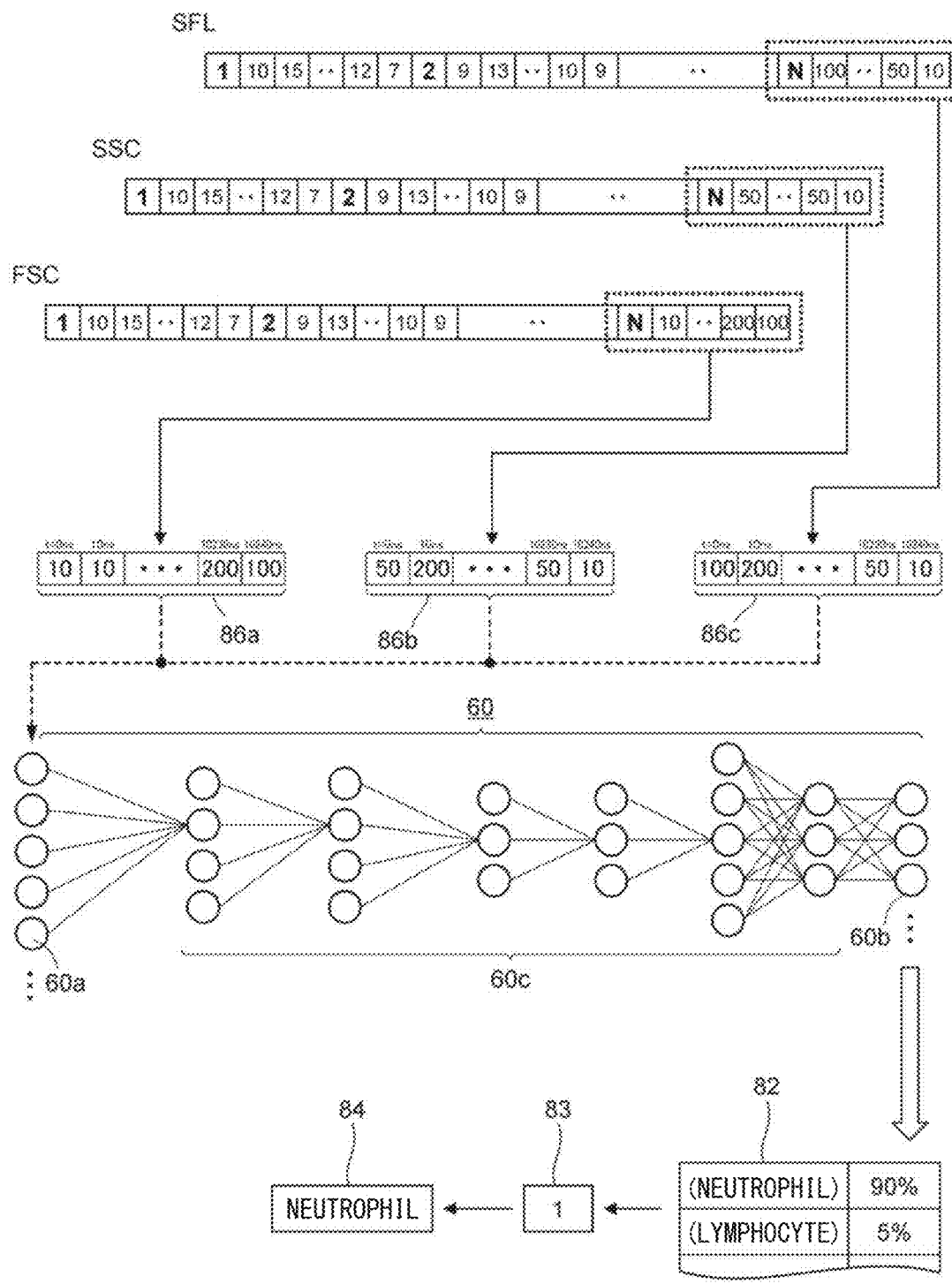
FIG. 7 is a schematic diagram describing a process of cell classification based on a deep learning algorithm.

FIG. 7 illustrates an arithmetic process of the deep learning algorithm 60 of the analysis software 4835a.

The deep learning algorithm 60 is implemented as a neural network that includes a multi-layered middle layer. Preferably, the neural network is a convolutional neural network (CNN) having a convolution layer. The number of nodes of an input layer 60a in the neural network corresponds to the number of sequences included in the waveform data of one cell to be inputted. In the example in FIG. 6, the number of nodes of the input layer 60a corresponds to the number of sequences, i.e., 1024×3, of the waveform data 86a, 86b, 86c of one cell.

An output layer 60b of the neural network includes the number of nodes that corresponds to the cell types to be analyzed. In the example in FIG. 8, the cell types to be analyzed are nine types, i.e., "neutrophil (NEUT)", "lymphocyte (LYMPH)", "monocyte (MONO)", "eosinophil (EO)", "basophil (BASO)", "immature granulocyte (IG)", "blast (Blast)", "abnormal lymphocyte (Abn LYMPH)", and "not applicable (NONE)". The number of nodes of the output layer 60b in this case is nine.

When waveform data has been inputted to the input layer 60a of the neural network forming the deep learning algorithm 60, a probability that a cell corresponding to the waveform data corresponds to each cell type is outputted from the output layer 60b, as classification information 82 in which the cell is classified into a plurality of cell types. The data outputted from the output layer 60b includes a cell ID, identification information (the label value in FIG. 8) of the cell type, and a numerical value of the probability corresponding to each cell type.

The processor 4831 stores into the RAM 4834 the classification information 82 of the cell obtained by the deep learning algorithm 60. The classification information 82 and the feature parameter data of each cell is transmitted to the processing unit 300 via the interface part 489.

3. Configuration of Processing Unit 300

Figure 9:
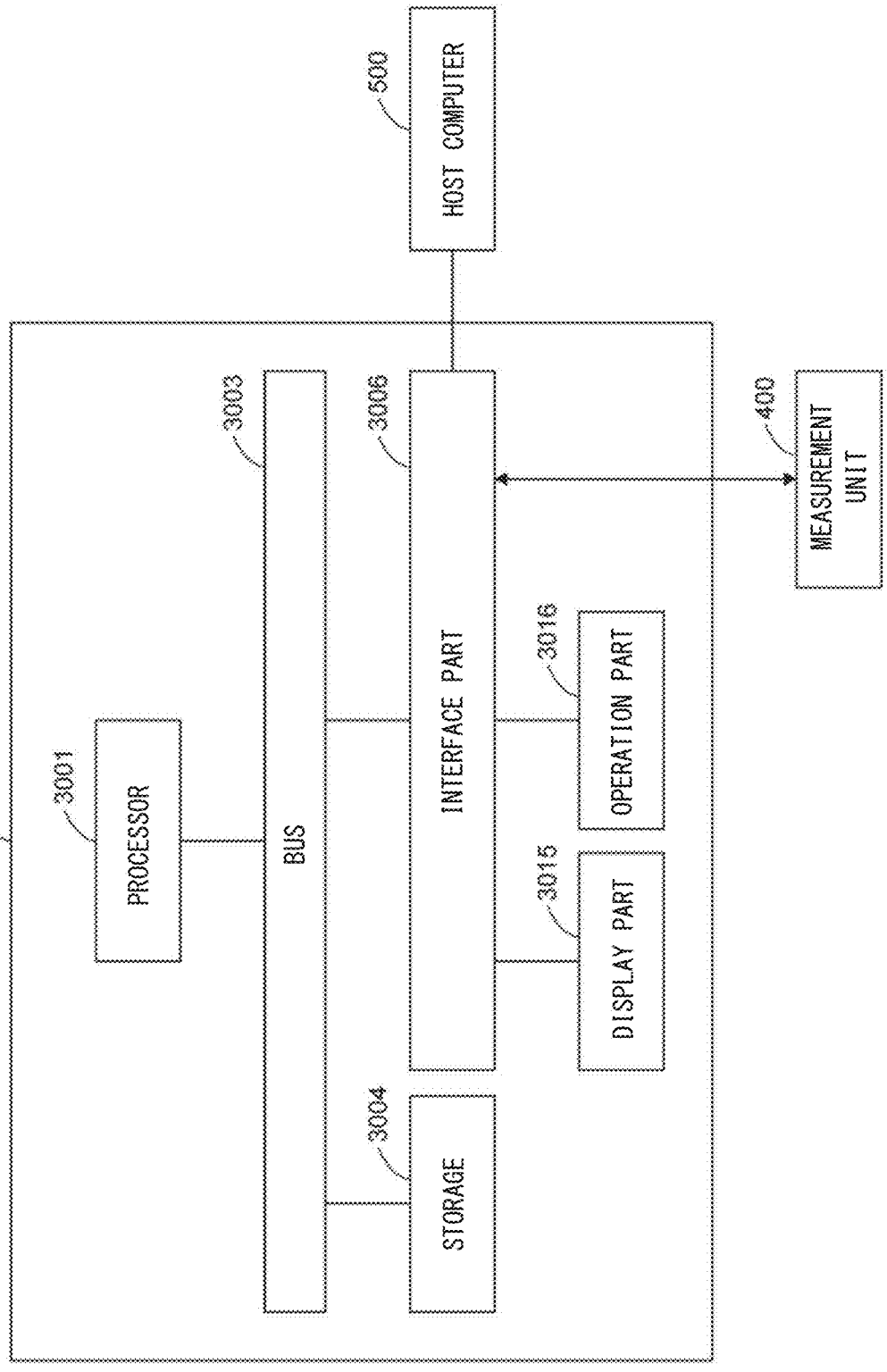
FIG. 9 is a block diagram of a processing unit.

A configuration of the processing unit 300 is described with reference to FIG. 9. The processing unit 300 is connected to the processor 4831 of the measurement unit 400 via an interface part 3006 and a bus 3003, and can receive the classification information 82 and the feature parameter data generated by the measurement unit 400. The interface part 3006 is a USB interface, for example.

The processing unit 300 includes a processor 3001, the bus 3003, a storage 3004, the interface part 3006, a display part 3015, and an operation part 3016. The processing unit 300 as hardware is implemented by a general personal computer, and functions as a processing unit of the cell analyzer 100, by executing a dedicated program stored in the storage 3004.

The processor 3001 is a CPU, and can execute a program stored in the storage 3004.

The storage 3004 includes a hard disk device. The storage 3004 stores at least a program for processing the classification information 82 of each cell transmitted from the measurement unit 400 and for generating a test result of the specimen.

The display part 3015 includes a computer screen. The display part 3015 is connected to the processor 3001 via the interface part 3006 and the bus 3003. The display part 3015 can receive an image signal inputted from the processor 3001 and display a test result.

The operation part 3016 includes a pointing device including a keyboard, a mouse, or a touch panel. A user such as a doctor or a laboratory technician operates the operation part 3016 to input a measurement order to the cell analyzer 100, thereby being able to input a measurement instruction in accordance with the measurement order. The operation part 3016 can also receive an instruction of displaying a test result from the user. By operating the operation part 3016, the user can view various types of information regarding the test result, such as a graph, a chart, or flag information provided to the specimen.

4. Operation of Cell Analyzer 100

Figure 10:
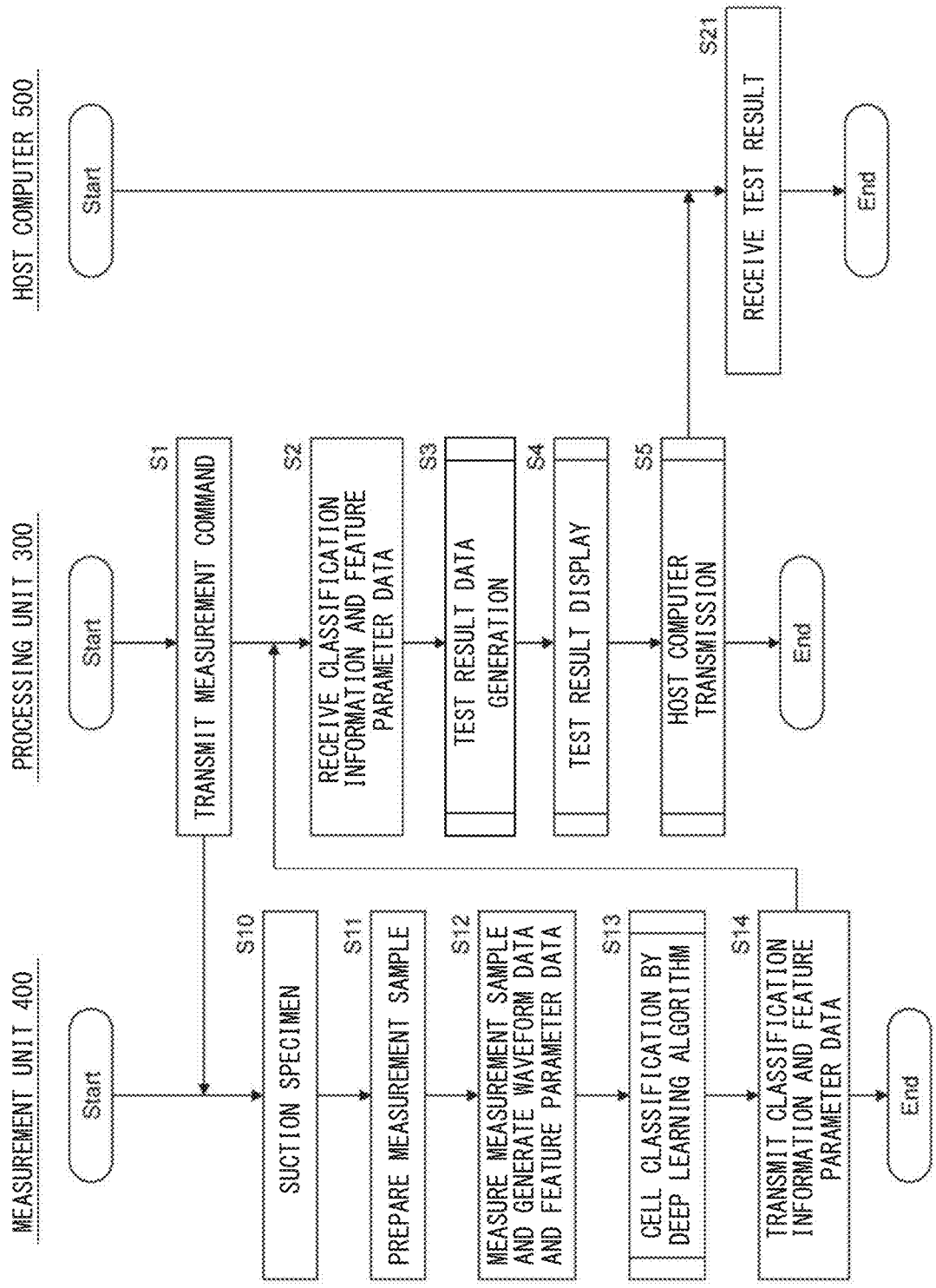
FIG. 10 is a flow chart describing operation of the cell analyzer.

With reference to FIG. 10, a specimen analysis operation performed by the cell analyzer 100 is described.

When the processor 3001 of the processing unit 300 has received a measurement order and a measurement instruction from the user via the operation part 3016, the processor 3001 transmits a measurement command to the measurement unit 400 (step S1).

Upon receiving the measurement command, the processor 4831 of the measurement unit 400 starts measurement of a specimen. The processor 4831 causes the specimen suction part 450 to suction a specimen from a blood collection tube T (step S10). Next, the processor 4831 causes the specimen suction part 450 to dispense the suctioned specimen into one of the reaction chambers 440a to 440e of the sample preparation part 440. The measurement command transmitted from the processing unit 300 in step S1 includes information of a measurement channel for which measurement is requested by the measurement order. On the basis of the information of the measurement channel included in the measurement command, the processor 4831 controls the specimen suction part 450 so as to discharge the specimen into the reaction chamber of the corresponding measurement channel.

The processor 4831 causes the sample preparation part 440 to prepare a measurement sample (step S11). In step S11, upon receiving an order from the processor 4831, the sample preparation part 440 supplies the reagents (hemolytic agent and staining liquid) into the reaction chamber having the specimen discharged therein, to mix the specimen with the reagents. Accordingly, a measurement sample in which red blood cells are hemolyzed by the hemolytic agent and in which cells, such as white blood cells or reticulocytes, serving as the target of the measurement channel are stained by the staining liquid, is prepared in the reaction chamber.

The processor 4831 causes the FCM detection part 410 to measure the prepared measurement sample (step S12). In step S12, the processor 4831 controls the apparatus mechanism part 430 to send the measurement sample in the reaction chamber of the sample preparation part 440, to the FCM detection part 410. The reaction chamber and the FCM detection part 410 are connected to each other by a flow path, and the measurement sample sent from the reaction chamber flows in the flow cell 4113, and is irradiated with laser light by the light source 4111 (see FIG. 4).

As a result of the measurement sample being supplied to the flow cell 4113, a forward scattered light signal, a side scattered light signal, and a side fluorescence signal are inputted to the A/D converter 482. The A/D converter 482 generates digital signals each being a set of pieces of waveform data that correspond to individual cells, and feature parameter data storing the maximum value included in the waveform data of each cell. The methods for generating the waveform data and the feature parameters have been described above.

The processor 4831 controls the bus controller 4850 to cause the waveform data and the feature parameter data generated by the A/D converter 482 to be taken into the RAM 4834 through DMA transfer. Through the DMA transfer, the waveform data is directly transferred to the RAM 4834, not via the processor 4831. The waveform data is stored into the RAM 4834.

By using the deep learning algorithm 60, the processor 4831 executes cell classification on the basis of the generated waveform data, and generates classification information (step S13).

The processor 4831 transmits, to the processing unit 300, the classification information 82 and the feature parameter data of each individual cell which have been obtained as a result of step S13 (step S14).

Upon receiving the classification information 82 and the feature parameter data from the measurement unit (step S2), the processor 3001 of the processing unit 300 analyzes the classification information 82 by using a program stored in the storage 3004, and generates test result data of the specimen (step S3). The test result data is stored into the storage 3004. The process of step S3 will be described later.

The processor 3001 displays the test result on the display part 3015 (step S4). The process of step S4 will be described later.

The processor 3001 transmits the test result to the host computer 500 (step S5). The process of step S5 will be described later.

The host computer 500 receives the test result transmitted from the processor 3001 of the processing unit 300 (step S21). Accordingly, a series of processes ends.

5. Test Result Data Generation Process

Figure 11:
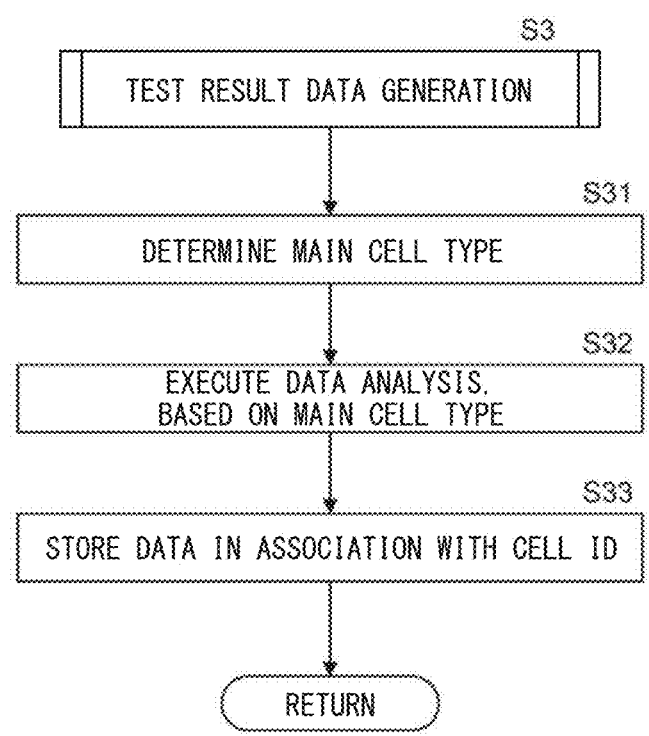
FIG. 11 is a flow chart describing a test result data generation process.

FIG. 11 is a flow chart showing details of step S3 (test result data generation process) executed by the processor 3001 of the processing unit 300.

On the basis of the classification information 82 received from the measurement unit 400, the processor 3001 determines a main cell type of the cell (step S31). Specifically, on the basis of the probability for each cell type included in the classification information 82, the processor 3001 determines, as the main cell type, a cell type that has the highest probability. For example, in a case where the probability data obtained with respect to a certain cell is as indicated below, the cell type that has the highest probability is neutrophil, and thus, the main cell type of the cell is neutrophil.

TABLE 1

| Cell type | Probability |
| --- | --- |
| neutrophil | 90% |
| lymphocyte | 10% |
| monocyte | 0% |
| eosinophil | 0% |
| basophil | 0% |
| immature granulocyte | 0% |
| blast | 0% |
| abnormal lymphocyte | 0% |

Next, on the basis of the determined main cell type, the processor 4831 counts the number of cells contained in the specimen, for each cell type (step S32). In the process of step S32, on the basis of the information of cell types of each individual cell, the number of cells is counted for each cell type. For example, when WDF is set as the measurement channel, the number of cell types to be classified is nine as shown as an example in FIG. 8. For example, when the number of cells of which the main cell type is neutrophil is M, the processor 3001 generates a counting result in which the number of neutrophils is M. The processor 3001 performs a similar process on lymphocyte, monocyte, eosinophil, basophil, immature granulocyte, blast, and abnormal lymphocyte, and generates a counting result for each cell type.

The processor 3001 may further determine whether the specimen is normal/abnormal on the basis of the count value of each cell type. For example, since blasts are not contained in peripheral blood of a healthy individual, when not less than a predetermined number of cells of which the main cell type has been determined as blast are contained, the specimen is suspected to have some abnormality. In addition, since immature granulocytes are not usually contained in blood of a healthy individual, when not less than a predetermined number of cells of which the main cell type has been determined as immature granulocyte are contained, the specimen is suspected to have some abnormality. The processor 3001 compares the count value (absolute value) of each cell type with a predetermined numerical range or threshold, and when the count value is outside the numerical range or exceeds the threshold, the processor 3001 may add a flag indicating that abnormality is suspected, to the analysis result.

The processor 3001 may further obtain the content ratio of cells on the basis of the count value of each cell type. For example, when WDF is set as the measurement channel, the processor 3001 obtains the ratio of five white blood cell subclasses of neutrophil, lymphocyte, monocyte, eosinophil, and basophil. Blood of a healthy individual contains these five white blood cell subclasses at predetermined proportions. The processor 3001 may determine whether the specimen is normal/abnormal by comparing these proportions of white blood cell subclasses with predetermined numerical ranges or thresholds. When a specific white blood cell ratio is outside a predetermined numerical range or exceeds a threshold, the processor 3001 may add a flag suggesting that the specimen is abnormal, to the analysis result.

Figure 12:
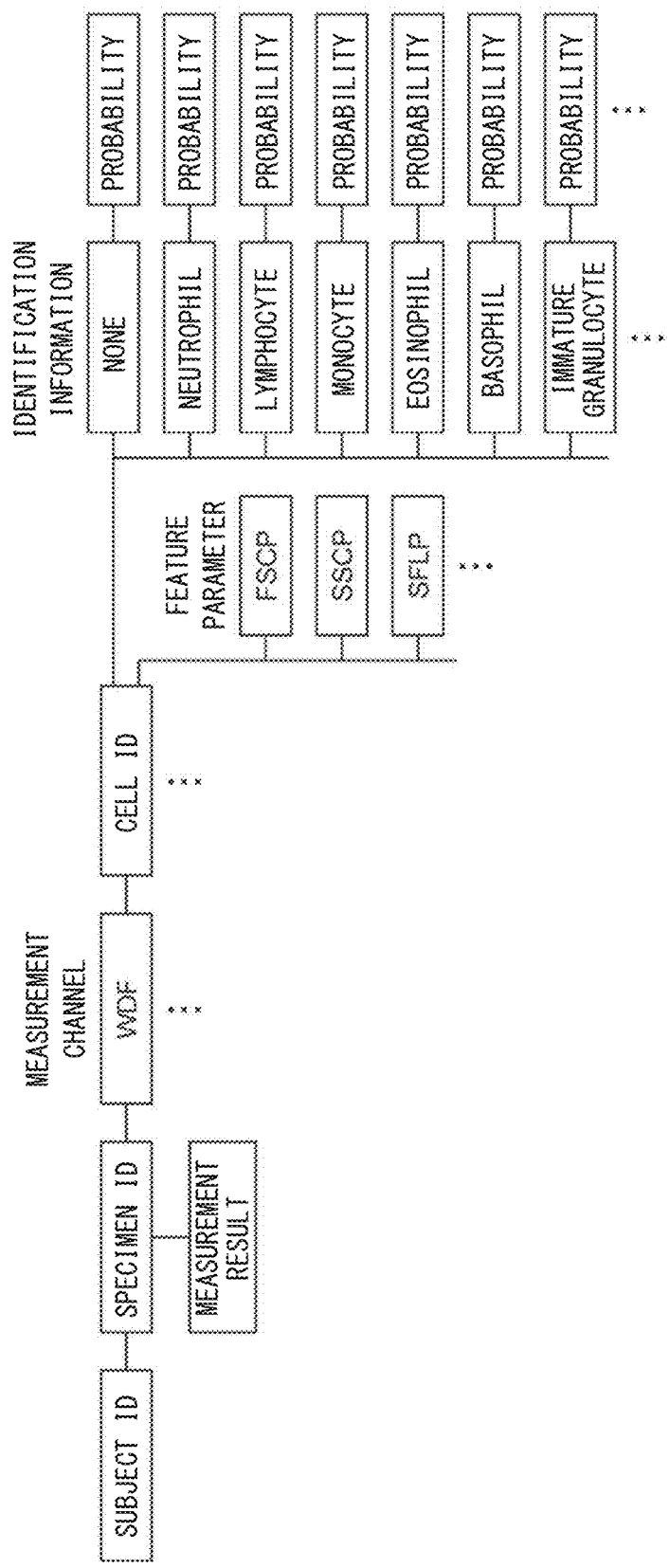
FIG. 12 schematically shows a first example of a data structure of test result data.

The processor 3001 generates the above-described test result data in association with the cell ID (step S33). FIG. 12 schematically shows a first example of a data structure of test result data generated by the processor 3001.

The test result data is configured as a relational database, and includes a plurality of data items (columns). In the example shown in FIG. 12, subject ID, specimen ID, measurement result, identification code of measurement channel, cell ID, identification information of cell type, and probability for each cell type are provided as data items.

The data of "subject ID" stores a subject ID being the information for identifying the subject from whom the specimen has been collected. The subject ID is a multiple-character string composed of a combination of numerals and alphabets, for example.

The data of "specimen ID" stores a specimen ID being the information for identifying the specimen. The specimen ID is a multiple-character string composed of a combination of numerals and alphabets, for example.

The data of "measurement result" stores a measurement result obtained by the processor 3001 analyzing measurement data on the basis of the main cell type in step S32. The measurement result includes a counting result of cells based on the cell type (main cell type) that has the highest probability, as described above. When the measurement channel is WDF, the measurement result includes the number and proportion of each of the white blood cell subclasses (monocyte, neutrophil, lymphocyte, eosinophil, basophil). When the measurement channel is RET, the measurement result includes the number of reticulocytes. When the measurement channel is WPC, the measurement result includes the number of hematopoietic progenitor cells. When the measurement channel is WNR, the measurement result includes the number of white blood cells and the number of nucleated erythrocytes.

The data of "measurement channel" stores information that indicates the measurement channel of the measurement having been performed on the specimen. In the example of the measurement unit 400 of the present embodiment, DIFF, RET, WPC, PLT-F, and WNR exist as the measurement channels. In the data items of the measurement channel, a character string of "DIFF", "RET", "WPC", "PLT-F", or WNR" is stored in accordance with the measurement channel in which the measurement has been performed. The information indicating the measurement channel may be a character string indicating the measurement channel, or may be a numeral or alphabet assigned to each measurement channel. For example, numerals may be assigned such that DIFF=1, RET=2, WPC=3, PLT-F=4, and WNR=5, and the numeral that corresponds to the used measurement channel may be stored. The data of "measurement channel" stores one or a plurality of values with respect to one specimen, in accordance with the number of measurement channels in which measurement has been performed.

As for the data of "cell ID", a plurality of pieces of data are created in accordance with the number of cells detected in the measurement in one measurement channel. The cell ID is a numerical value of a natural number such as 1, 2, 3, . . . , or N. The cell ID matches the index (see FIG. 5) added to the head of waveform data and to the sequential order (see FIG. 6) of the column of the feature parameter data that correspond to each individual cell described above.

The data of "feature parameter" stores the values of the forward scattered light peak value (FSCP), the side scattered light peak value (SSCP), and the side fluorescence peak value (SFLP) of the corresponding cell. In the example in FIG. 12, as the data of "feature parameter", three feature parameters of FSCP, SSCP, and SFLP are created for one cell ID. As described with reference to FIG. 6, in the feature parameter data, the sequential orders of columns correspond to cell IDs. For example, the head column (first column) of the feature parameter data stores a feature parameter that corresponds to the cell having a cell ID "1". Therefore, the data of FSCP corresponding to cell ID=1 stores a value "59" in the head column of the FSCP matrix data in the feature parameter data. Similarly, data of SSCP and data of SFLP store a value "30" in the head column of the SSCP matrix data, and a value "134" in the head column of the SFLP matrix data, respectively.

The data of "cell type" stores information indicating a cell type to be analyzed. The information indicating a cell type is, for example, a label value that can specify a cell type as shown in FIG. 8. As for the data of "cell type", a plurality of pieces of data are created in accordance with the number of cell types to be analyzed in the measurement channel. For example, when the number of cell types to be analyzed in a measurement channel is nine including "none" as shown in FIG. 8, nine pieces of data of "cell type" are created. The identification information may be a character string such as "neutrophil" or "NEUT", instead of a label value.

As for the data of "probability", one piece of data is created for data of one cell type. With respect to the corresponding cell ID and identification information, the data of "probability" stores, in the form of numerical data, a value of a probability outputted by the deep learning algorithm 60. For example, when the classification information 82 of a target cell is as shown in Table 1 above, "90%" is stored as a variable corresponding to neutrophil, "10%" is stored as a variable corresponding to lymphocyte, and "0%" is stored as variables corresponding to the other pieces of identification information.

The processor 3001 generates test result data shown in FIG. 12, and stores the test result data into the storage 3004.

Figure 13:
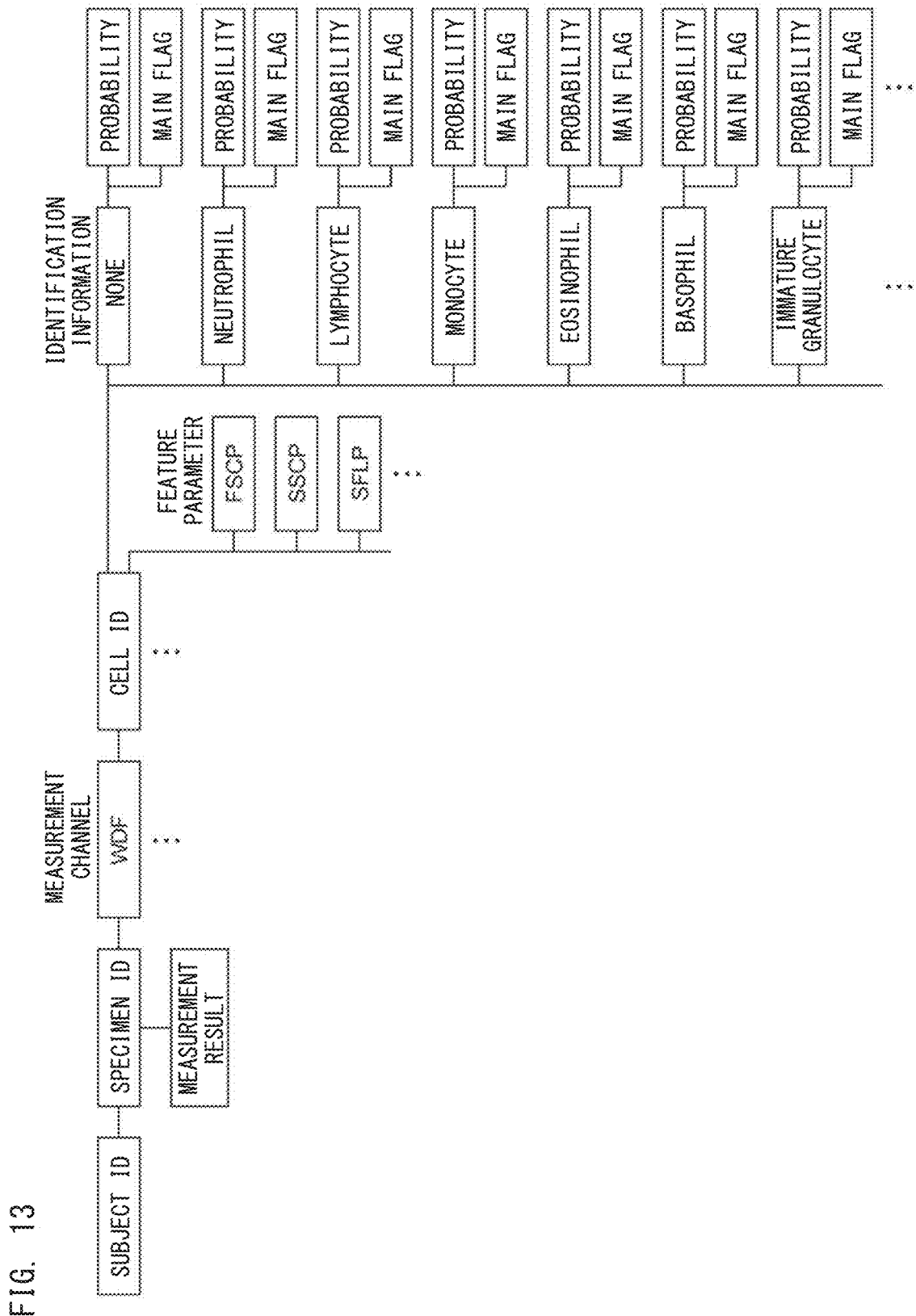
FIG. 13 schematically shows a second example of the data structure of test result data.

FIG. 13 schematically shows a second example of test result data. In the data structure of test result data shown in FIG. 13, when compared with that in FIG. 12, data storing a main flag is added to each piece of identification information. In the case of the data structure in FIG. 13, the classification information is composed of identification information, probability, and main flag.

The data of "main flag" stores a value of 0 or 1. The processor 3001 stores 1 into the main flag that corresponds to the cell type (main cell type) that has the highest probability, and stores 0 into the main flags that correspond to the other cell types. With this configuration, the processor 3001 need not specify a main cell type for each individual cell on the basis of the probabilities every time using in an arithmetic operation or outputting the information of the main cell type. Accordingly, speed up of processing can be realized. For example, in a scattergram described later, a plot of each cell is displayed in a color that is different for each cell type. In such a case, the processor 3001 can, with reference to the main flag, determine the color of the plot of each cell, and need not specify the main cell type on the basis of the probabilities of each individual cell. In the case of the second example, when the deep learning algorithm 60 generates classification information 82, the deep learning algorithm 60 may execute a process of setting a numerical value in each main flag together with the classification information 82.

Figure 14:
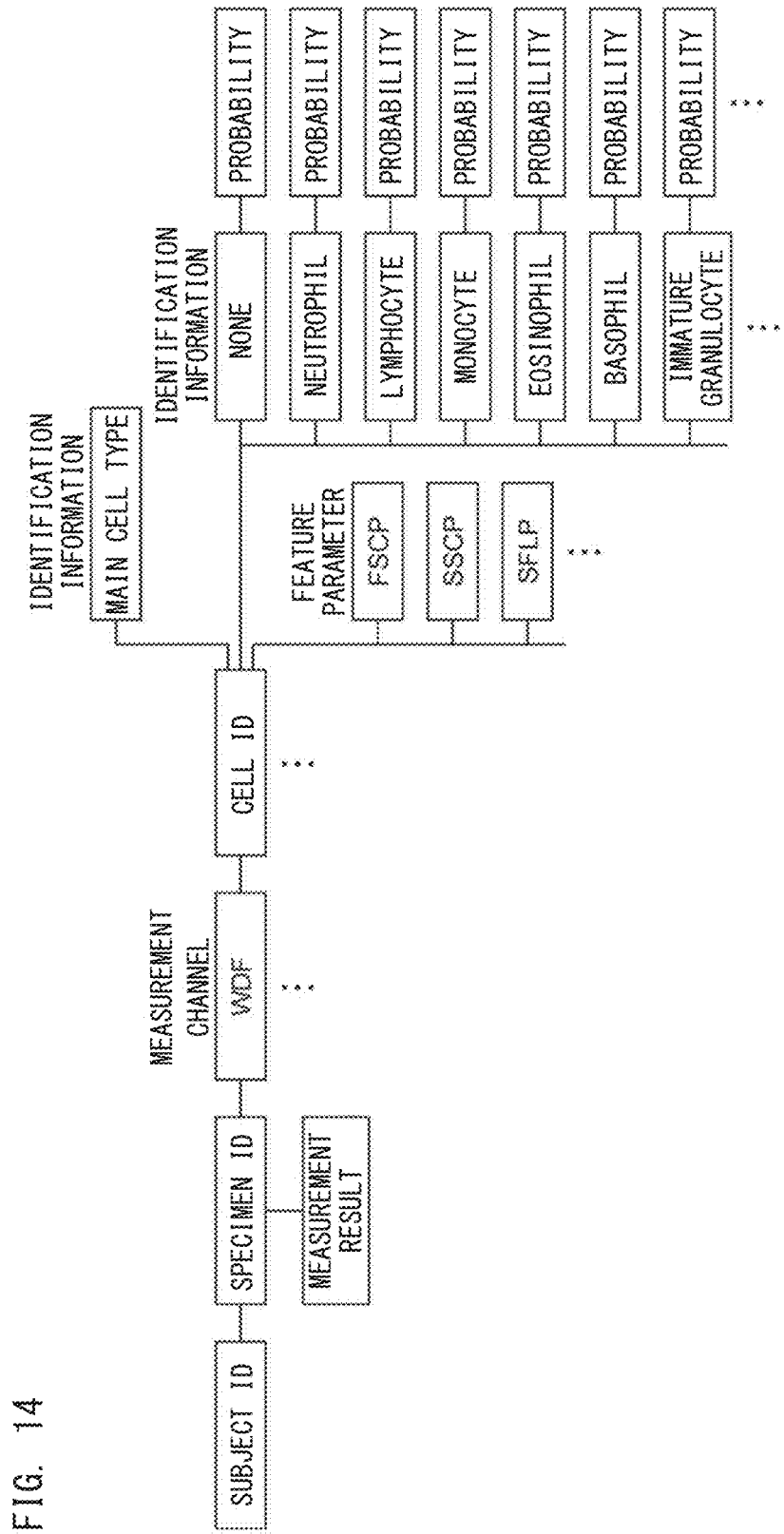
FIG. 14 schematically shows a third example of the data structure of test result data.

FIG. 14 schematically shows a third example of test result data. In the test result data shown in FIG. 14, when compared with that in FIG. 12, one piece of data of "main cell type" is added to one cell ID. In the case of the data structure in FIG. 14, the classification information is composed of identification information, probability, and identification information indicating the main cell type.

The data of "main cell type" stores identification information of the cell type (main cell type) that has the highest probability. In the second example in FIG. 13, in order to specify the main cell type of each individual cell, it is necessary to search the columns storing the main flags. However, in the third example in FIG. 14, with reference to the data of "main cell type", the main cell type can be specified. Accordingly, further speed up of processing can be realized.

Figure 15:
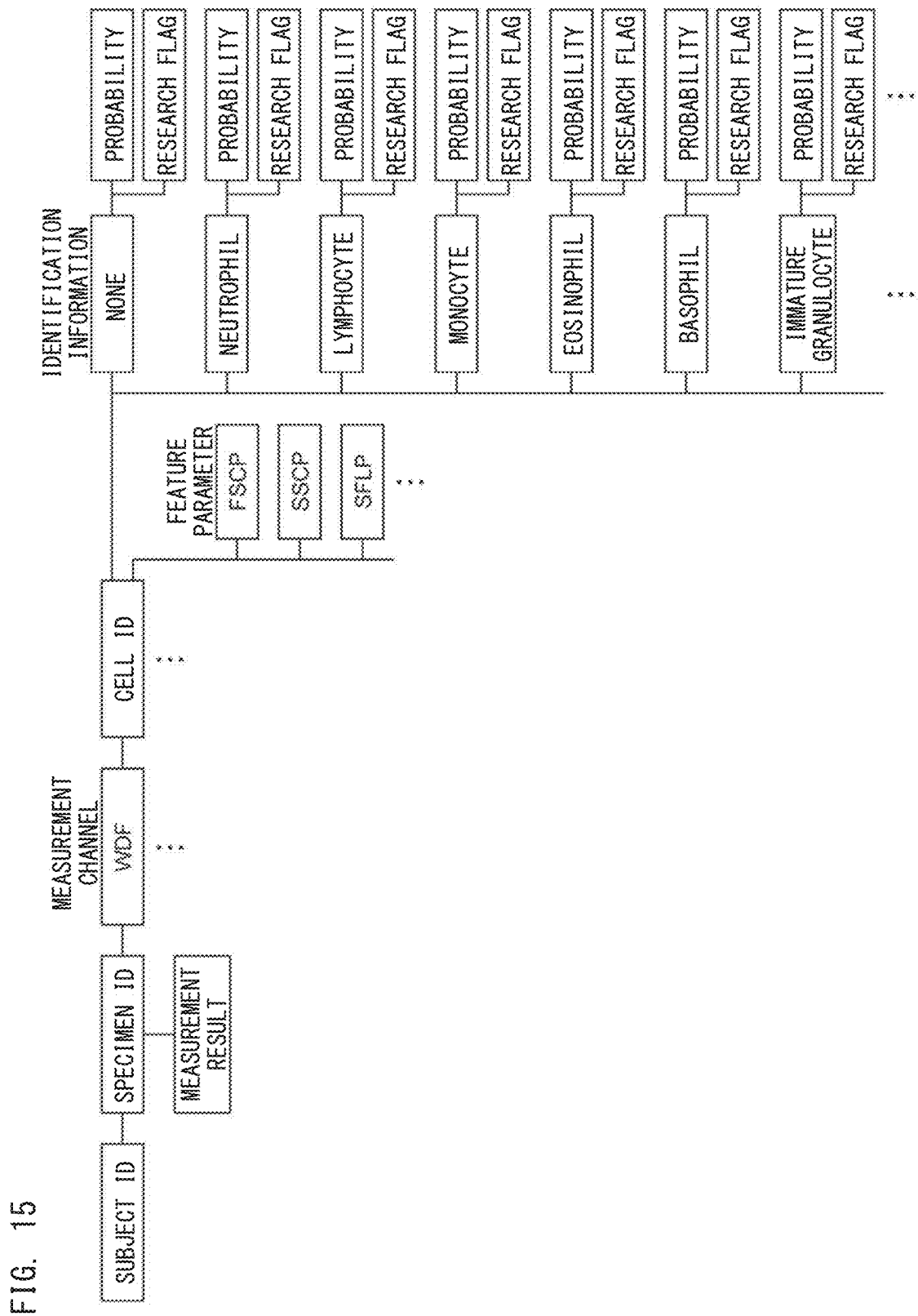
FIG. 15 schematically shows a fourth example of the data structure of test result data.

FIG. 15 schematically shows a fourth example of test result data. In the test result data shown in FIG. 15, when compared with that in FIG. 12, data of "research flag" is added so as to correspond to each piece of identification information. In the case of the data structure in FIG. 15, the classification information is composed of identification information, probability, and research flag.

The data of "research flag" stores a value of 0 or 1. The research flag is a flag for distinguishing the cell type to be displayed as a test result of a reportable item, from the cell type to be displayed in an auxiliary manner as a research item, on a result display screen described later. The processor 3001 stores "1" into a research flag that corresponds to a cell type having a probability not higher than a predetermined threshold, and stores "0" into a research flag that corresponds to a cell type having a probability higher than this threshold. When 1 has been set in the research flag, in a case where test result data is to be displayed, it is possible to provide the probability, the counting result, or the like regarding this cell type, with information indicating that these pieces of information are preferably used for research.

Figure 16:
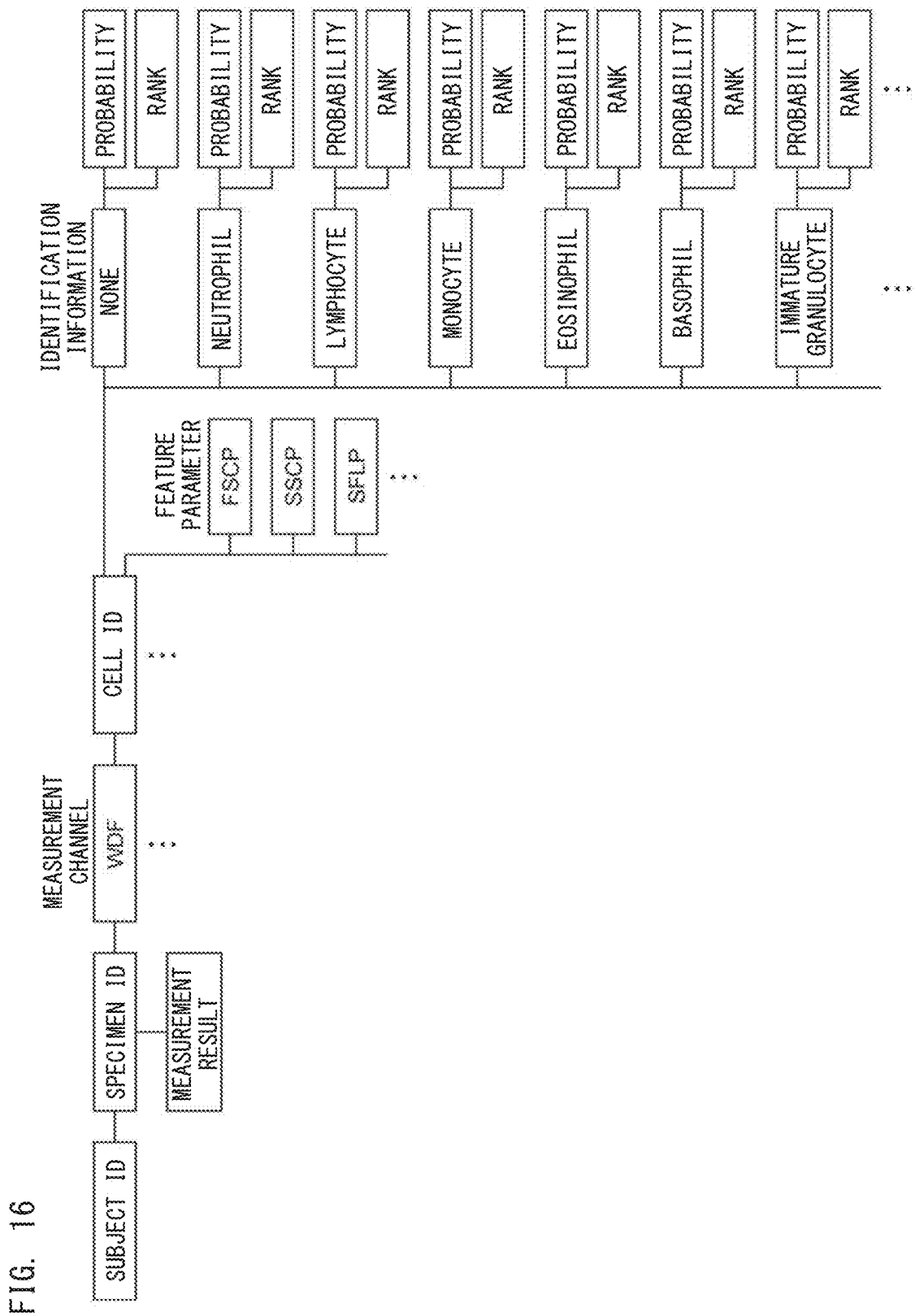
FIG. 16 schematically shows a fifth example of the data structure of test result data.

FIG. 16 schematically shows a fifth example of test result data. In the test result data shown in FIG. 16, when compared with that in FIG. 12, data of "rank" is added to each piece of identification information. In the case of the data structure in FIG. 16, the classification information is composed of identification information, probability, and rank.

The data of "rank" stores one of numerals of 1 to m (m: the number of cell types to be analyzed), which are provided in a descending order of probabilities to all of the cell types associated with a cell ID. The processor 4831 calculates ranks in a descending order of probabilities, and stores each calculated rank into the data of "rank" of the corresponding cell type. In this case, with reference to the data of "rank", the processor 3001 can smoothly understand not only the cell type that has the highest probability, but also the cell type that has the second highest probability, for example.

6. Test Result Displaying Process

Figure 17:
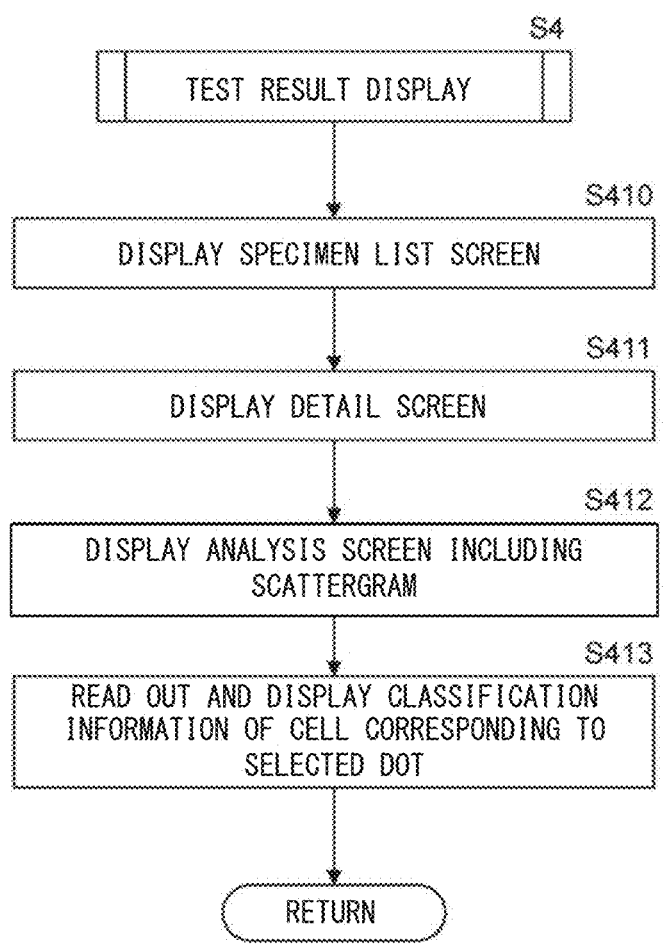
FIG. 17 is a flow chart of a first example of a test result displaying process.

FIG. 17 is a flow chart illustrating a first example of a test result displaying process (step S4) executed by the processor 3001.

The processor 3001 displays a specimen list screen 700 (sample explorer screen) (step S410). The processor 3001 displays a detail screen 800 (browser screen) in accordance with an operation by the user (step S411). In accordance with a display instruction from the user, the processor 3001 displays an analysis screen 900 including a scattergram (step S412). The processor 3001 reads out classification information of a cell that corresponds to a dot selected in a scattergram 901 displayed on the analysis screen 900, and displays the read out classification information (step S413).

Figure 18:
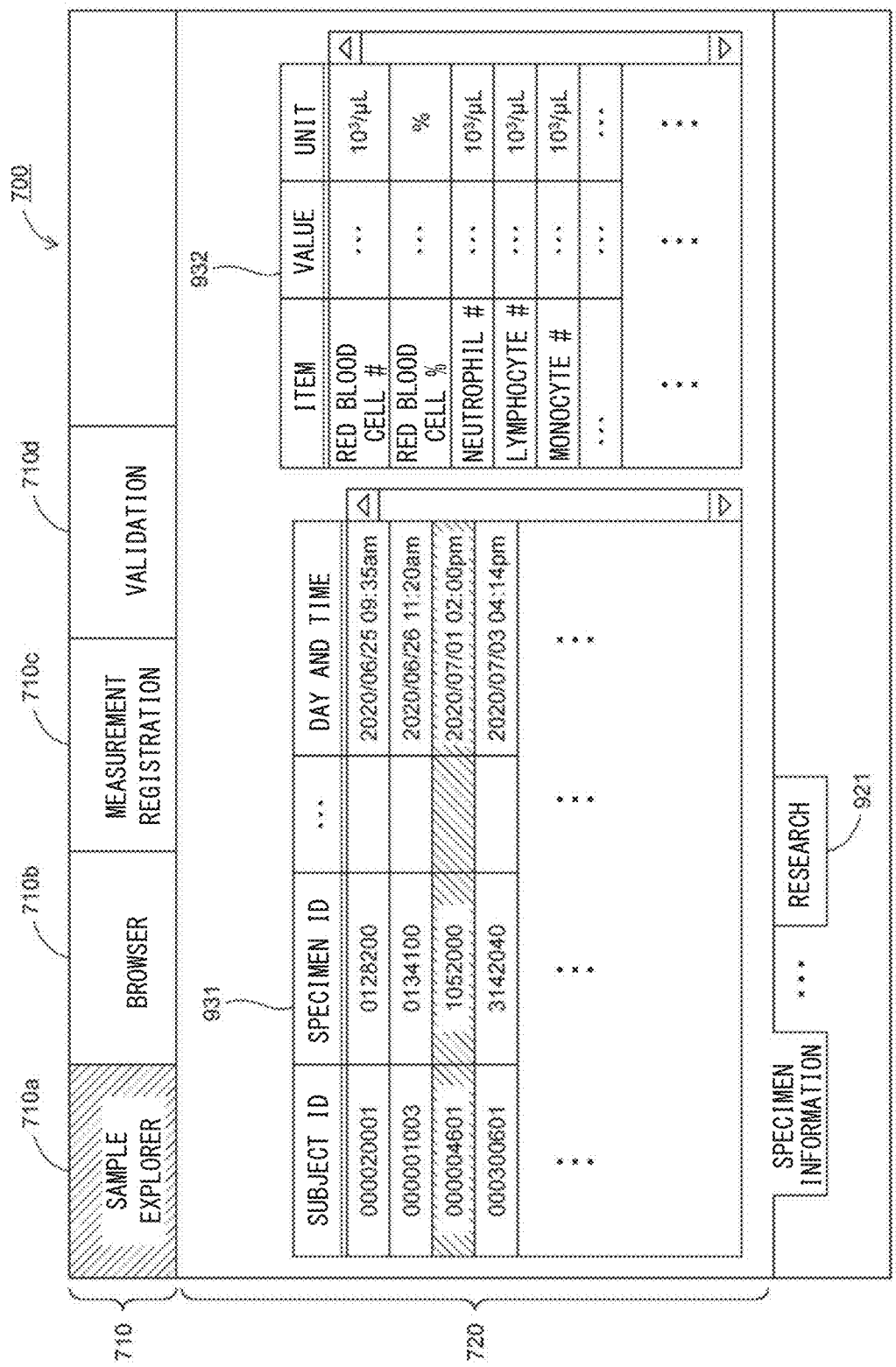
FIG. 18 shows an example of a specimen list screen.

FIG. 18 shows an example of the specimen list screen 700. The specimen list screen 700 includes a tool bar 710 and a data display region 720. A plurality of icons for performing predetermined operations on the screen are displayed in the tool bar 710. Specifically, the tool bar 710 includes: a specimen list screen icon 710a for calling the specimen list screen 700 (SE screen); a detail icon 710b for calling the detail screen 800; a measurement registration icon 710c for calling a measurement order input screen for inputting a measurement order; and a validation icon 710d for validating a test result.

The data display region 720 in which data of test results is displayed is provided in a part below the tool bar 710. The tool bar 710 is always displayed in an upper part of the screen, irrespective of the content displayed in the data display region 720. A specimen list display region 931 and a measurement result display region 932 are displayed in the data display region 720 of the specimen list screen 700.

The specimen list display region 931 is provided with items such as subject ID, specimen ID, and day and time. In the specimen list display region 931, test result data identified by a subject ID and a specimen ID is displayed in the form of a list.

A measurement result based on the specimen ID selected in the specimen list display region 931 is displayed in the measurement result display region 932. The measurement result displayed in the measurement result display region 932 is a counting result and ratio information based on the main cell type.

When the user has selected the detail icon 710b on the specimen list screen 700, or has selected (e.g., double clicked) a record of one specimen in the specimen list display region 931, a detail screen 800 is displayed.

Figure 19:
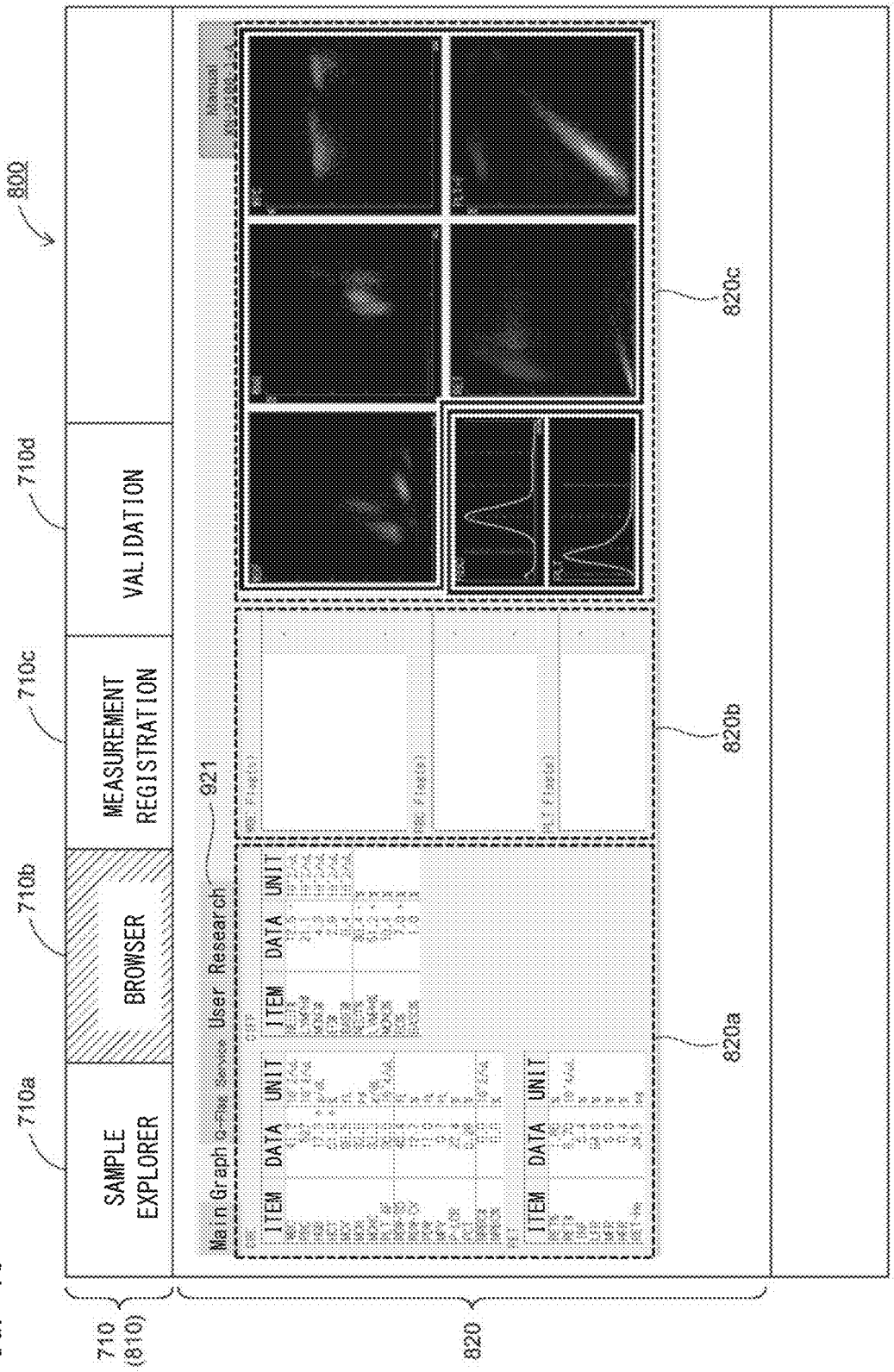
FIG. 19 shows an example of a detail screen.

FIG. 19 shows an example of the detail screen 800. The detail screen 800 includes a tool bar 810 (710), and a data display region 820. The tool bar 810 is the same as that displayed on the specimen list screen 700. A measurement result region 820a for displaying a measurement result, a flag region 820b for displaying flag information, and a graph region 820c for displaying a graph are displayed in the data display region 820. Measurement results of all of the measurement channels for which measurements have been performed on the specimen to be displayed are displayed in the measurement result region 820a. When a flag has been set to the specimen on the basis of a measurement result, the flag (suspicion message) is displayed in the flag region 820b. A graph corresponding to each measurement channel is displayed in the graph region 820c.

In the example in FIG. 19, a WDF scattergram, a WNR scattergram, a WPC scattergram, an RET scattergram, a PLT-F scattergram, an RBC histogram, and a PLT histogram are displayed in the graph region 820c. Each scattergram displayed in the graph region 820c is created on the basis of the feature parameters described above, and is displayed.

The user refers to the analysis result displayed on the detail screen 800, and when the user validates test result data, the user operates the validation icon 710d. Accordingly, the test result data is validated. When the user does not validate the test result data, the user may operate the measurement registration icon 710c to input a retest order, for example.

In order to confirm classification information of a cell, the user can cause the analysis screen 900 to be displayed. In the graph region 820c on the detail screen 800, when the user operates (e.g., double clicks) a graph, the analysis screen 900 is displayed in a pop-up manner, to be overlaid on the detail screen 800.

Figure 20:
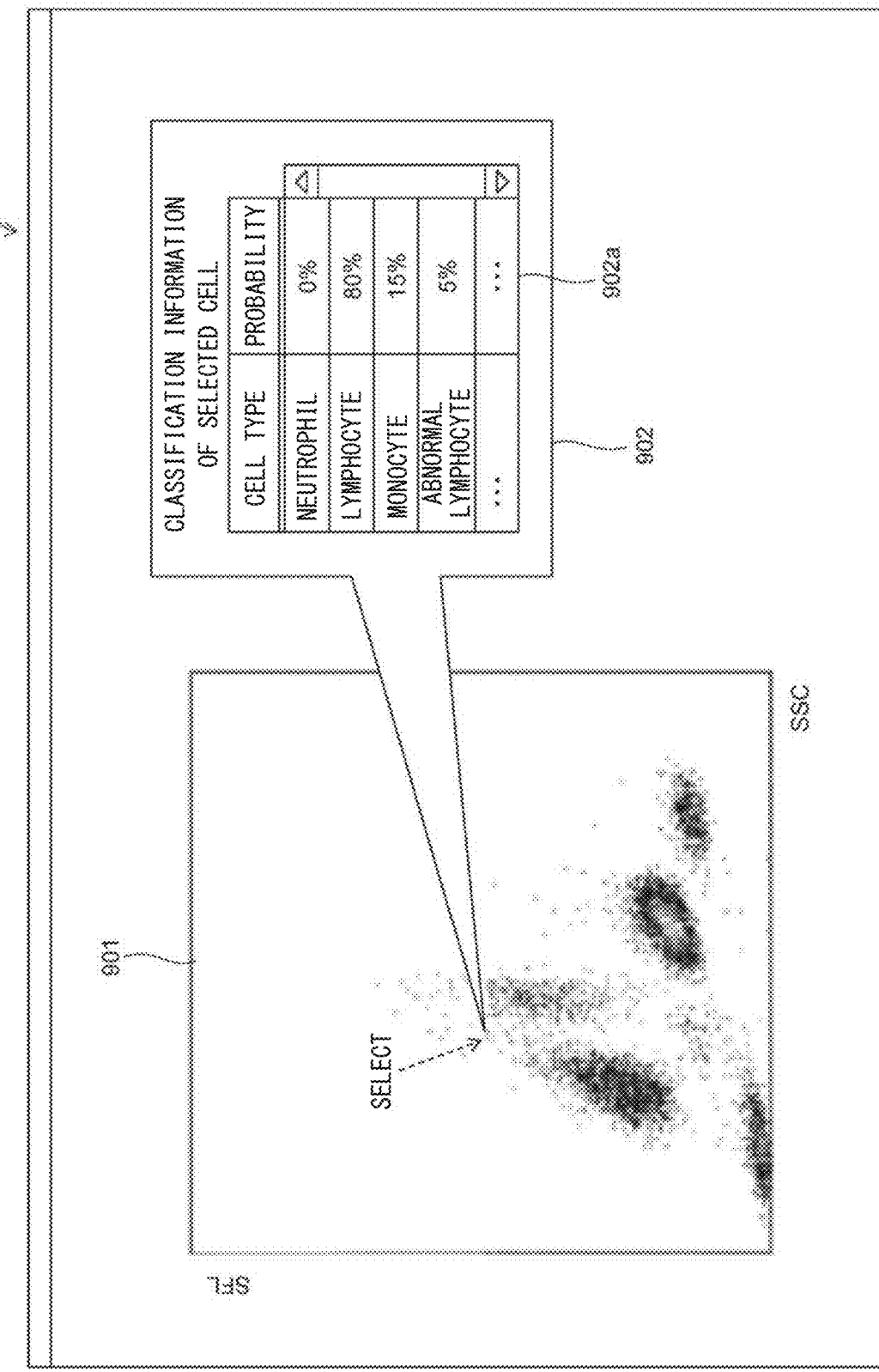
FIG. 20 shows an example of an analysis screen.

FIG. 20 is an example of the analysis screen 900. FIG. 20 shows, as an example, the analysis screen 900 that is displayed when the user has selected a WDF scattergram.

The scattergram 901 and a detail display region 902 are displayed on the analysis screen 900. The scattergram 901 shown in FIG. 20 is displayed on the basis of the feature parameters of the cell associated with the measurement channel included in the test result data. In the scattergram 901 shown in FIG. 20, the horizontal axis represents the peak value of side scattered light signal (SSCP), and the vertical axis represents the peak value of side fluorescence signal (SFLP). With respect to each individual cell specified by a cell ID, the processor 3001 determines a coordinate in the scattergram 901 on the basis of SSCP and SFLP, and renders a dot on the determined coordinate, thereby plotting the cell. The processor 3001 performs similar processes to the data of all of the cells associated with the measurement channel that corresponds to the scattergram 901 to be displayed, thereby plotting the cells on the scattergram 901.

The processor 3001 sets a color of a dot on the basis of the classification information of the cell to be plotted. Specifically, the processor 3001 displays cells of different cell types, in the form of dots having different colors. For example, in the scattergram 901 corresponding to the WDF channel, neutrophils are displayed in a first color (e.g., blue), lymphocytes are displayed in a second color (e.g., purple), monocytes are displayed in a third color (e.g., green), eosinophils are displayed in a fourth color (e.g., red), and basophils are displayed in a fifth color (e.g., yellow).

White blood cell classification performed in a conventional blood cell counter has adopted a method of clustering analysis in which cells are plotted on a coordinate plane such as the scattergram 901 shown in FIG. 20, and in which cells are classified into a plurality of populations on the basis of the coordinate of each cell. Therefore, cells that have been plotted on the same coordinate are classified into the same type of cell. Meanwhile, in the present embodiment, different from the conventional white blood cell classification, the feature parameters (SSCP and SFLP) of cells are used only for plotting the cells onto the scattergram 901. As described above, cell classification in the present embodiment uses the deep learning algorithm 60 to analyze waveform data of each individual cell, thereby individually identifying the type of each cell, without using the clustering technique. In other words, the coordinates of the cell plots in the scattergram 901 are fragmentary information representing the distribution of cells in a measurement sample on the basis of parameters indicating the features of the cells, and the coordinates are not used for identification of cell types. Therefore, even when a plurality of cells are plotted on the same coordinate, such cells may be classified into different cell types by the deep learning algorithm 60. When cells of different types have been plotted on the same coordinate, the processor 3001 renders, on the basis of the main cell types of the plurality of cells plotted on the same coordinate, a dot of a color that corresponds to the main cell type that has the highest proportion.

In step S413 of the flow chart in FIG. 17, when the user has performed an operation (e.g., double click) of selecting a dot on the scattergram 901, the processor 3001 displays the detail display region 902 in a pop-up manner. The detail display region 902 includes a classification information display region 902*a*, and the classification information display region 902*a* displays the classification information of the cell included in the dot selected on the scattergram 901. FIG. 20 shows an example in which a plurality of cell types and the probability corresponding to each cell type are displayed. The classification information display region 902*a* is provided with a scroll bar for allowing display of all of the cell types and probabilities by changing the display range in the classification information display region 902*a*. When a plurality of cells have been plotted on the dot selected on the scattergram 901, the classification information display region 902*a* for each of the plurality of cells is displayed in the detail display region 902. By operating the scroll bar, the user can cause the classification information to be displayed in a scrolling manner.

Figure 21:
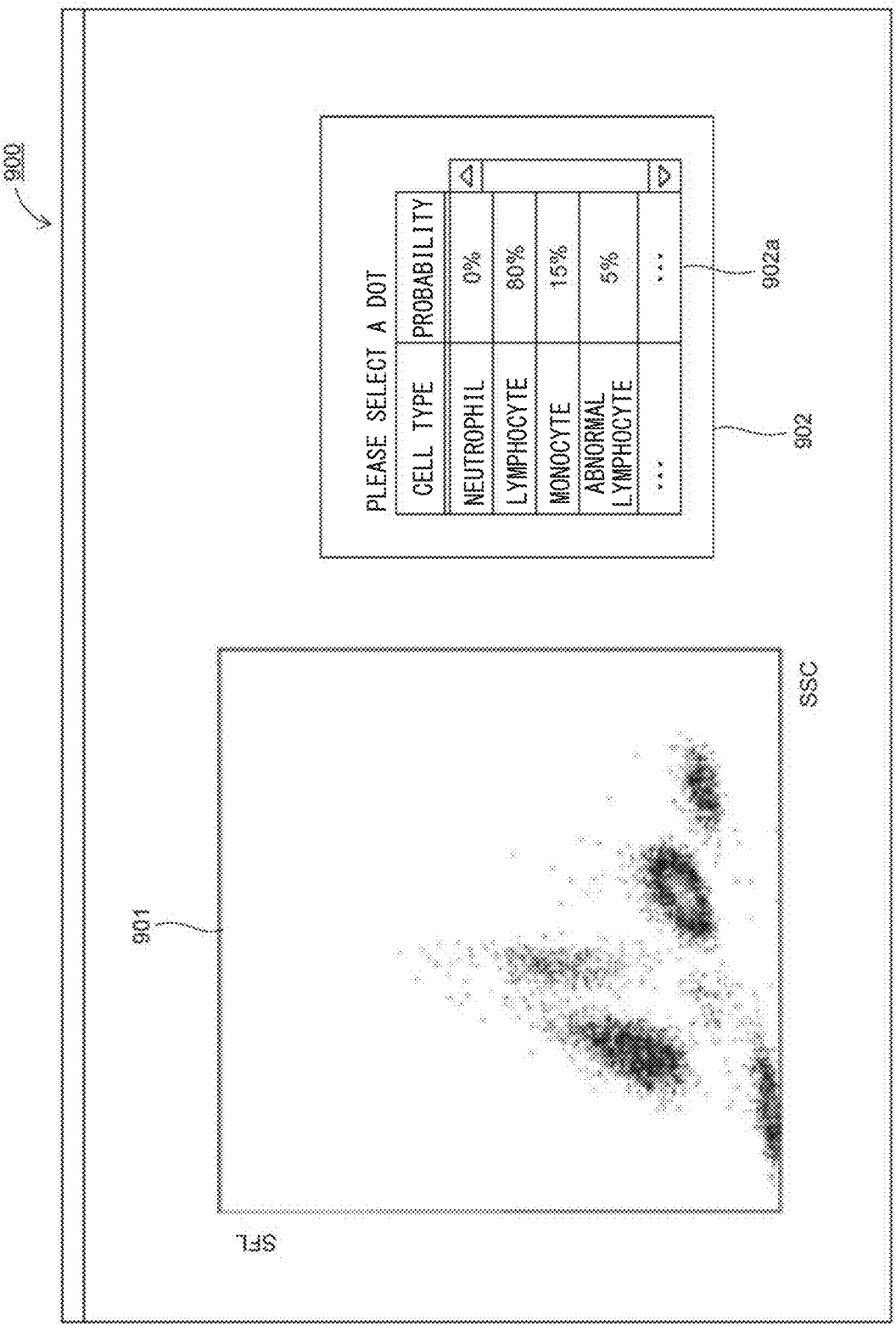
FIG. 21 shows an example of the analysis screen.

On the analysis screen 900 in FIG. 20, the classification information of a cell included in the selected dot is displayed in a pop-up manner. However, as shown in FIG. 21, the classification information display region 902*a* may be provided in the analysis screen 900. In this case, until a dot is selected, the classification information display region 902*a* remains blank, and upon selection of a dot, classification information of a cell corresponding to the selected dot is displayed in the classification information display region 902*a*.

In the above example, the detail display region 902 is displayed in a pop-up manner in response to an operation (e.g., double click) performed on a dot on the scattergram 901. However, the operation for calling the detail display region 902 can include various operations as long as the operation can specify a coordinate on the scattergram 901. For example, the detail display region 902 may be displayed simply by placing a cursor on the scattergram 901. In this case, placing the cursor on the scattergram 901 serves as an operation for calling the detail display region 902. Instead of a double click, the operation may be a long press, a right click, or pressing a predetermined key (e.g., Enter key) of a keyboard or a software key in a state where the cursor is placed on a coordinate.

According to the screens in FIG. 20 and FIG. 21, with reference to the classification information display region 902*a*, the user can confirm the classification information of the cell that corresponds to the dot selected on the scattergram 901. In addition, by changing the dot selected on the scattergram 901, the user can dynamically switch the display content of the classification information display region 902*a*, thereby being able to continuously confirm the display content.

In the classification information display region 902*a*, not limited to the probability for each cell type, another type of information may be displayed as the classification information. For example, when the test result data has the configuration shown in FIG. 13, the value of the main flag for each cell type may be displayed. When the test result data has the configuration shown in FIG. 14, a mark may be displayed at the main cell type (the cell type having the highest probability), or the main cell type may be separately displayed. When the test result data has the configuration shown in FIG. 15, the value of the research flag for each cell type may be displayed. When the test result data has the configuration shown in FIG. 16, the rank for each cell type may be displayed.

Figure 22:
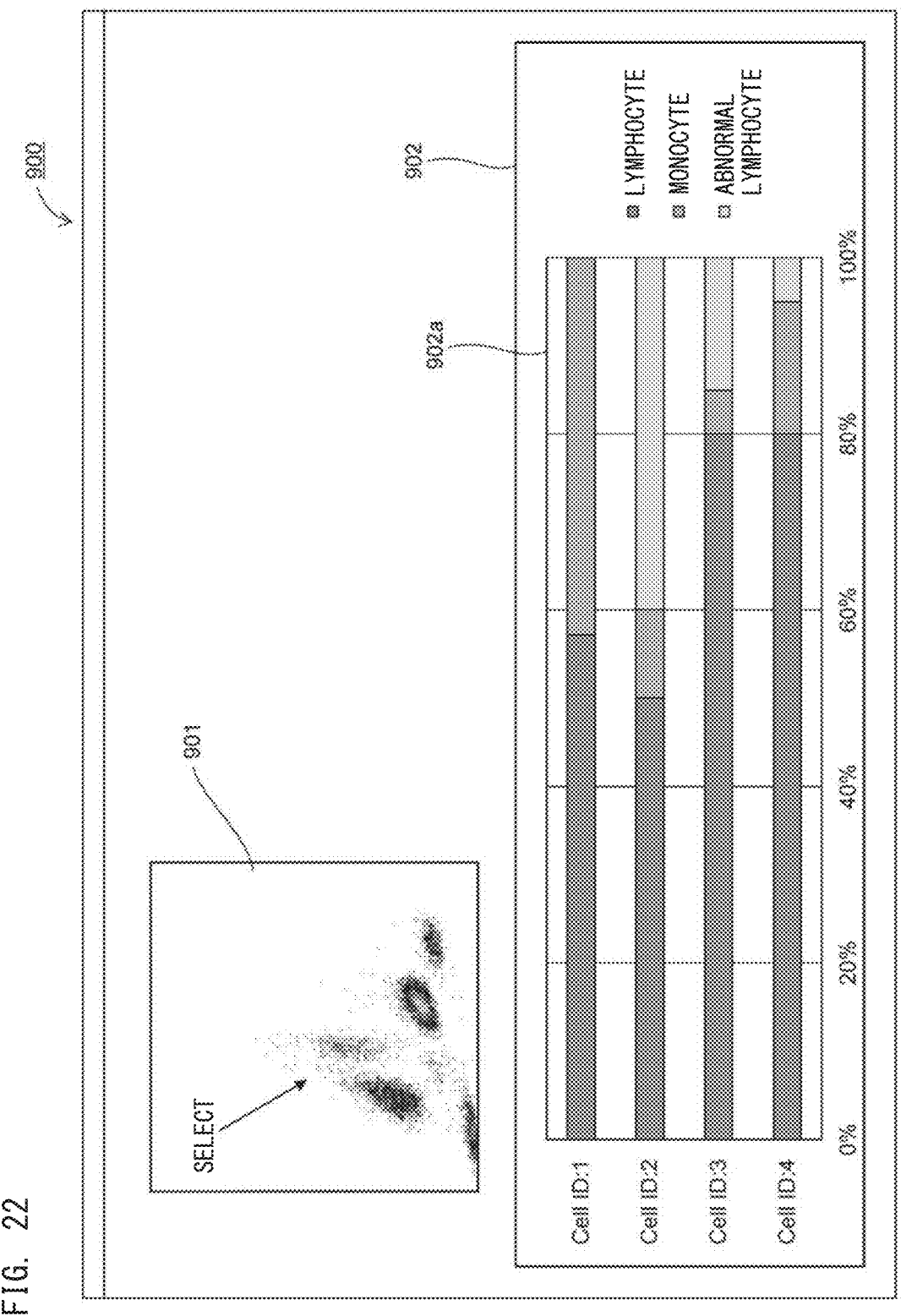
FIG. 22 shows an example of the analysis screen.
Figure 23:
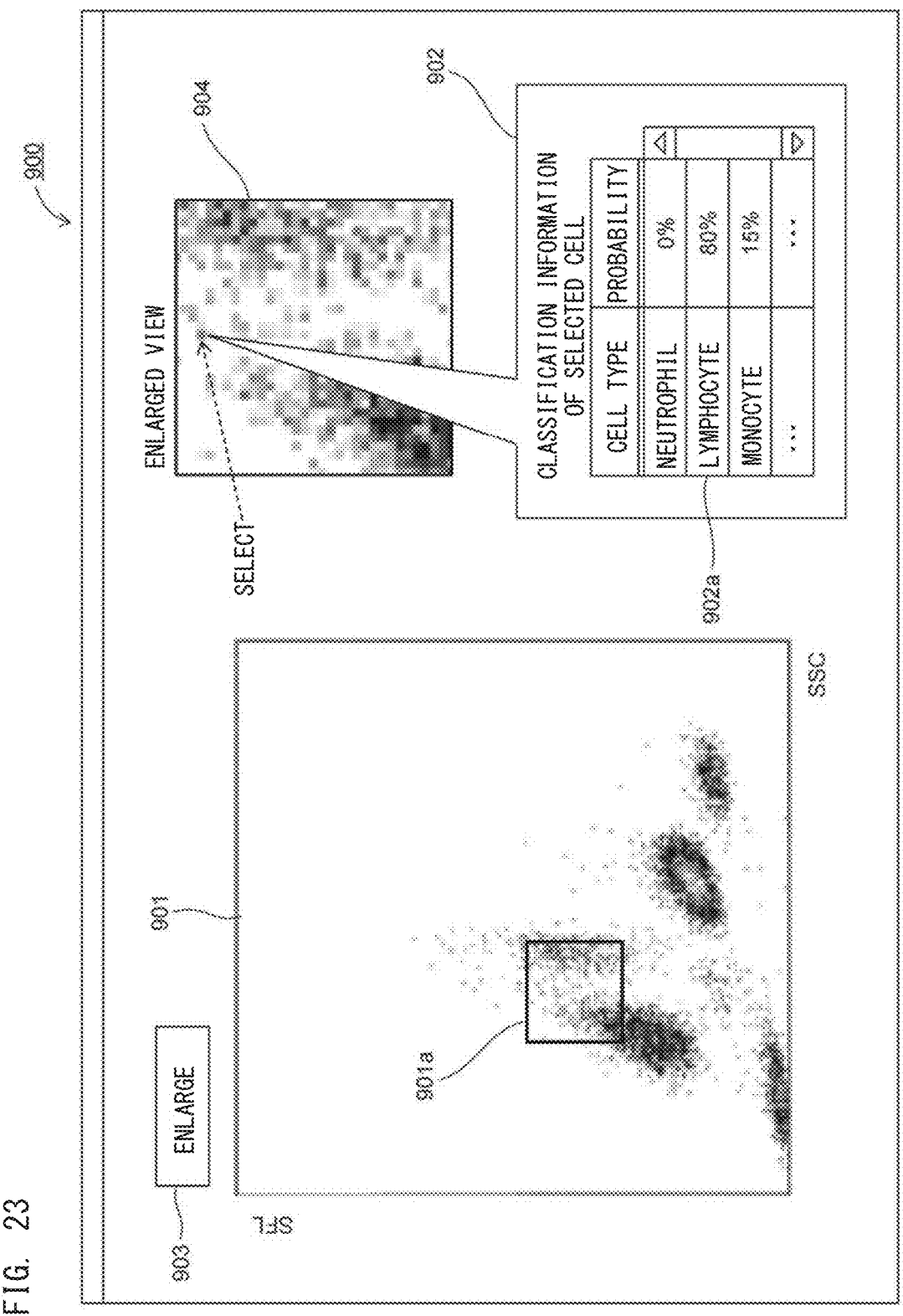
FIG. 23 shows an example of the analysis screen.

In FIG. 20 and FIG. 21, the probability for each cell type is displayed in terms of a numerical value. Instead of this, as shown in FIG. 22 and FIG. 23, a graph according to the probability for each cell type may be displayed. FIG. 22 shows another example of the analysis screen 900. In the example in FIG. 22, for each cell corresponding to the selected dot, probability information of the cell is displayed in the form of a percentage bar chart in the classification information display region 902*a*. This percentage bar chart is displayed so as to correspond to each cell ID, and is displayed such that the values of the probabilities for the respective pieces of identification information are accumulated to be a total of 100%. Accordingly, the user can visually understand the probability of each cell type.

FIG. 23 shows another example of the analysis screen 900. The scattergram 901, the detail display region 902, an enlargement button 903, and an enlarged view 904 are displayed on the analysis screen 900 in FIG. 23.

When the user has operated the enlargement button 903, a gate 901*a* for a reference range is displayed on the scattergram 901. The gate 901*a* is for selecting a desired dot on the scattergram 901 through range designation. The user can change the position of the gate 901*a* on the scattergram 901 by performing an operation such as dragging. In the enlarged view 904, a portion of the scattergram 901 in the gate 901*a* is displayed in an enlarged manner. When the user has performed an operation of selecting a dot on the enlarged view 904, the classification information of the selected cell is displayed in the classification information display region 902*a* in the detail display region 902, as in the cases of FIG. 20 and FIG. 21.

According to the screen in FIG. 23, the user can set the gate 901*a* on the scattergram 901 to cause the enlarged view 904 to be displayed, thereby being able to easily select the target cell in the enlarged view 904. Accordingly, with respect to a cell in a range where the dots of cells are densely present in the scattergram 901 as well, the classification information can be smoothly confirmed.

The size of the gate 901*a* may be changed by performing an operation such as dragging on the boundary line of the gate 901*a*. The size of the gate 901*a* may be changed stepwise every time an operation is performed on the enlargement button 903.

In each of FIG. 20 to FIG. 23, an example of selecting one dot on the scattergram 901 is shown. However, the number of dots selectable at one time is not limited to one. For example, a plurality of dots may be selected through range designation on the scattergram 901, by dragging a cursor while clicking a point on the scattergram 901. However, when a plurality of dots are selected at one time, the number of cells to be displayed may become too large. This may cause difficulty for the user to view the classification information when the classification information is individually displayed for each cell. Therefore, as will be later described with reference to FIG. 29, the display method may be switched in accordance with the number of selected dots. For example, when the number of selected dots is not greater than a predetermined threshold, pieces of the classification information of cells may be individually displayed, and when the number of selected dots is greater than the predetermined threshold, the classification information may be statistically displayed, instead of being individual displayed.

Figure 24:
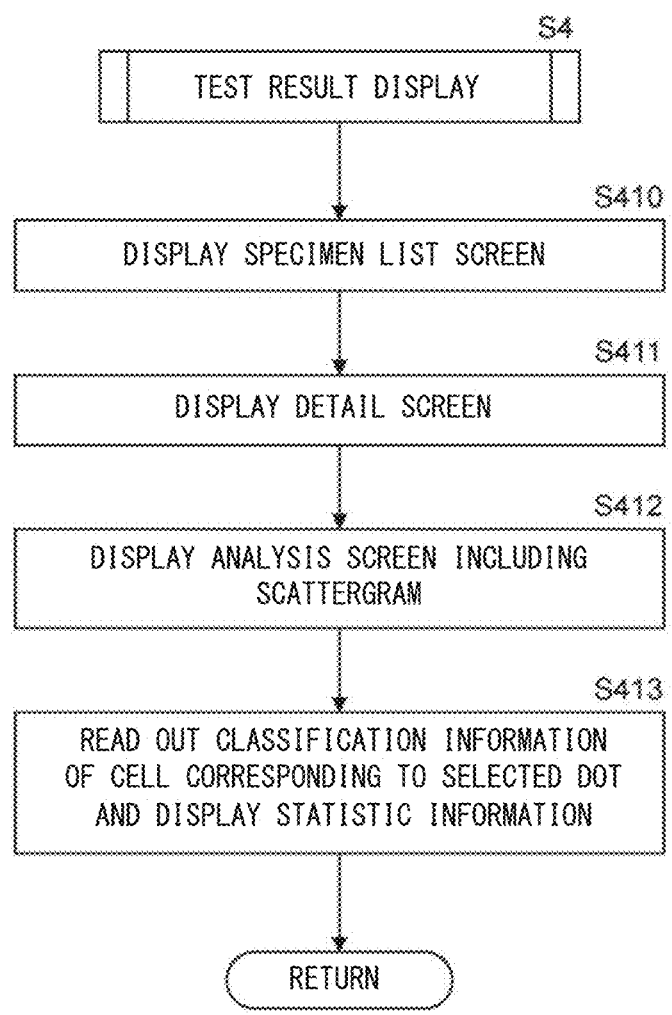
FIG. 24 is a flow chart of a second example of the test result displaying process.

FIG. 24 is a flow chart showing a second example of the test result displaying process. In FIG. 24, when compared with the flow chart in FIG. 17, step S413 has been changed. In step S413 in FIG. 24, the classification information of each of the cells corresponding to the dot selected on the scattergram 901 is read out, and is displayed as statistic information on the analysis screen 900.

In the first example of the test result displaying process in FIG. 17, as shown in the examples in FIG. 20 to FIG. 23, the classification information of each of cells corresponding to the selected dot is individually displayed for each cell. Instead of this, in the examples in FIG. 25 to FIG. 28 shown below, pieces of the classification information of a plurality of cells corresponding to the selected dot are aggregated, and statistic information is displayed. Examples of the analysis screen 900 are shown in FIG. 25 to FIG. 28.

Figure 25:
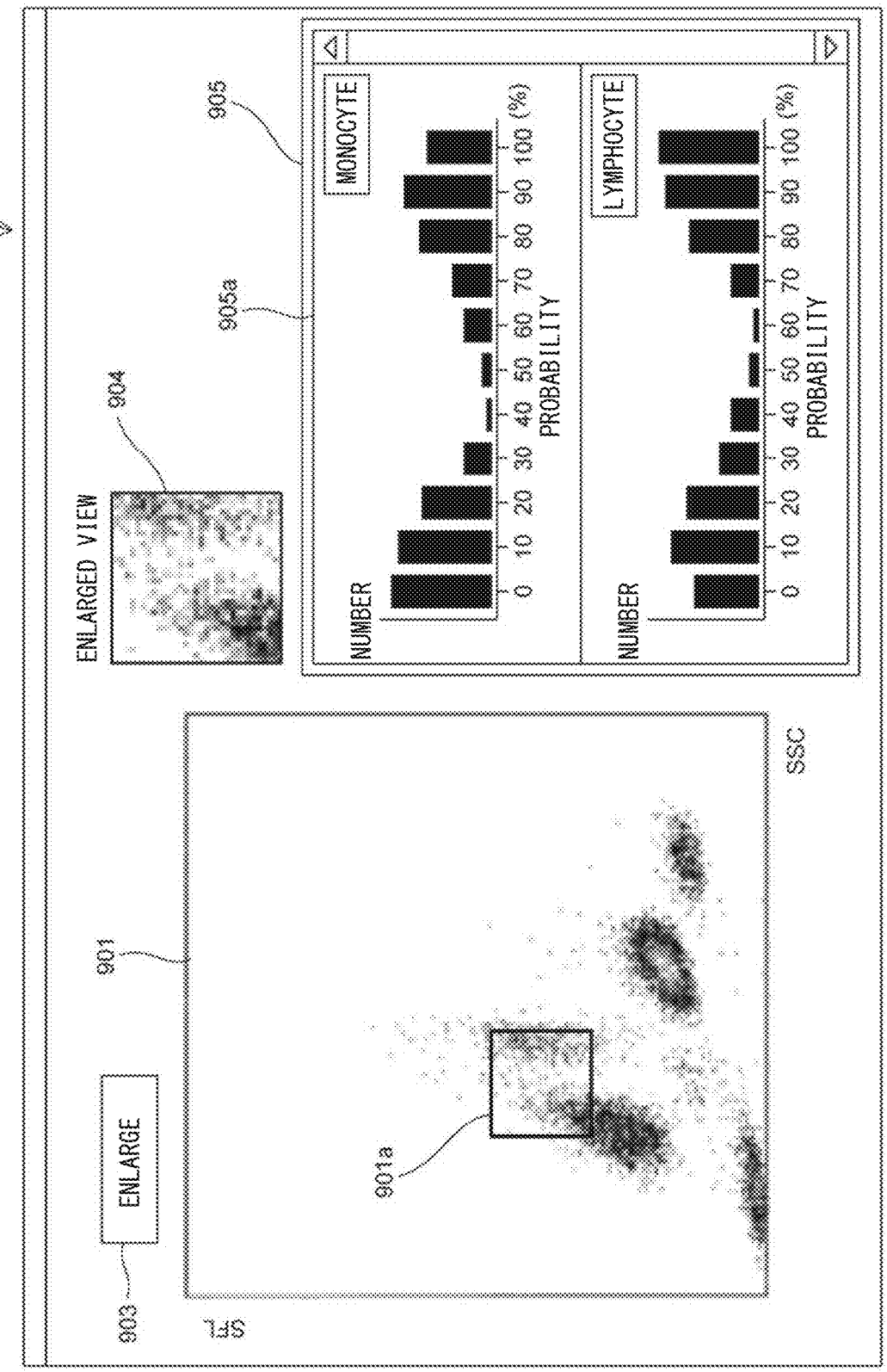
FIG. 25 shows an example of the analysis screen.

The scattergram 901, the enlargement button 903, the enlarged view 904, and a detail display region 905 are displayed on the analysis screen 900 in FIG. 25.

On the basis of the classification information of all of the cells in the gate 901a, statistic information of the probability and the number of cells for each cell type is displayed in the form of a histogram 905a in the detail display region 905. The histogram 905a is frequency distribution information obtained by subjecting all of the cells in the gate 901a to counting for each probability in the cell type. In the histogram 905a, the horizontal axis represents probability and the vertical axis represents the number of cells. The numbers shown in the histogram 905a include a counting result of cells that are not of the main cell type (cells that have a low probability of belonging to the cell type). The detail display region 905 is provided with a scroll bar for allowing display of the histogram 905a of all of the cell types by changing the display range in the detail display region 905.

According to the screen shown in FIG. 25, by causing the histogram 905a for each cell type to be displayed in the detail display region 905, the user can understand the distribution of the probabilities for each cell type, with respect to all of the cells in the gate 901a. For example, in the conventional clustering technique using a scattergram, there are cases where distribution ranges of a plurality of cell types overlap each other on the scattergram 901. In contrast to this, according to the present embodiment, when the gate 901a is set to such a range where the distributions overlap each other, and then the histogram 905a is referred to, the frequency distribution of each cell type can be confirmed. Accordingly, the user can perform detailed determination for the specimen, and, for example, can determine how much the cells of each cell type can be included in the range where the distributions overlap each other.

Figure 26:
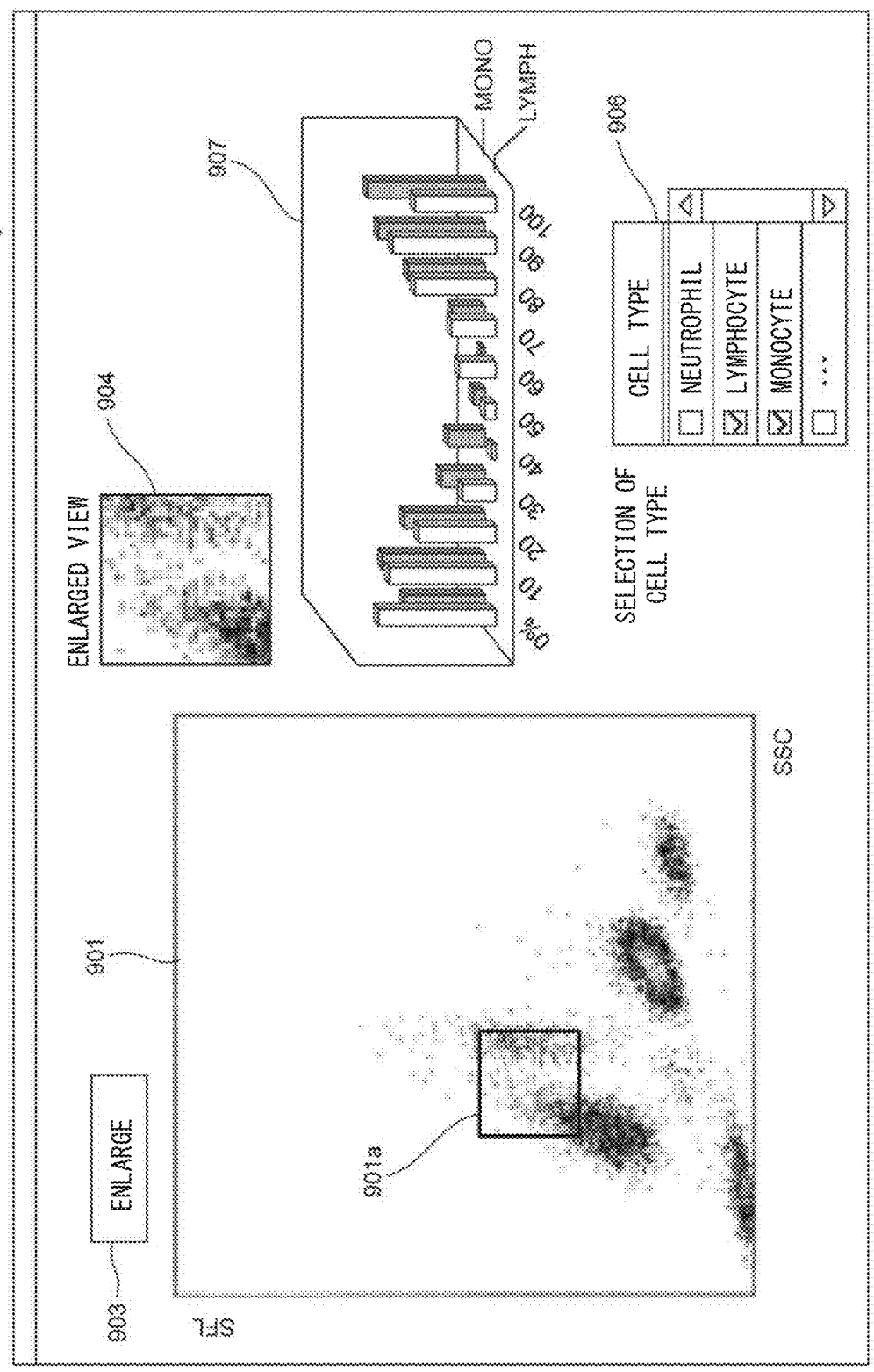
FIG. 26 shows an example of the analysis screen.

FIG. 26 shows another example of the analysis screen 900. The scattergram 901, the enlargement button 903, the enlarged view 904, a cell type selection region 906, and a three-dimensional histogram 907 as statistic information are displayed on the analysis screen 900.

The cell type selection region 906 is provided with check boxes for selecting cell types. The cell type selection region 906 is provided with a scroll bar for allowing display of all of the cell types by changing the display range in the cell type selection region 906. The three-dimensional histogram 907 is frequency distribution information obtained by subjecting all of the cells in the gate 901a to counting for each probability in a selected cell type. In the three-dimensional histogram 907, histograms for respective selected cell types are arranged in the front-rear direction so as to be displayed in a three-dimensional manner. In the example shown in FIG. 26, since lymphocyte and monocyte have been selected in the cell type selection region 906, a histogram of lymphocyte and a histogram of monocyte are displayed together in the three-dimensional histogram 907.

According to the analysis screen 900 in FIG. 26, by selecting two or more cell types and referring to the three-dimensional histogram 907, the user can simultaneously confirm the frequency distributions of the two or more cell types. In the example in FIG. 25, two histograms 905a are simultaneously displayed in the screen. However, in the example in FIG. 26, when three or more cell types are selected, three or more histograms are displayed in the screen. Thus, in the case of the screen in FIG. 26, when compared with the screen in FIG. 25, the user can simultaneously understand a greater number of frequency distributions. In addition, the user can easily compare the frequencies for each probability.

The three-dimensional histogram 907 in FIG. 26 is a histogram in which a plurality of the histograms 905a shown in FIG. 25 are arranged in the depth direction. However, instead of this, distribution states of probabilities of a plurality of cell types may be displayed in terms of surface plot, or the like.

Figure 27:
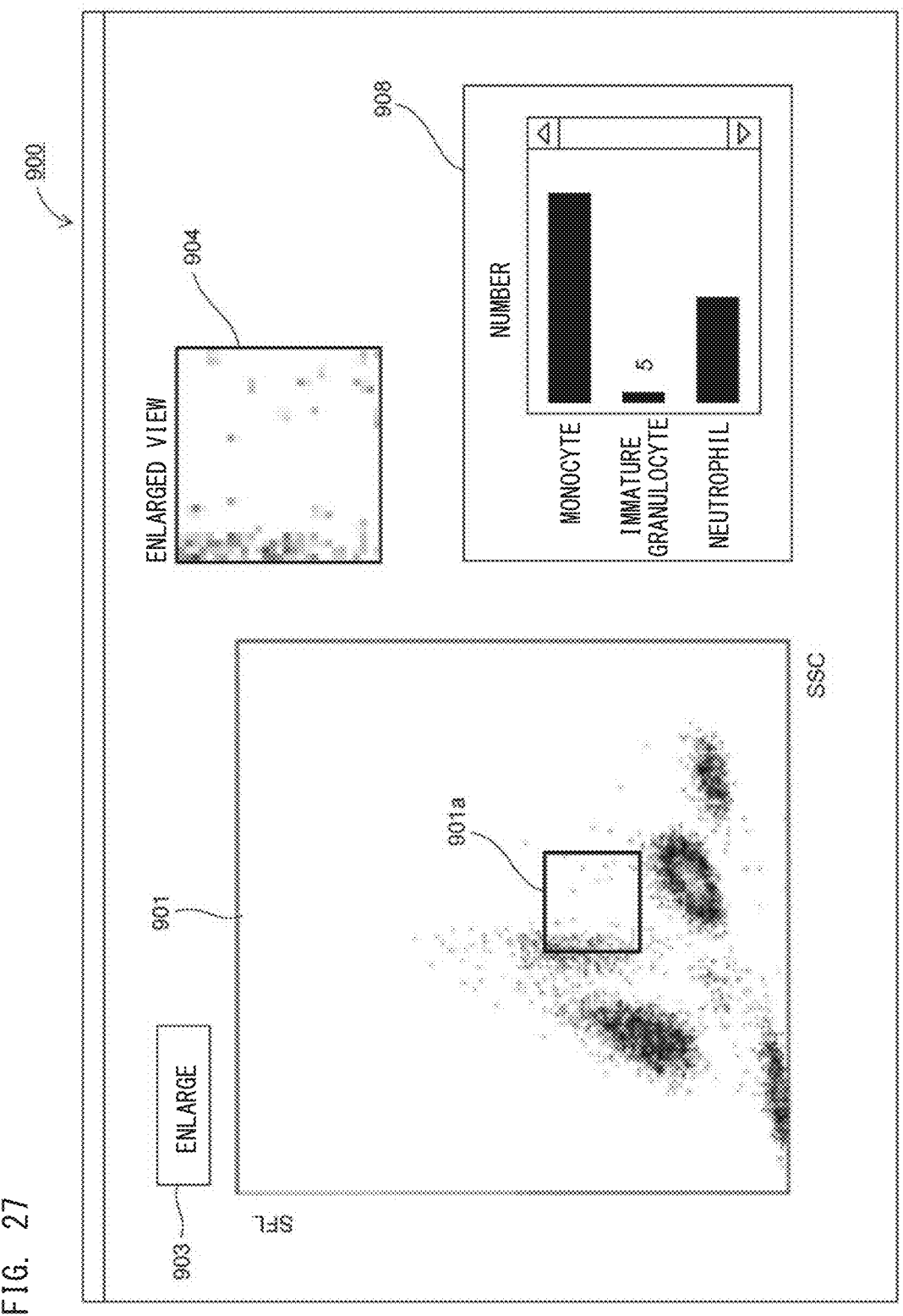
FIG. 27 shows an example of the analysis screen.

FIG. 27 shows another example of the analysis screen 900. The scattergram 901, the enlargement button 903, the enlarged view 904, and a number display region 908 are displayed on the analysis screen 900 in FIG. 27.

In the number display region 908, with respect to all of the cells in the gate 901a, a count value obtained by counting, for each cell type, cells that have a probability higher than 0% is displayed in the form of a bar graph as statistic information. In this case, a plurality of cells in the gate 901a are redundantly counted, and thus, the total of the count values in the number display region 908 becomes greater than the actual number of cells in the gate 901a. For example, it is assumed that one cell that has probability information of monocyte 90%, neutrophil 5%, and immature granulocyte 5% is included in the gate 901a in FIG. 27. In this case, this cell is counted as 1 for each of monocyte, neutrophil, and immature granulocyte. That is, when the probability of belonging to a plurality of cell types is 0% or higher, the number of the cell is redundantly counted for the plurality of cell types. The aggregation method is not limited thereto, and the number may be expressed by a decimal not greater than 1 in accordance with the probability. For example, as in the above example, when one cell that has probability information of monocyte 90%, neutrophil 5%, and immature granulocyte 5% is included in the reference range of the gate 901a, aggregation may be performed such that 0.9 monocyte, 0.05 neutrophil, and 0.05 immature granulocyte are considered to be included.

With respect to a bar graph in the number display region 908, when the counting result of the cell type is smaller than a predetermined threshold (e.g., less than 10), the count value of the cell type is added to the bar graph. In the example in FIG. 27, since the count value of immature granulocytes is five, "5" is added to the bar graph of immature granulocyte. The number display region 908 is provided with a scroll bar for allowing display of all of the cell types by changing the display range in the number display region 908.

According to the analysis screen 900 in FIG. 27, by referring to the number display region 908, the user can confirm the number of cells for each cell type in the gate 901*a*. Since a cell that has a probability exceeding a predetermined percentage is counted as one, this configuration is convenient when confirming a majority cell type and a minority cell type. A cell type that has a small count value in the number display region 908 is provided with a count value as auxiliary display so as to allow confirmation of the magnitude of the count value. Therefore, the count value of a cell type that has a small count value can be clearly confirmed. Accordingly, the user can smoothly determine a possibility that cells of a rare cell type can be included in the specimen.

In the number display region 908, a count value obtained by counting cells of a cell type having a probability higher than 0% is displayed. However, the threshold for counting is not limited to 0%, and a value greater than 0% and smaller than 100% may be set. A user interface (e.g., a probability selection region 910 in FIG. 31) that can receive a threshold for counting may be provided in the screen.

Figure 28:
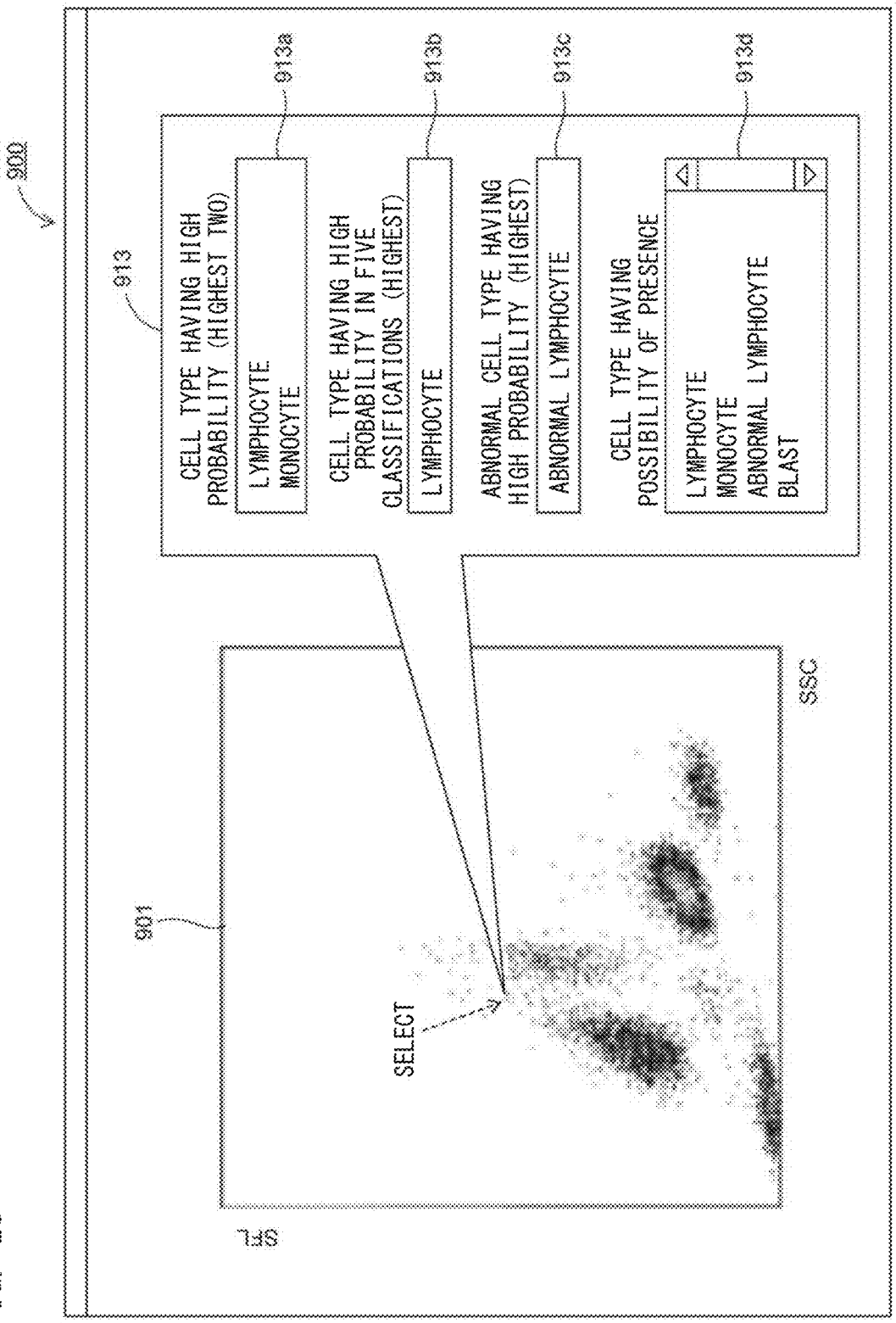
FIG. 28 shows an example of the analysis screen.

FIG. 28 shows another example of the analysis screen 900. The scattergram 901 and a detail display region 913 are displayed on the analysis screen 900.

When the user has performed an operation of selecting a dot on the scattergram 901, statistic information about a cell corresponding to the selected dot is displayed in the detail display region 913. The detail display region 913 has regions 913*a* to 913*d*. In the region 913*a*, with respect to one or a plurality of cells (hereinafter, "selected cell") plotted at the selected dot, the cell types that have the highest two probabilities are displayed. In a region 913*b*, with respect to the selected cell, the cell type that has the highest probability among the five classifications of white blood cells is displayed. In a region 913*c*, with respect to the selected cell, the abnormal cell type that has the highest probability is displayed. In the region 913*d*, with respect to the selected cell, cell types that may be present, i.e., cell types that have a probability higher than 0%, are displayed.

According to the analysis screen 900 in FIG. 28, by referring to the detail display region 913, the user can understand into what cell type the selected cell can be classified.

In the vicinities of the names of the cell types displayed in the regions 913*a* to 913*d*, the probabilities of the corresponding cell types may be additionally displayed. When the number of selected cells is one, the probability information of the corresponding cell can be displayed. When the number of selected cells is a plurality, a representative value of the probabilities of the cell types of the plurality of cells may be obtained and displayed. The representative value can be expressed in terms of the average value, the median, or the mode, for example. In the region 913*a*, only the cell type at the highest rank may be displayed, or cell types at the highest three or more ranks may be displayed. In the region 913*b*, 913*c*, cell types at the highest two or more ranks may be displayed. In the region 913*d*, cell types that have probabilities higher than a predetermined threshold may be displayed.

Figure 29:
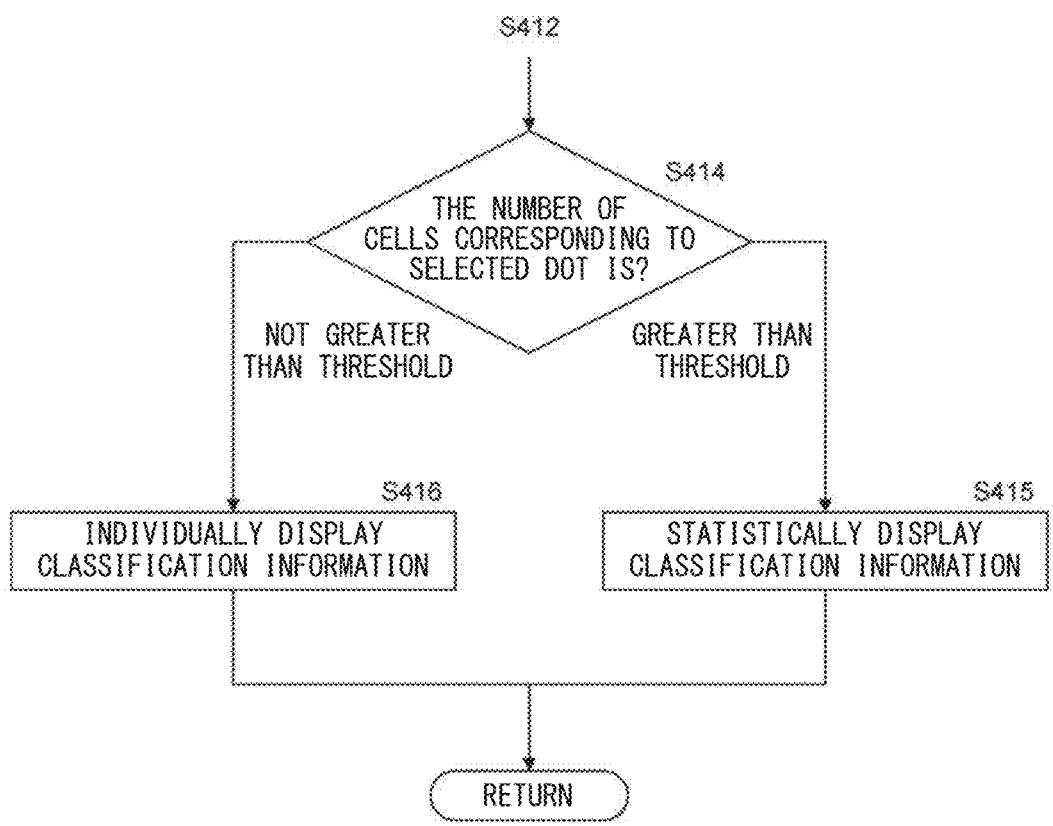
FIG. 29 is a flow chart of a third example of the test result displaying process.

FIG. 29 is a flow chart showing a third example of the test result displaying process. In step S414, the processor 3001 compares a threshold with the number of cells that correspond to the dot selected on the scattergram 901. When the number of cells is not greater than the threshold, the processor 3001 individually displays the classification information for each cell in step S416. The individual display of the classification information for each cell has been described with reference to FIG. 20 to FIG. 23. When the number of cells is greater than the threshold, the processor 3001 aggregates the classification information and displays statistic information in step S415. The display of statistic information has been described with reference to FIG. 25 to FIG. 28.

As described above, when a plurality of dots are selected at one time, or when a wide range for the gate 901*a* is set, the number of cells to be displayed may become too large. Thus, when the classification information is individually displayed for each cell, the visibility for the user may be impaired in some cases. Meanwhile, when the number of cells corresponding to the selected dot is small, individual display of the classification information of each cell may be suitable for the purpose of the user in some cases. For example, as in the case of the dot selected on the scattergram 901 in FIG. 28, a position away from the center of a cell cluster or a position where cell distribution is scarce has been selected by the user, the user may desire to analyze cells individually, not as a population. Therefore, in the example in FIG. 29, when the number of selected dots is not greater than a predetermined threshold, pieces of classification information of cells are individually displayed, and when the number of selected dots is greater than the predetermined threshold, the classification information is not individually displayed but statistically displayed. Accordingly, a screen having a high visibility for the user can be automatically provided.

Figure 30:
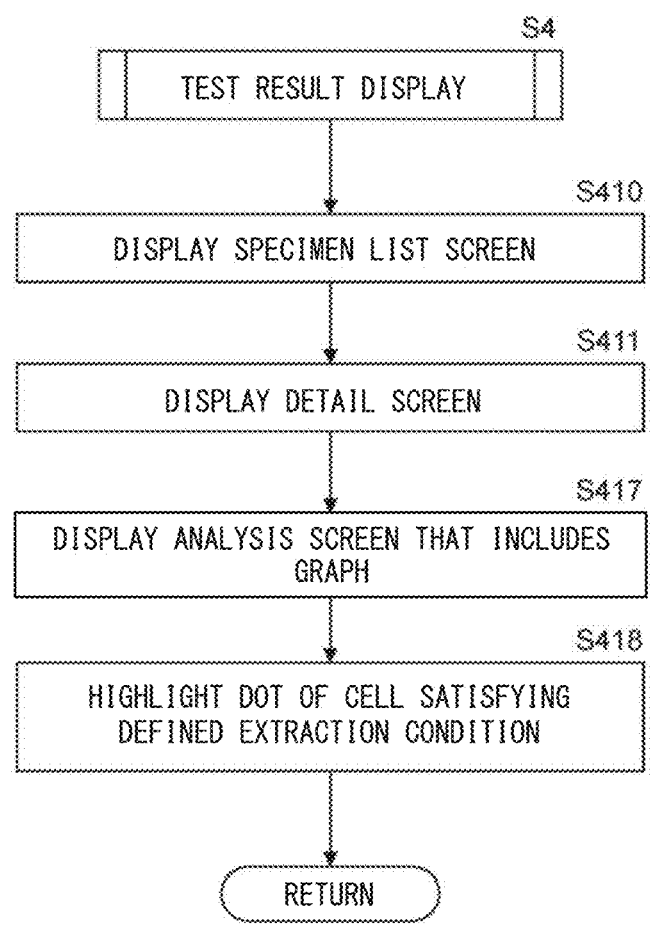
FIG. 30 is a flow chart of a fourth example of the test result displaying process.

FIG. 30 shows a fourth example of the test result displaying process. In the first example to third example of the test result displaying process described above, when a dot of a target cell is selected on the scattergram 901, the classification information of the cell corresponding to the dot is displayed. In the examples in FIG. 31 to FIG. 38 described below, the analysis screen 900 that includes a graph is displayed (step S417), and dots of cells that satisfy a defined extraction condition are highlighted (step S418). In step S418, selection of a dot is not performed on the scattergram 901. Instead, when the user has defined a condition for a cell to be extracted, cells that satisfy the condition are extracted and displayed in the graph.

Figure 31:
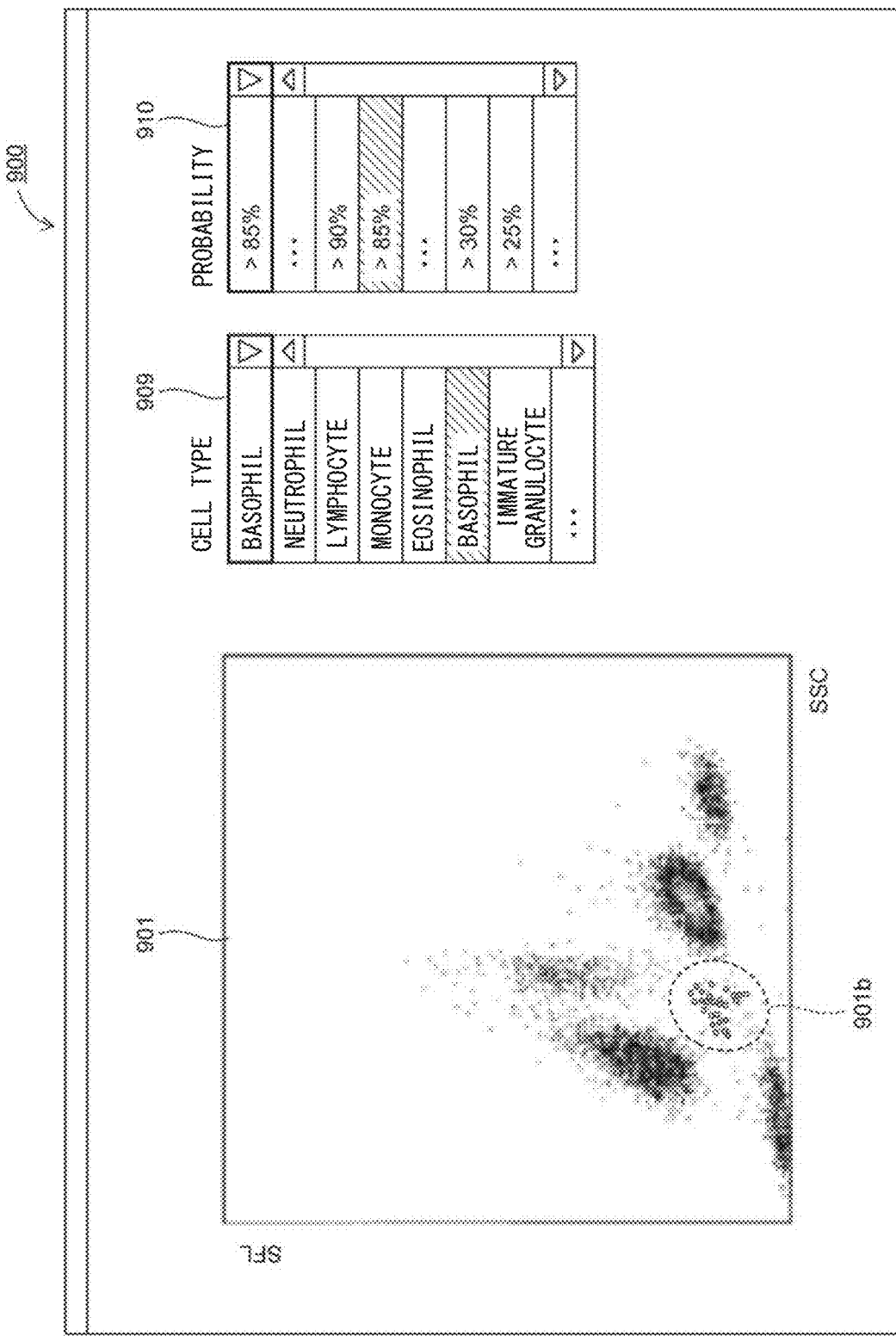
FIG. 31 shows an example of the analysis screen.

FIG. 31 shows another example of the analysis screen 900. The scattergram 901, a cell type selection region 909, and a probability selection region 910 are displayed on the analysis screen 900.

The cell type selection region 909 and the probability selection region 910 are each implemented as a so-called pull-down menu. The cell type selection region 909 is configured such that one cell type can be selected from among all the cell types that correspond to the measurement channel (in FIG. 31, the WDF channel) selected by the user. In the probability selection region 910, numerical values of probability, as choices, are displayed so as to be selectable at a 5% interval in a range of 0% to 100%. Specifically, the probability selection region 910 is configured such that a character string composed of an equal sign or an inequality sign and a probability, such as "=100%", ">95%", ">90%", . . . , ">5%", ">0%", or "=0%", can be selected.

When the user has selected a target cell type in the cell type selection region 909 and has selected a probability in the probability selection region 910, a corresponding dot on the scattergram 901 is highlighted. In the example shown in FIG. 31, basophil has been selected as the cell type, and ">85%" has been selected as the probability. In this case, dots (dots in a region 901b) of cells for which the probability of being basophil is higher than 85% are highlighted on the scattergram 901. The method of highlighting may be any display method that can distinguish the extracted dot from the other dots, such as displaying the dot in a color different from the colors for the other dots, displaying the contour of the dot in an emphasized manner, or blinking the dot, for example.

According to the screen in FIG. 31, by defining the target cell type and probability as the extraction condition, the user can understand the position of the cell that matches the condition on the scattergram 901. Therefore, the user can understand which position on the conventional scattergram 901 the cell classified according to the classification information (cell type and probability) is present at. This information can be used as a material when the accuracy of classification according to the classification information is determined, for example.

Figure 32:
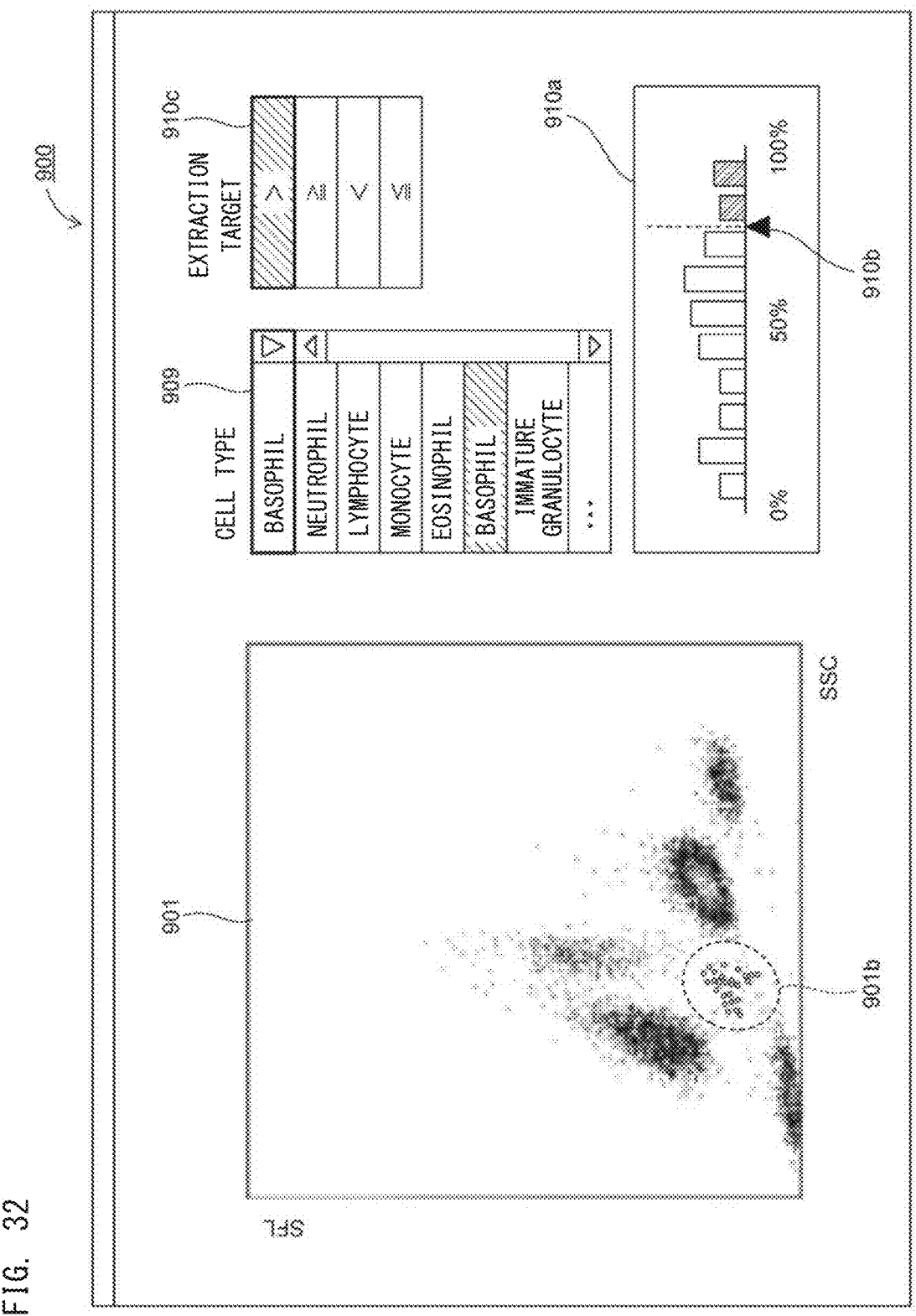
FIG. 32 shows an example of the analysis screen.

FIG. 32 shows another example of the analysis screen 900. The analysis screen 900 in FIG. 32 includes a scale bar 910a for selecting a numerical value of probability and an extraction target selection region 910c, instead of the probability selection region 910. The scale bar 910a includes a pointer 910b slidable in the left-right direction. The user can select a desired percentage in the range of 0% to 100% by moving the pointer 910b in the left-right direction. In the extraction target selection region 910c, an inequality sign combined with the percentage selected by the scale bar 910a is displayed so as to be selectable. For example, as shown in FIG. 32, when basophil is selected as the cell type in the cell type selection region 909, the pointer 910b is placed at the position of 80% in the scale bar 910a, and ">" is selected in the extraction target selection region 910c, the extraction condition is set as "probability of basophil >80%". In the scattergram 901, dots of cells that satisfy the extraction condition of "probability of basophil >80%" are highlighted.

When the user moves the pointer 910b in the scale bar 910a, the numerical range of percentage included in the extraction condition is continuously (stepwise) changed in association therewith. When the extraction condition has been changed, dots extracted on the scattergram 901 are dynamically changed, accordingly.

For example, when the pointer 910b is caused to slide rightward from the state shown in FIG. 32, the extraction condition is changed from "probability of basophil >80%" to "probability of basophil >85%". Due to this change in the extraction condition, dots of cells highlighted on the scattergram 901 are also dynamically changed from those corresponding to "probability of basophil >80%" to those corresponding to "probability of basophil >85%". That is, the number of dots highlighted decreases. Conversely, when the pointer 910b is caused to slide leftward, the extraction condition is changed from "probability of basophil >80%" to "probability of basophil >75%". Due to this change in the extraction condition, dots of cells highlighted on the scattergram 901 are also dynamically changed from those corresponding to "probability of basophil >80%" to those corresponding to "probability of basophil >75%". That is, the number of dots displayed in a highlighted manner increases.

Thus, when the user causes the pointer 910b of the scale bar 910a to slide, thereby continuously changing the extraction condition, and, in association therewith, the user causes the highlight display of dots of cells that match the extraction condition displayed on the scattergram 901 to be dynamically changed, the user can easily understand at which position on the scattergram 901 the target cell is present.

Figure 33:
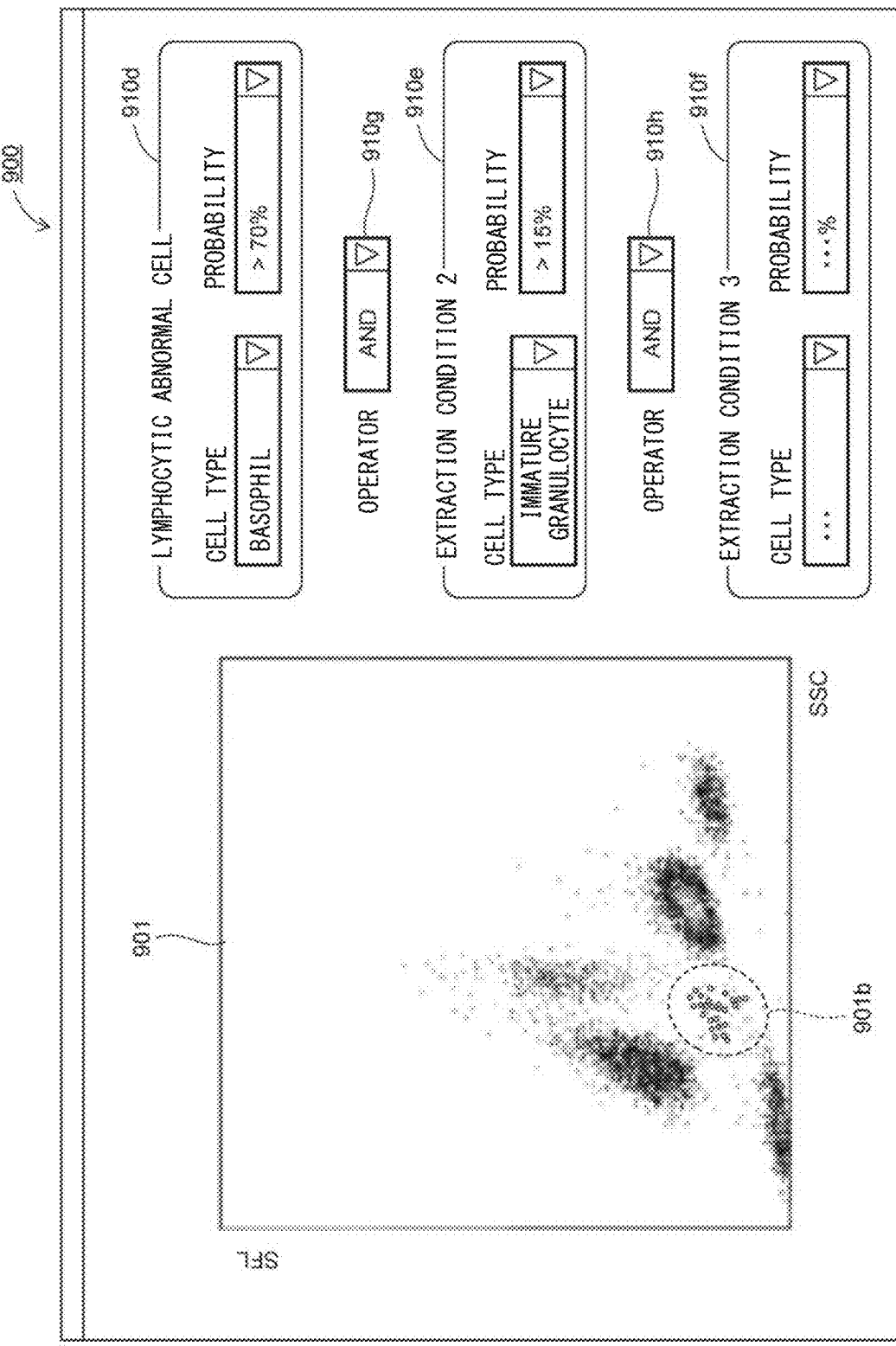
FIG. 33 shows an example of the analysis screen.

FIG. 33 shows another example of the analysis screen 900. FIG. 33 shows another example regarding setting of the extraction condition. The analysis screen 900 in FIG. 33 includes condition setting regions 910d, 910e, 910f for respectively setting an extraction condition 1, an extraction condition 2, and an extraction condition 3. The condition setting regions 910d, 910e, 910f each include pull-down menus that respectively correspond to the cell type selection region 909 and the probability selection region 910 shown in FIG. 31. Two operator setting regions 910g, 910h are provided between the condition setting regions 910d, 910e, 910f. The operator setting regions 910g, 910h are each at the extraction conditions 1 to 3. Choices of the logical operator are "AND", "OR", "NOT", and the like. In the example in FIG. 33, the logical operators are each "AND".

When the extraction conditions 1 to 3 are defined in the respective condition setting regions 910d, 910e, 910f, and logical operators are set in the operator setting regions 910g, 910h, a complex condition in which the extraction conditions 1 to 3 are combined by the logical operators is defined. In the scattergram 901, dots (dots in the region 901b) of cells that satisfy the defined complex condition are highlighted. As in the example in FIG. 33, since cells are extracted not using a single extraction condition obtained as a one-to-one combination of cell type and probability, but using a complex condition obtained through a combination of a plurality of extraction conditions, more detailed extraction condition setting can be realized.

Figure 34:
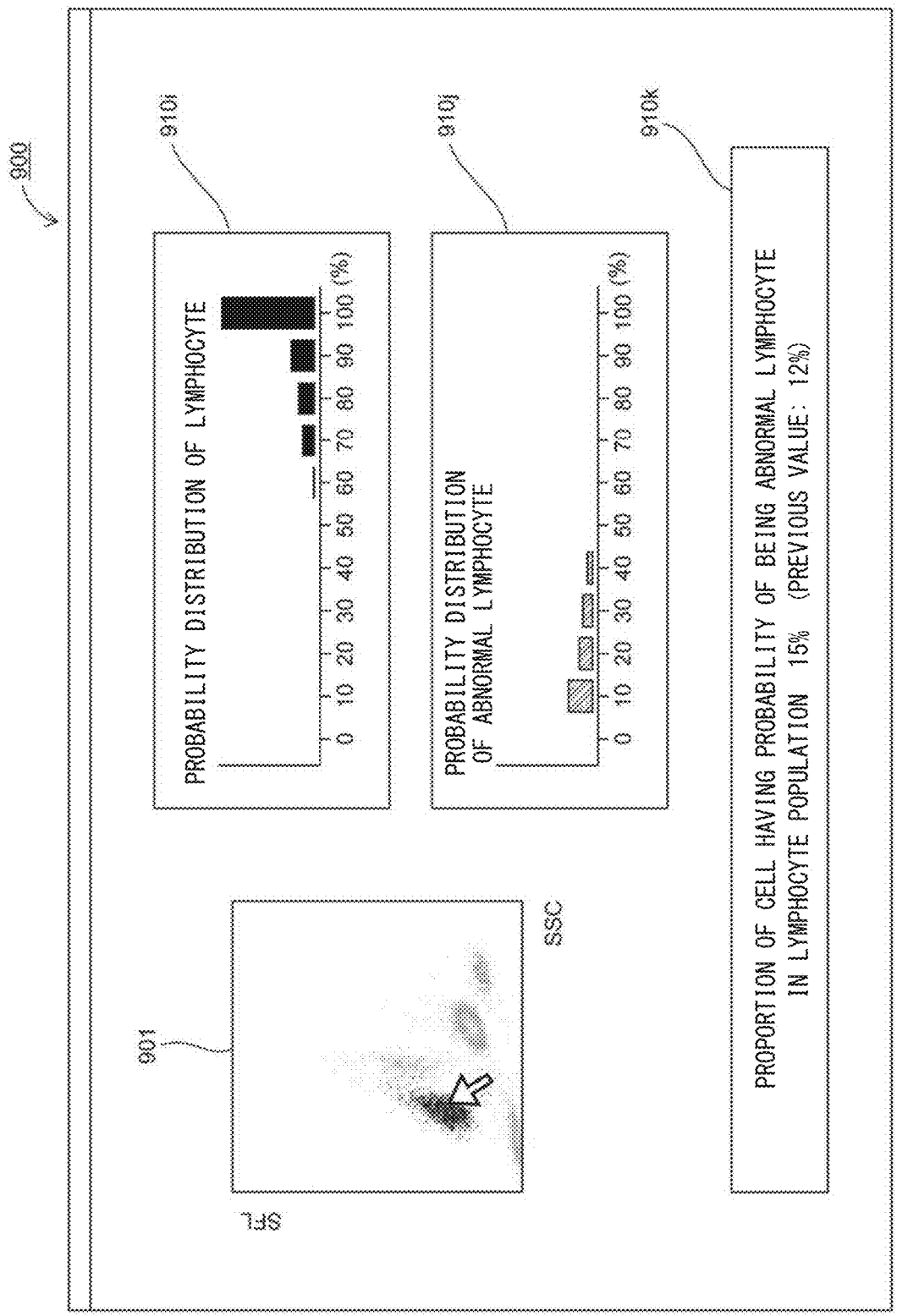
FIG. 34 shows an example of the analysis screen.

FIG. 34 shows another example of the analysis screen 900. The scattergram 901, a first histogram 910i, a second histogram 910j, and a display region 910k are displayed on the screen in FIG. 34.

In the example shown in FIG. 34, only the scattergram 901 is displayed as default on the analysis screen 900. The user can select a specific type of cell population on the displayed scattergram 901. For example, when the user has placed a cursor on a specific cell population on the scattergram 901, the cell population is selected.

FIG. 34 shows a state where a population of lymphocytes has been selected. When a specific type of cell population has been selected, the first histogram 910i showing the probability distribution of the selected cell population, and the second histogram 910j showing the probability distribution regarding abnormal cells that correspond to the selected cell population are displayed on the analysis screen 900. The first histogram 910i and the second histogram 910j are each similar to the histogram 905a in FIG. 25, for example, and indicates the number of cells with respect to the axis representing the probability. Abnormal cells corresponding to the selected cell population mean abnormal cells that are morphologically similar to the selected cell population. The abnormal cells are determined on the basis of a correspondence relationship determined in advance, in accordance with the selected cell population. For example, when lymphocyte has been selected, the abnormal cells can be abnormal lymphocytes or blasts. For example, when monocyte has been selected, the abnormal cells can be blasts. For example, when eosinophil or basophil has been selected, the abnormal cells can be immature granulocytes.

In the example in FIG. 34, when a specific cell population has been selected, cells that have probabilities of being abnormal cells corresponding to the selected cell population are extracted, and the distribution of the probabilities is displayed as the second histogram 910j. When the user compares the probability distribution of the selected cell population with the probability distribution of abnormal cells, the user can understand how close to 100% the probability distribution of the selected cell population is. Conversely, the user can statistically understand how many cells that have probabilities of being abnormal cells are included in the selected cell population.

The analysis screen 900 in FIG. 34 includes the display region 910k that displays an indicator based on statistic information, in addition to the first histogram 910i and the second histogram 910j. In the display region 910k, "In the lymphocyte population, the proportion of cells that have probabilities of being abnormal lymphocytes is 15% (previous value: 12%)." is displayed, for example. That is, the proportion of cells that have the selected cell population as the parent population and that have probabilities of being corresponding abnormal cells is displayed as an indicator in the display region 910k.

In the example in FIG. 34, the sample with respect to the parent population is defined as "cells that have probabilities of being abnormal cells". However, the definition of the sample is not limited thereto. For example, the sample may be defined as "cells that are in the second highest rank in which the cells have probabilities of being abnormal cells. In this case, only cells that have higher probabilities of being abnormal cells can be extracted so as to calculate an indicator, which may lead to reduction of noise. The indicator is not limited to a quantitative indicator such as a proportion, and may be a qualitative indicator that indicates the level stepwise in accordance with the absolute number of cells that have probabilities of being abnormal cells.

In the example in FIG. 34, the number or proportion of cells that have probabilities of being abnormal cells can be easily understood with respect to a specific cell population. The configurations in FIG. 25 to FIG. 28 described above are advantageous in that the user can designate a specific cell or cell population on the scattergram 901 as desired. However, in those configurations, it may be difficult for the user to designate only a specific cell population on the scattergram 901. When a cell present at the circumference of a cluster is also at an adjacent cluster or is separated from a cluster, such designation may be especially difficult. In the example in FIG. 34, simply by placing a cursor on a specific cell population on the scattergram 901, e.g., simply by placing a cursor on a population of lymphocytes, a cell population that has lymphocytes as main cells can be selected. In addition, cells that have probabilities of being abnormal lymphocytes, which are abnormal cells that correspond to lymphocytes, are automatically extracted, and a probability distribution and an indicator are displayed. Therefore, the user can easily recognize how many cells that have probabilities of being abnormal cells are included although the main cells are normal cells.

Figure 35:
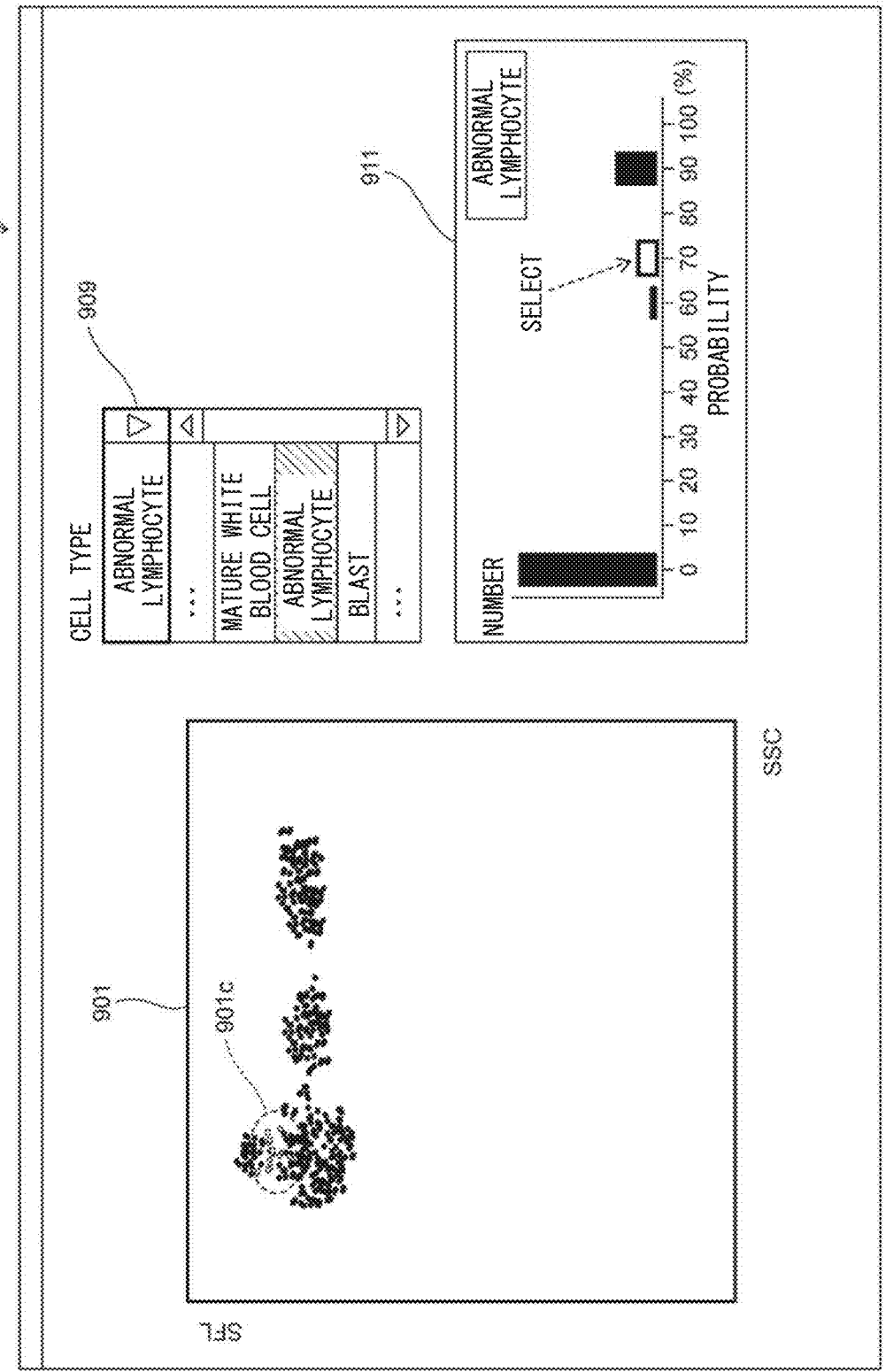
FIG. 35 shows an example of the analysis screen.

FIG. 35 shows another example of the analysis screen 900. The scattergram 901, the cell type selection region 909, and a histogram 911 are displayed on the screen in FIG. 35.

FIG. 35 shows an example in which the WPC channel has been designated as the measurement channel to be displayed. Therefore, the scattergram 901 is displayed on the basis of the feature parameters of all of the cells that correspond to the measurement channel, and the cell type selection region 909 is configured such that, as the cell types to be displayed, all cell types, such as mature white blood cell, abnormal lymphocyte, and blast, that are associated with the WPC channel can be selected.

When the user has performed an operation of selecting a cell type in the cell type selection region 909, the histogram 911 is displayed on the basis of the selected cell type. The histogram 911 is frequency distribution information obtained by counting cells of the selected cell type for each probability. In the histogram 911, the horizontal axis represents probability and the vertical axis represents the number of cells. When the user has performed an operation of selecting a bar graph on the histogram 911, corresponding dots (dots in a region 901c) on the scattergram 901 are highlighted. In the example shown in FIG. 35, abnormal lymphocyte has been selected as the cell type, and the bar graph of a probability of 70% has been selected. In this case, dots of cells (cells distributed near the region 901c) for which probabilities of being abnormal lymphocytes are on the order of 70% are highlighted on the scattergram 901.

According to the analysis screen 900 in FIG. 35, similar to the analysis screens 900 in FIG. 31 to FIG. 33, when the user selects a cell type and a probability, the user can understand the position of each cell that matches the condition on the scattergram 901. Therefore, the user can understand at which position on the conventional scattergram 901 the cell classified according to the classification information (cell type and probability) is present.

In the examples in FIG. 31 to FIG. 35 described above, dots of cells that satisfy an extraction condition composed of a combination of a cell type and a probability are displayed on the scattergram 901. Instead of the scattergram 901, the number of cells that satisfy the extraction condition may be displayed in terms of a histogram as shown in FIG. 36 to FIG. 38.

Figure 36:
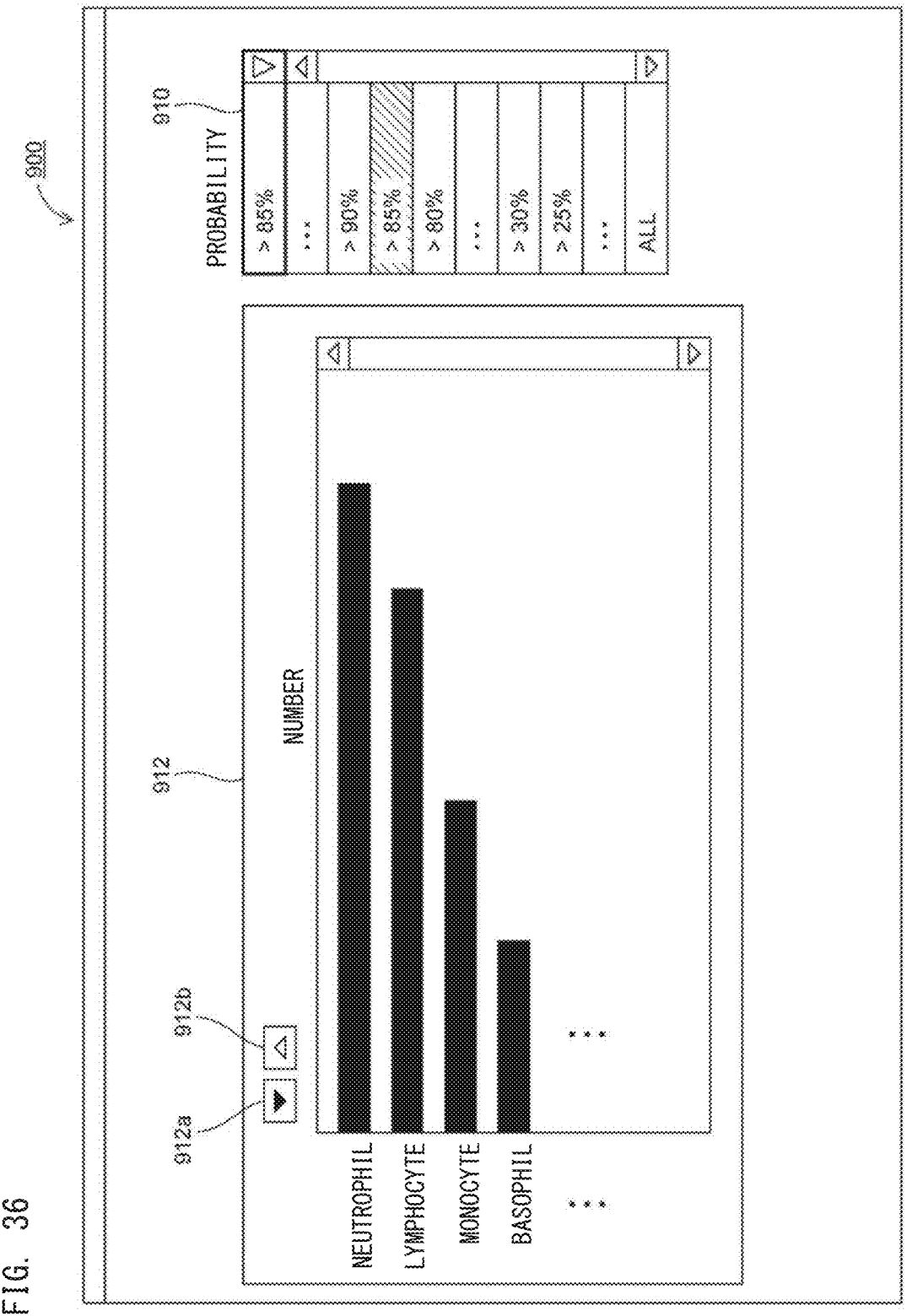
FIG. 36 shows an example of the analysis screen.
Figure 37:
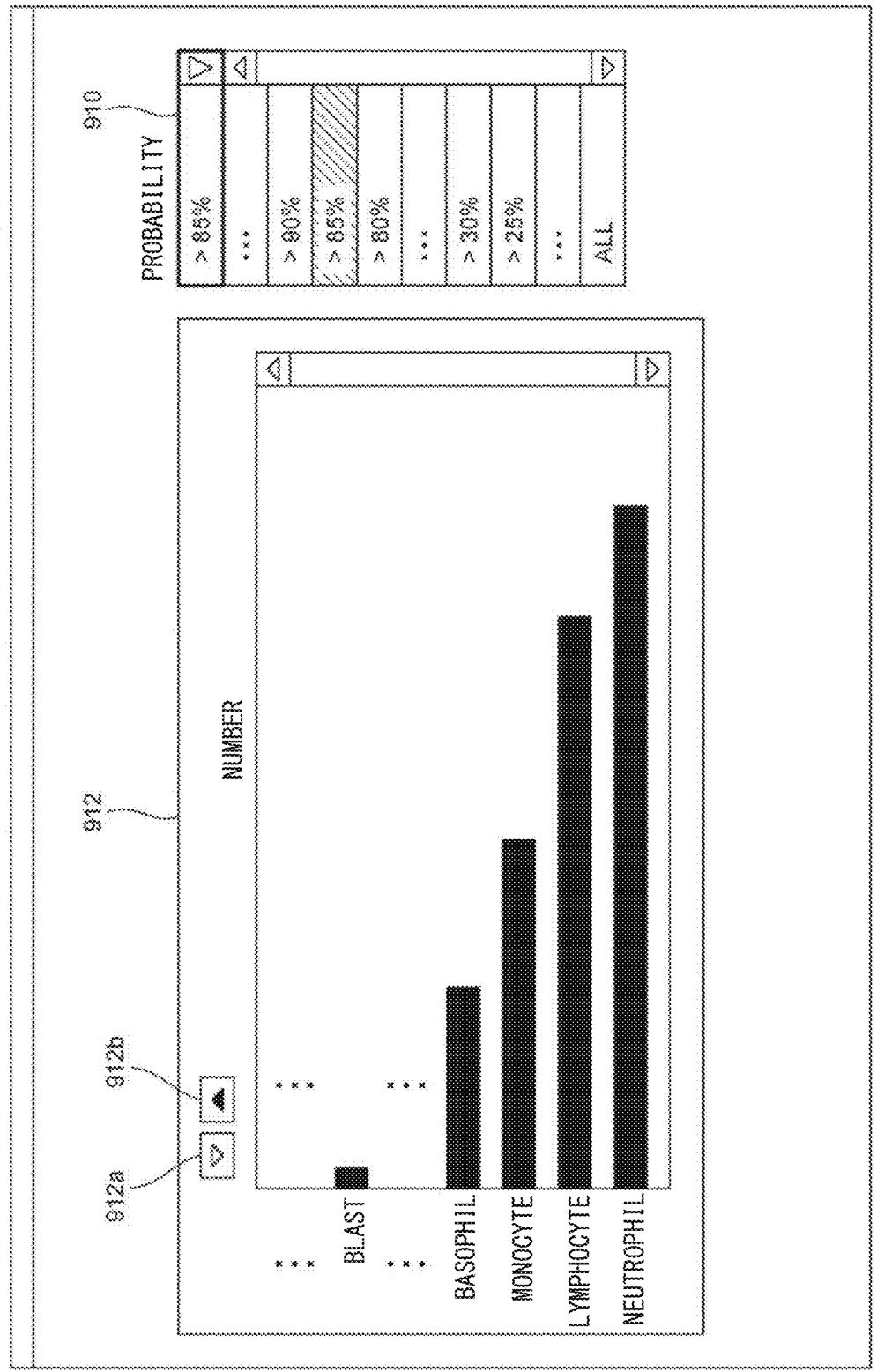
FIG. 37 shows an example of the analysis screen.
Figure 38:
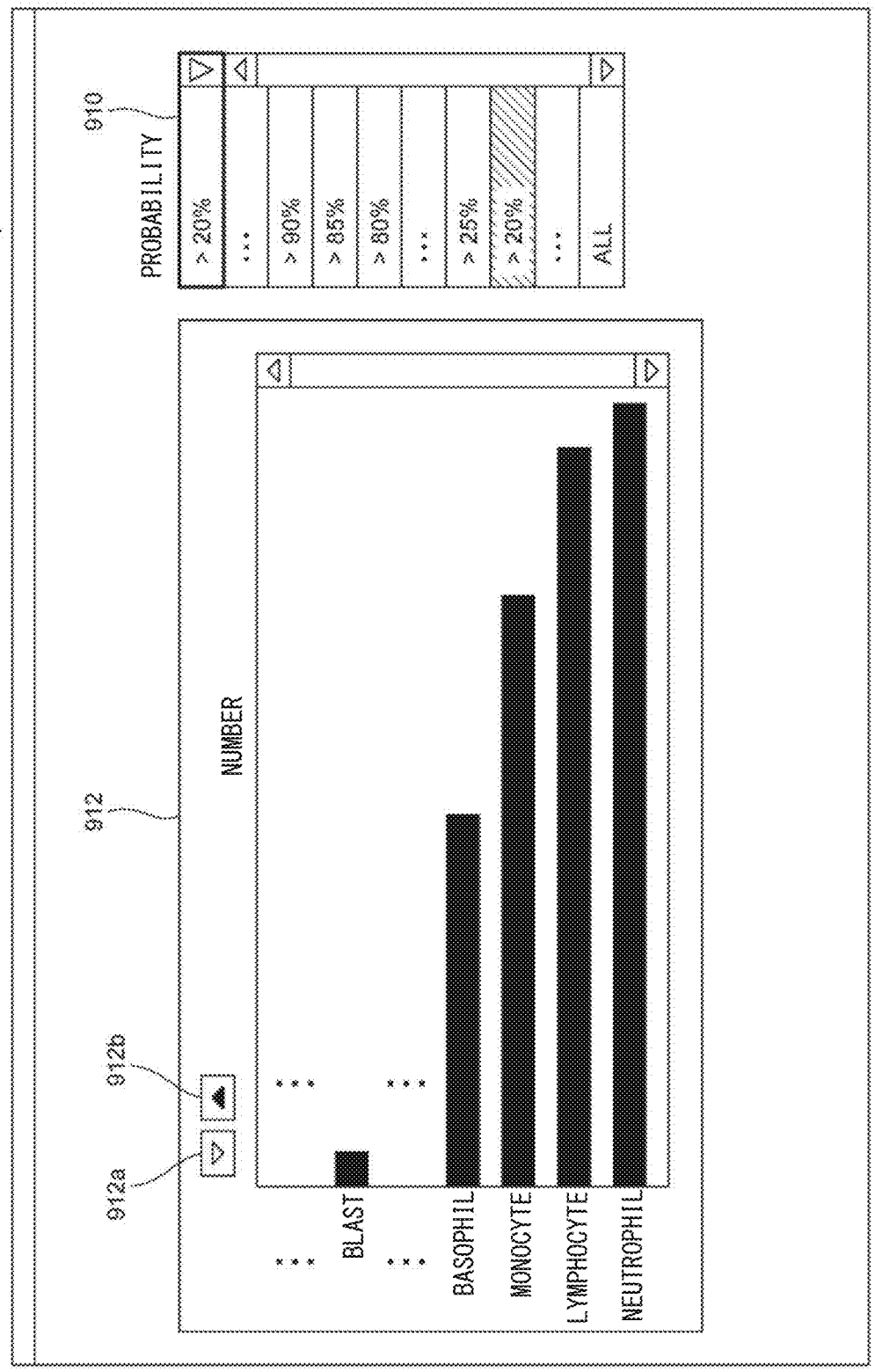
FIG. 38 shows an example of the analysis screen.

The probability selection region 910 and a number display region 912 are displayed on the analysis screens 900 in FIG. 36 to FIG. 38.

On the analysis screen 900 in FIG. 36, when the user has performed an operation of selecting a probability in the probability selection region 910, the number of cells corresponding to the probability selected in the probability selection region 910, among all of the cells corresponding to the target measurement channel, is displayed for each cell type in the number display region 912. The number display region 912 is provided with a descending order button 912a for performing setting such that cell types are arranged downwardly staring from the cell type having the greatest number; and an ascending order button 912b for performing setting such that cell types are arranged downwardly starting from the cell type having the smallest number. FIG. 36 shows a state where the descending order button 912a has been operated. FIG. 37 shows a state where the ascending order button 912b has been operated. FIG. 38 shows a state where, on the screen in FIG. 37, ">20%" has been set as a probability condition.

According to the screens in FIG. 36 to FIG. 38, after the user has selected a probability in the probability selection region 910, the user can, by operating the descending order button 912a, set display of the number display region 912 such that the numbers are arranged in a descending order as shown in FIG. 36, and the user can, by operating the ascending order button 912b, set display of the number display region 912 such that the numbers are arranged in an ascending order as shown in FIG. 37. Accordingly, among the cell types corresponding to the probability of the selected condition, the user can smoothly confirm a cell type of which the number of cells is large or a cell type of which the numbers of cells is small, for example.

When the user selects again another probability in the probability selection region 910 in the state shown in FIG. 37, the user can reset the display of the number display region 912 in accordance with the reselected probability as shown in FIG. 38. Thus, by operating the probability selection region 910, it is possible to smoothly confirm the number of cells of each cell type based on a different probability condition.

The scattergram 901 may be provided also in FIG. 36 to FIG. 38. In this case, when a bar graph in the number display region 912 has been selected, cells (dots) corresponding to the selected bar graph may be highlighted in the scattergram 901. In addition, the histogram 911 (see FIG. 35) may be provided also in FIG. 36 to FIG. 38. In this case, when a bar graph in the number display region 912 has been selected, the state of distribution of the probabilities regarding the cell type of the selected bar graph may be displayed on the histogram 911.

Figure 39B:
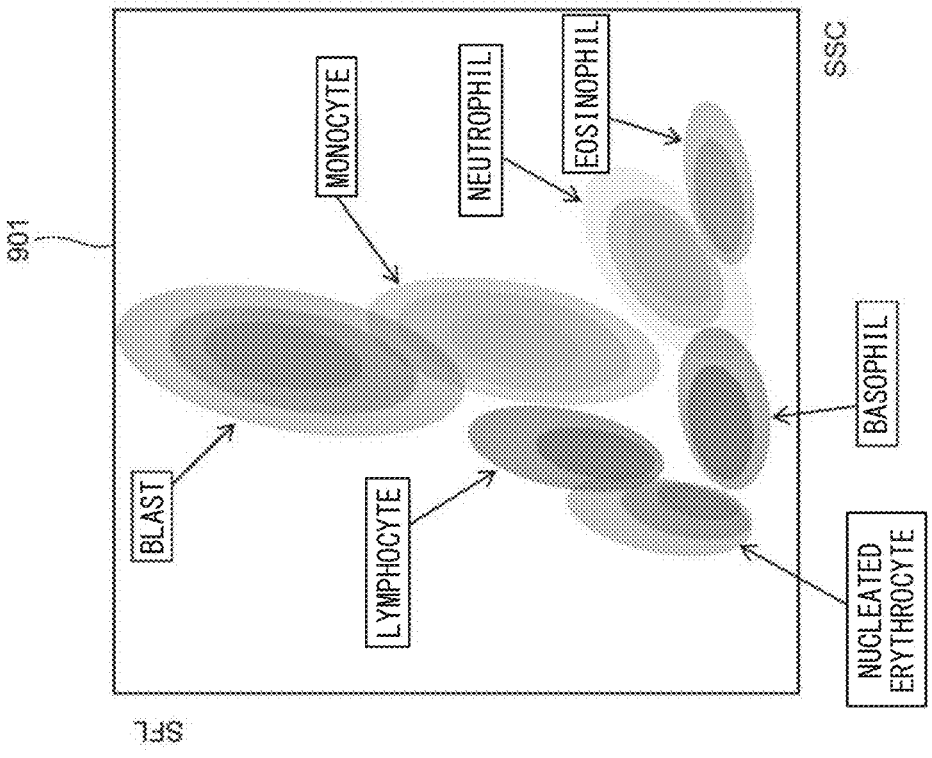
FIG. 39B shows another example of the scattergram.
Figure 39A:
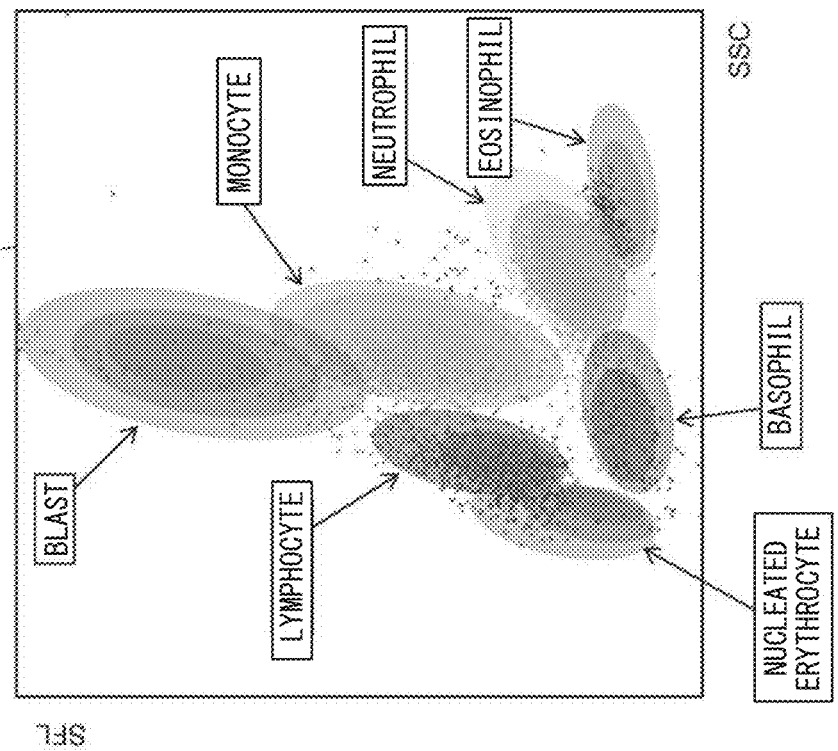
FIG. 39A shows an example of a scattergram.

FIGS. 39A, 39B each schematically show another configuration of the scattergram 901 described above.

In the scattergram 901 shown in FIG. 39A, distribution information of cells according to the probabilities for each cell type is superimposed on the plots of cells according to the feature parameters (in FIG. 39A, SSCP, SFLP). The distribution information in this case is composed of a ring pattern in which cells having the same probability are connected in a contour line shape; and a distribution region in which ranges each having similar probabilities are expressed with different darkness. In FIG. 39A, the higher the probability is, the darker color the distribution region has. In FIG. 39A, cells (dots) based on the feature parameters are plotted on the scattergram 901. However, as shown in FIG. 39B, dots of cells based on the feature parameters may not necessarily be plotted on the scattergram 901.

In the scattergrams 901 shown in FIGS. 39A, 39B, distribution information of cells according to the probabilities for each cell type is also displayed in the conventional scattergram 901 based on the feature parameters. Accordingly, with reference to the conventional scattergram 901, the user can visually understand how the probabilities of each cell type are distributed.

Figure 40:
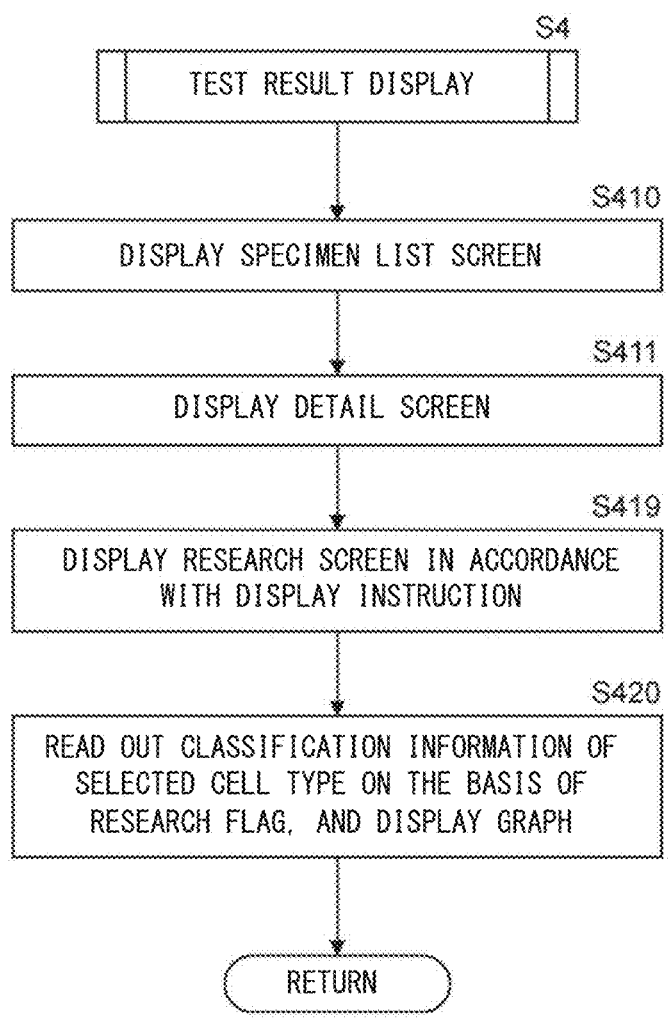
FIG. 40 is a flow chart of a fifth example of the test result displaying process.

FIG. 40 is a flow chart of a fifth example of the test result displaying process. In the first to fourth examples described above, the analysis screen 900 is displayed when a scattergram on the detail screen 800 has been double clicked. In the fifth example, when a "research" tab has been selected on the detail screen 800 in FIG. 19, a research screen 900R is displayed instead of the analysis screen 900 (step S419). In this example, an analysis result based on a main cell type is displayed on the specimen list screen 700 and the detail screen 800, and an analysis result screen or information regarding cell types other than the main cell type is displayed only on the research screen 900R. Then, on the basis of a research flag, classification information of the selected cell type is read out, and a graph is displayed (step S420).

Figure 41:
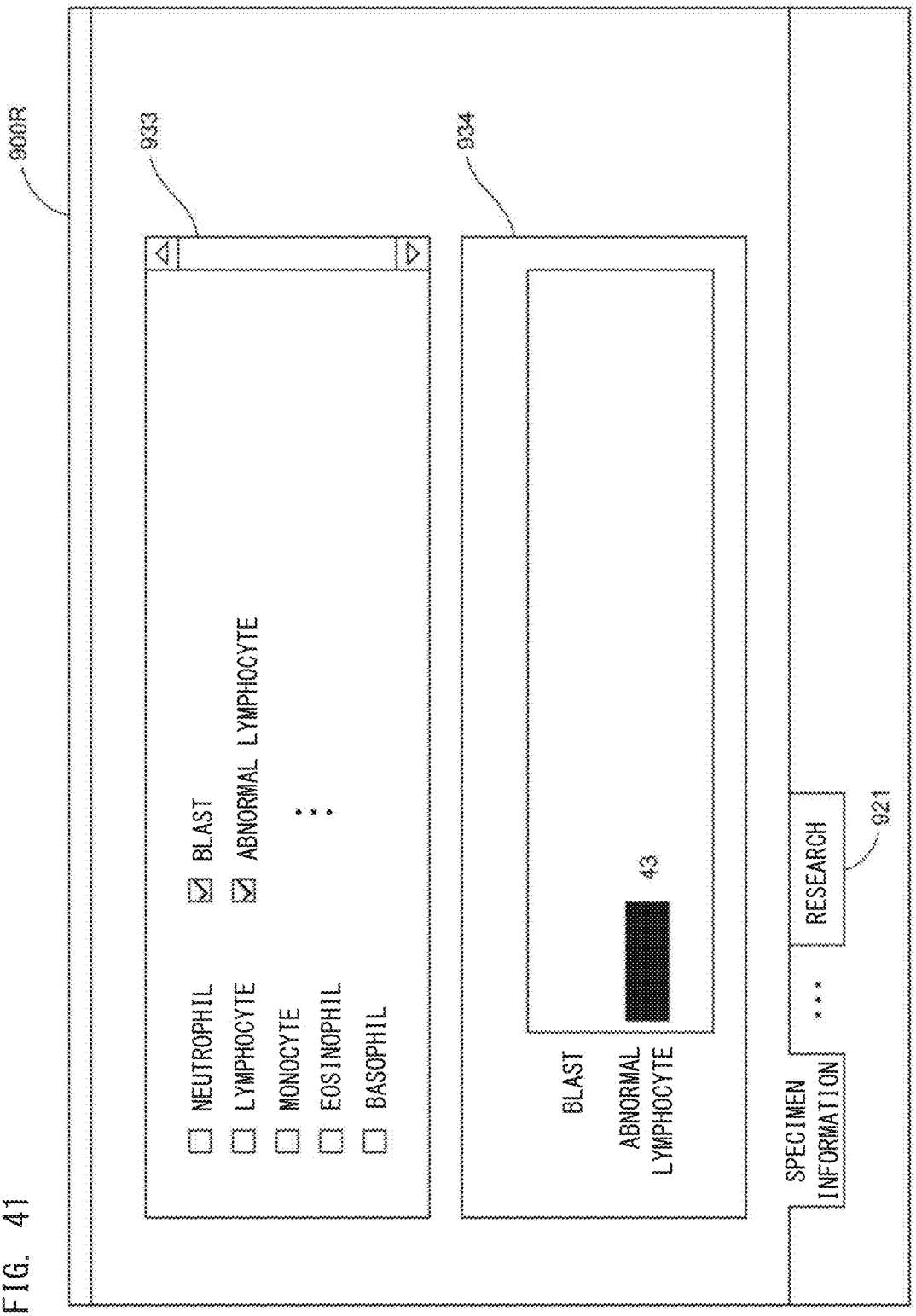
FIG. 41 shows an example of the analysis screen.

The screen in FIG. 41 is an example of a screen that is displayed when a research information button 921 has been operated. A cell type selection region 933 and a number display region 934 are displayed on the screen in FIG. 41. The cell type selection region 933 includes check boxes each for allowing selection of a cell type regarding the designated measurement channel.

When the user has performed an operation of selecting cell types in the cell type selection region 933, a count value obtained by counting, with respect to the selected cell types, cells of each cell type that has a probability higher than 0% is displayed, for each cell type, in the form of a bar graph in the number display region 934.

Thus, when the user has operated the research information button 921, and then selected a cell type in the cell type selection region 933 on the screen in FIG. 41, the user can confirm a detailed analysis result regarding minor cells, with reference to the number display region 934. That is, as shown in FIG. 41, in a research information display mode, the numbers of blasts and abnormal lymphocytes that cannot usually be main cells are also displayed. Therefore, the user can perform a further detailed analysis on the basis of the analysis result displayed in the research information display mode.

Figure 42:
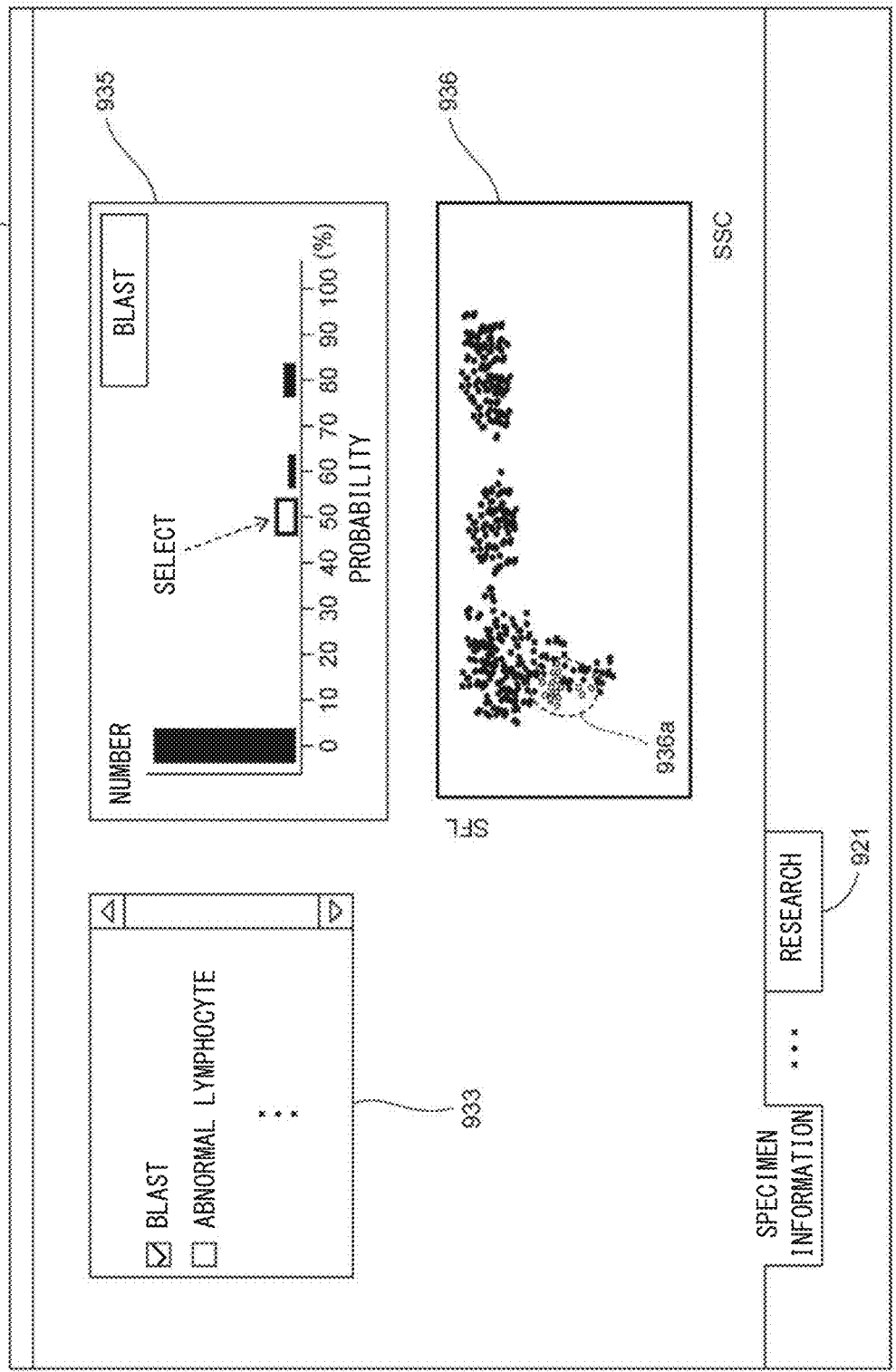
FIG. 42 shows an example of the analysis screen.

The screen shown in FIG. 42 is an example of a screen that is displayed when the research information button 921 has been operated. The cell type selection region 933, a histogram 935, and a scattergram 936 are displayed on the screen in FIG. 42.

When the user has performed an operation of selecting a cell type in the cell type selection region 933, the histogram 935 is displayed on the basis of the selected cell type. The histogram 935 is frequency distribution information obtained by counting, for each probability of the selected cell type, all the cells that correspond to the measurement channel. When the user has selected a bar graph in the histogram 935, corresponding cells (dots) (dots in a region 936a) on the scattergram 936 are highlighted. In the example shown in FIG. 42, blast has been selected as the cell type, and a bar graph of a probability of 50% has been selected. In this case, cells (cells distributed near the region 936a) for which probabilities of being blasts are on the order of 50% are highlighted on the scattergram 936.

Thus, when the user has operated the research information button 921, then, on the screen in FIG. 42, selected a cell type in the cell type selection region 933 and selected a bar graph on the histogram 935, the user can confirm a further detailed analysis result.

When a plurality of cell types have been selected in the cell type selection region 933 in FIG. 42, graphs of the plurality of cell types are displayed in the histogram 935, as in the three-dimensional histogram 907 in FIG. 26. When a plurality of bar graphs have been selected on the histogram 935, all of the corresponding cells (dots) on the scattergram 936 are highlighted.

7. Host Computer Transmission Process

Figure 43:
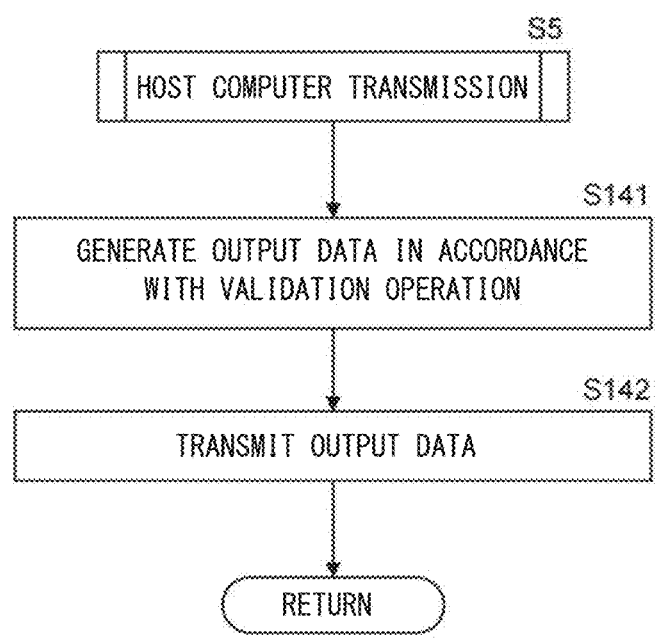
FIG. 43 is a flow chart of a transmission process to a host computer.

Next, data (hereinafter, referred to as "output data") to be sent from the processing unit 300 to the host computer 500 is described. FIG. 43 is a flow chart showing a subroutine of host computer transmission.

The processor 3001 of the processing unit 300 receives a validation operation from the user and generates output data to be transmitted to the host computer 500 in accordance with the validation operation (step S141).

As described with reference to FIG. 18 and FIG. 19, on the specimen list screen 700 and the detail screen 800 which are each a test result screen, the validation icon 710d displayed in common between these screens is displayed. The user confirms the test result screen described above, and performs verification on the test result. As a result of the verification, when the user has determined that the result can be reported to the host computer 500, the user clicks the validation icon 710d. When the user does not execute validation on the target specimen and sets a retest for the target subject, the user operates the measurement registration icon 710c to create a test order for the retest.

When a validation operation has been performed, the processor 3001 generates output data to be transmitted to the host computer 500, on the basis of analysis result data stored in the storage 3004 (step S141). Then, the processor 3001 transmits the generated output data to the host computer 500 (step S142).

FIG. 44A to FIG. 45B each schematically show a configuration of output data that is generated by the processor 3001 and that is to be transmitted to the host computer 500. The output data may be formed by removing classification information that corresponds to a certain cell type from the test result data, and is configured as shown in one of those shown in FIG. 44A to FIG. 45B, for example.

Figure 44A:
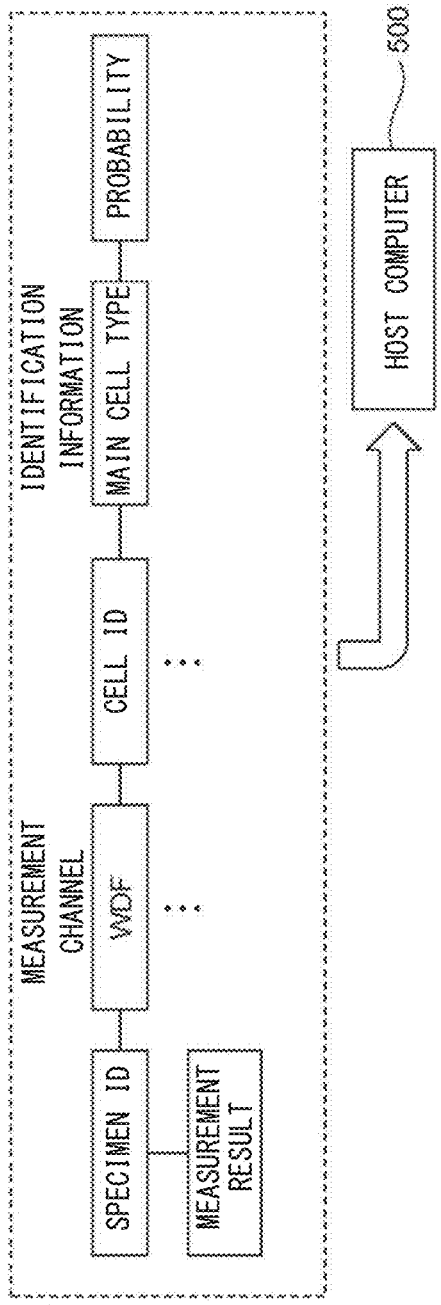
FIG. 44A shows an example of a structure of output data.

The output data shown in FIG. 44A is composed of: specimen ID; measurement result; measurement channel; cell ID; identification information regarding a main cell type; and probability regarding the main cell type. That is, the output data shown in FIG. 44A is obtained by removing data other than the output data shown in FIG. 44A from the test result data shown in FIGS. 12 to 16.

Figure 44B:
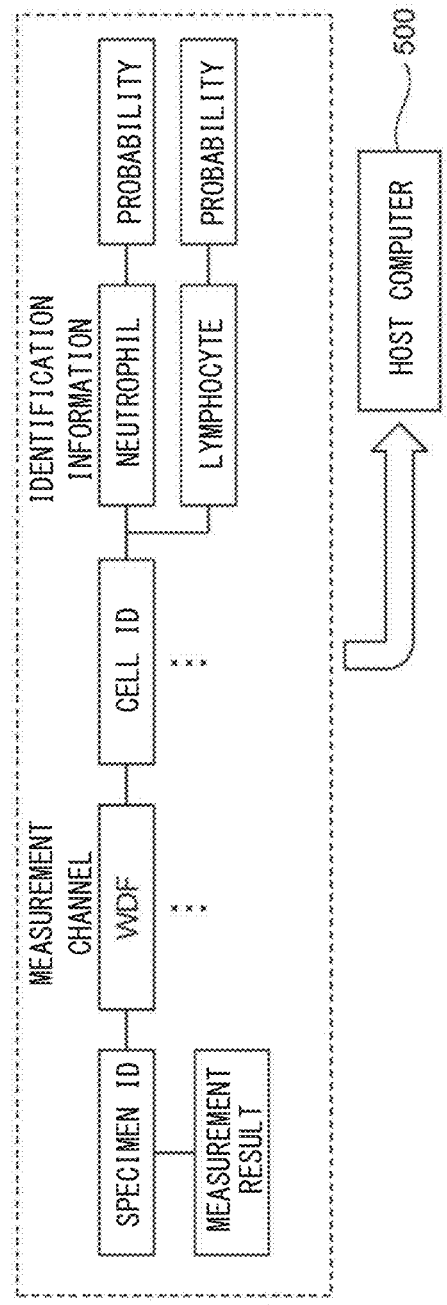
FIG. 44B shows an example of the structure of output data.

The output data shown in FIG. 44B is composed of: specimen ID; measurement result; measurement channel; cell ID; identification information regarding cell types that have the highest two probabilities; and probabilities regarding the cell types that have the highest two probabilities. That is, the output data shown in FIG. 44B is obtained by adding, to the output data shown in FIG. 44A, the identification information and probability regarding the cell type that has the second highest probability. The output data shown in FIG. 44B is not limited to having the highest two cell types and probabilities, and may have cell types and probabilities from the highest rank to a predetermined rank.

The output data shown in FIG. 45A is composed of specimen ID and measurement result. That is, the output data shown in FIG. 45A is obtained by removing data other than the output data shown in FIG. 45A from the test result data shown in FIGS. 12 to 16. That is, the output data does not include information regarding probability at all.

The output data shown in FIG. 45B is composed of specimen ID, measurement result, and abnormal cell detection information. That is, the output data shown in FIG. 45B is obtained by adding abnormal cell detection information to the measurement result in the output data similar to that in FIG. 45A. When not less than a predetermined number of abnormal cells (e.g., abnormal lymphocytes or blasts) that have a probability higher than 0% are present in the specimen, a fact that the abnormal cells have been detected is added as abnormal cell detection information to the measurement result at the time of generation of the test result data. The abnormal cell detection information is a character string such as "abnormal lymphocytes have been detected", "Abn LYMPH?", "blasts have been detected", or "Blast?", for example. The abnormal cell detection information may be the cell type of the detected abnormal cells and the number thereof. The abnormal cell detection information is displayed in the measurement result display region 932 in FIG. 18, for example.

As described above, output data that includes a counting result and in which at least a part of relevance information (such as cell type and probability) has been removed is transmitted to the host computer 500. As described above, when probabilities associated with a plurality of cell types are obtained for each cell, the volume of test result data becomes huge. Therefore, if all of the test result data is transmitted to the host computer 500, the communication load due to data transmission becomes large. In contrast to this, according to the output data shown in FIG. 44A to FIG. 45B, not all the huge test result data is transmitted, but only data that is necessary for management by the host computer 500 is transmitted. Accordingly, both of appropriate data management in the host computer 500 and efficient data transmission can be realized.

The output data shown in FIG. 44A to FIG. 45B may include feature parameters and scattergrams.

Here, the processor 3001 generates the output data so as to have a configuration of one of those shown in FIG. 44A to FIG. 45B. However, the configuration of the output data may be set in accordance with an instruction from a user.

FIG. 46A and FIG. 46B each schematically show a configuration of a screen for selecting data to be included in the output data.

A cell type selection region 951 and an OK button 952 are displayed on the screen in FIG. 46A. The cell type selection region 951 is provided with check boxes each for selecting a cell type. When the user has performed an operation of selecting a cell type in the cell type selection region 951 and has operated the OK button 952, the processor 3001 of the processing unit 300 stores the set content into the storage 3004. From the next time, when generating output data, the processor 3001 causes the set cell type and the probability corresponding to the set cell type to be included in the output data.

A cell range selection region 961 and an OK button 962 are displayed on the screen in FIG. 46B. The cell range selection region 961 is provided with check boxes each for selecting a cell type range. A cell type range, such as "main cell type only", "minor cell types other than main cell type", "all cell types", or "do not transmit", can be selected in the cell range selection region 961. When "main cell type only" has been selected, only the identification information and probability of the main cell type among all of the identification information and probabilities are caused to be included in the output data. When "minor cell types other than main cell type" has been selected, only the identification information and probabilities of all of the minor cell types other than the main cell type among all of the identification information and probabilities are caused to be included in the output data. When "all cell types" has been selected, all of the identification information and probabilities are caused to be included in the output data. When "do not transmit" has been selected, none of the identification information and probabilities are caused to be included in the output data.

When the user has performed an operation of selecting a cell type range in the cell range selection region 961 and has operated the OK button 962, the processor 3001 stores the set content into the storage 3004. From the next time, when generating output data, the processor 3001 generates output data on the basis of the set cell type range.

8. Configurations of Processor and Parallel-Processing Processor

Configuration Example 1

Next, a configuration of the parallel-processing processor 4833 installed in the measurement unit 400 is described in detail with reference FIG. 2 again. In the following, configuration example 1 is described with respect to the processor 4831 and the parallel-processing processor 4833.

As described with reference to FIG. 2, using the parallel-processing processor 4833, the processor 4831 executes an analysis process of waveform data included in a generated digital signal, in accordance with the deep learning algorithm 60. That is, the processor 4831 is programmed to execute an analysis process of waveform data included in a digital signal in accordance with the deep learning algorithm 60. The analysis software 4835a for analyzing data of cells on the basis of the deep learning algorithm 60 may be stored in the storage 4835. In this case, the processor 4831 executes the analysis software 4835a stored in the storage 4835, thereby executing a data analysis process based on the deep learning algorithm 60. The processor 4831 is a CPU (Central Processing Unit), for example. For example, core i9, Core i7, or Core i5 manufactured by Intel Corporation, Ryzen 9, Ryzen 7, Ryzen 5, or Ryzen 3 manufactured by AMD, or the like may be used as the processor 4831.

The processor 4831 controls the parallel-processing processor 4833. The parallel-processing processor 4833 executes parallel processing regarding a matrix operation, for example, in accordance with control by the processor 4831. That is, the processor 4831 is a master processor of the parallel-processing processor 4833, and the parallel-processing processor 4833 is a slave processor of the processor 4831. The processor 4831 is also referred to as a host processor or a main processor.

The parallel-processing processor 4833 executes in parallel a plurality of arithmetic processes being at least a part of processing regarding analysis of waveform data. The parallel-processing processor 4833 is a GPU (Graphics Processing Unit), an FPGA (Field Programmable Gate Array), or an ASIC (Application Specific Integrated Circuit), for example. When the parallel-processing processor 4833 is an FPGA, the parallel-processing processor 4833 may have programed therein in advance an arithmetic process regarding a trained deep learning algorithm 60, for example. When the parallel-processing processor 4833 is an ASIC, the parallel-processing processor 4833 may have incorporated therein in advance a circuit for executing the arithmetic process regarding the trained deep learning algorithm 60, or may have a programmable module built therein in addition to such an incorporated circuit, for example. As the parallel-processing processor 4833, GeForce, Quadro, TITAN, Jetson, or the like of NVIDIA Corporation may be used, for example. In the case of a Jetson series, Jetson Nano, Jetson Tx2, Jetson Xavier, or Jetson AGX Xavier is used, for example.

The processor 4831 executes a calculation process regarding control of the measurement unit 400, for example. The processor 4831 executes a calculation process regarding control signals transmitted/received between the apparatus mechanism part 430, the sample preparation part 440, and the specimen suction part 450. The processor 4831 executes a calculation process regarding transmission/reception of information with respect to the processing unit 300, for example. The processor 4831 executes processes regarding reading out of program data from the storage 4835, developing a program onto the RAM 4834, and transmission/reception of data with respect to the RAM 4834. The processes described above and executed by the processor 4831 are required to be executed in a predetermined order, for example. For example, when processes needed for control of the apparatus mechanism part 430, the sample preparation part 440, and the specimen suction part 450 are assumed to be A, B, and C, the processes are required to be executed in the order of B, A, and C in some cases. Since the processor 4831 often executes such continuous processes that depend on an order, even when the number of arithmetic units (each may be referred to as a "processor core" a "core", or the like) is increased, the processing speed is not necessarily increased.

Meanwhile, the parallel-processing processor 4833 executes a large amount of regular calculation processes such as arithmetic operations on matrix data including a large amount of elements, for example. In the present embodiment, the parallel-processing processor 4833 executes parallel processing in which at least a part of processes of analyzing waveform data in accordance with the deep learning algorithm 60 are parallelized. The deep learning algorithm 60 includes a large amount of matrix operations, for example. For example, the deep learning algorithm 60 may include at least 100 matrix operations, or may include at least 1000 matrix operations. The parallel-processing processor 4833 has a plurality of arithmetic units, and the respective arithmetic units can simultaneously execute matrix operations. That is, the parallel-processing processor 4833 can execute, in parallel, matrix operations by a plurality of respective arithmetic units, as parallel processing. For example, a matrix operation included in the deep learning algorithm 60 can be divided into a plurality of arithmetic processes that are not order-dependent with each other. The thus divided arithmetic processes can be executed in parallel by a plurality of arithmetic units, respectively. These arithmetic units may be each referred to as a "processor core", a "core", or the like.

As a result of execution of such parallel processing, speed up of arithmetic processing in the entirety of the measurement unit 400 can be realized. A process such as a matrix operation included in the deep learning algorithm 60 may be referred to as "Single Instruction Multiple Data (SIMD) processing", for example. The parallel-processing processor 4833 is suitable for such an SIMD operation, for example. Such a parallel-processing processor 4833 may be referred to as a vector processor.

As described above, the processor 4831 is suitable for executing diverse and complicated processes. Meanwhile, the parallel-processing processor 4833 is suitable for executing in parallel a large amount of regular processes. Through parallel execution of a large amount of regular processes, the TAT (Turn Around Time) required for the calculation processes is shortened.

The parallel processing to be executed by the parallel-processing processor 4833 is not limited to matrix operations. For example, when the parallel-processing processor 4833 executes a learning process in accordance with the deep learning algorithm 60, differential operations or the like regarding the learning process can be the target of the parallel processing.

As for the number of arithmetic units of the processor 4831, a dual core (the number of cores: 2), a quad core (the number of cores: 4), or an octa core (the number of cores: 8) is adopted, for example. Meanwhile, the parallel-processing processor 4833 has at least ten arithmetic units (the number of cores: 10), and can execute ten matrix operations in parallel, for example. The parallel-processing processor 4833 that has several-ten arithmetic units also exists. The parallel-processing processor 4833 that has, for example, at least 100 arithmetic units (the number of cores: 100) and that can execute 100 matrix operations in parallel also exists. The parallel-processing processor 4833 that has, for example, several-hundred arithmetic units also exists. The parallel-processing processor 4833 that has, for example, at least 1000 arithmetic units (the number of cores: 1000) and that can execute 1000 matrix operations in parallel also exists. The parallel-processing processor 4833 that has, for example, several thousand arithmetic units also exists.

Figure 47:
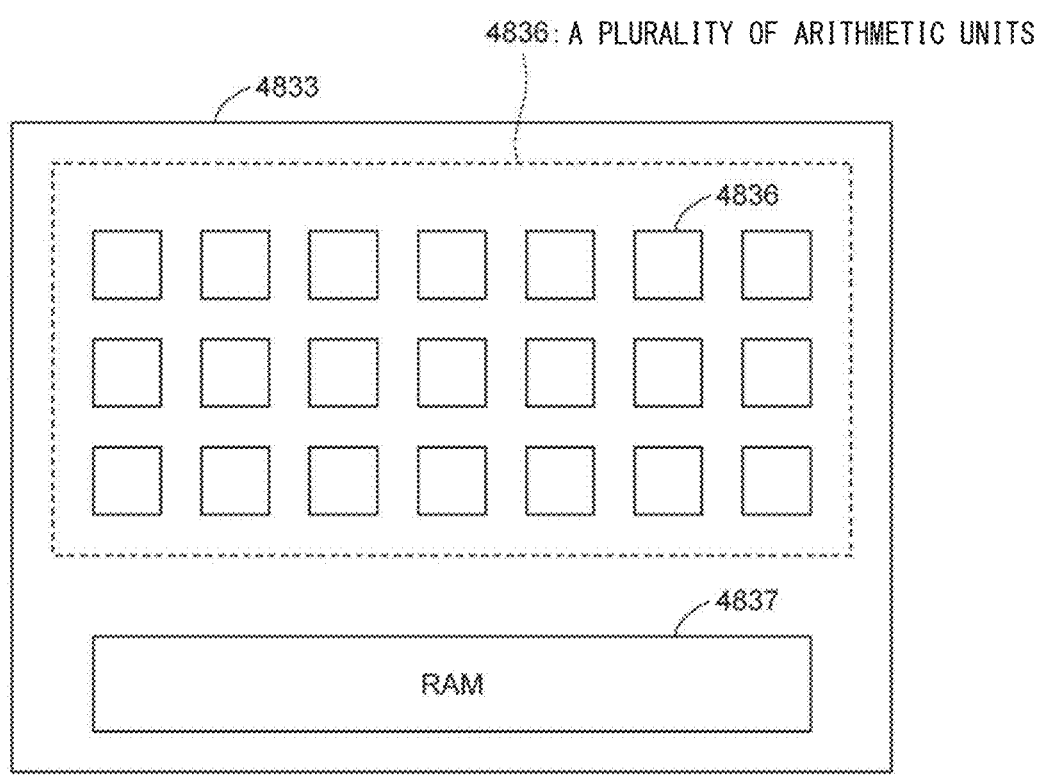
FIG. 47 shows a configuration example of a parallel-processing processor.

FIG. 47 shows a configuration example of the parallel-processing processor 4833. The parallel-processing processor 4833 includes a plurality of arithmetic units 4836 and a RAM 4837. The respective arithmetic units 4836 execute arithmetic processes of matrix data in parallel. The RAM 4837 stores data regarding the arithmetic processes executed by the arithmetic units 4836. The RAM 4837 is a memory that has a capacity of at least 1 gigabyte. The RAM 4837 may be a memory that has a capacity of 2 gigabytes, 4 gigabytes, 6 gigabytes, 8 gigabytes, 10 gigabytes, or more. Each arithmetic unit 4836 obtains data from the RAM 4837 and executes an arithmetic process. The arithmetic unit 4836 may be referred to as a "processor core", "core", or the like.

Figure 48:
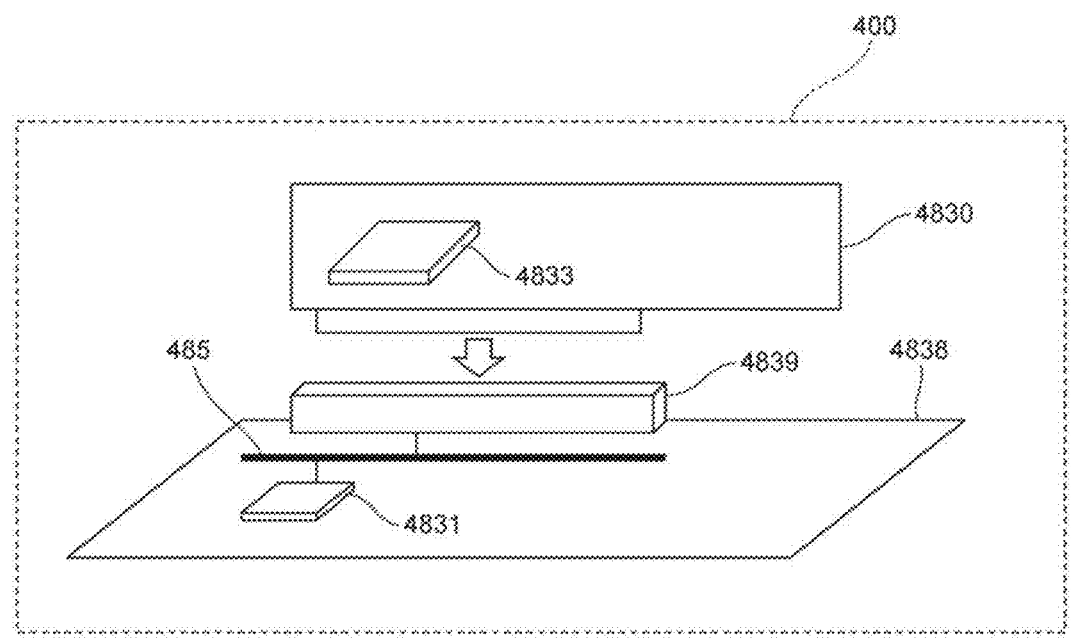
FIG. 48 shows an installation example of the parallel-processing processor to the measurement unit.
Figure 49:
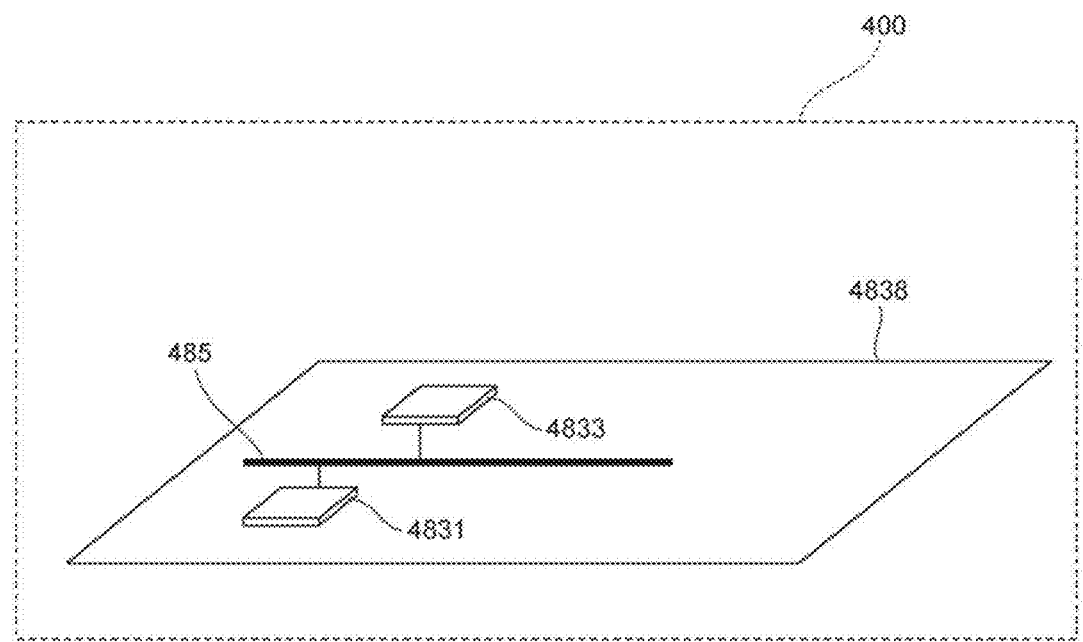
FIG. 49 shows an installation example of the parallel-processing processor to the measurement unit.
Figure 50:
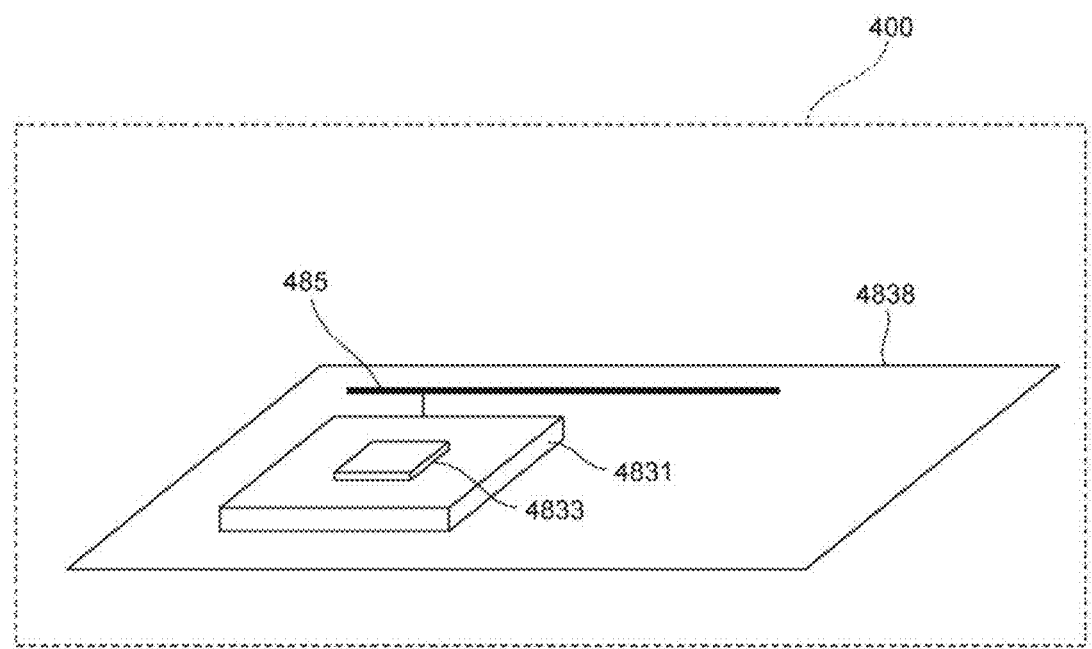
FIG. 50 shows an installation example of the parallel-processing processor to the measurement unit.

FIG. 48 to FIG. 50 each show an installation example of the parallel-processing processor 4833 to the measurement unit 400. FIG. 48 to FIG. 50 each show an example in which the parallel-processing processor 4833 is installed, in the cell analyzer 100, in the form of being incorporated in the measurement unit 400. FIG. 48 and FIG. 49 each show an installation example in which the processor 4831 and the parallel-processing processor 4833 are provided as separate bodies. As shown in FIG. 48, the processor 4831 is installed on a substrate 4838, for example. The parallel-processing processor 4833 is installed on a graphic board 4830, and the graphic board 4830 is connected to the substrate 4838 via a connector 4839, for example. The processor 4831 is connected to the parallel-processing processor 4833 via a bus 485. As shown in FIG. 49, the parallel-processing processor 4833 may be directly installed on the substrate 4838, and connected to the processor 4831 via the bus 485, for example. FIG. 50 shows an installation example in which the processor 4831 and the parallel-processing processor 4833 are integrally provided. As shown in FIG. 50, the parallel-processing processor 4833 may be built in the processor 4831 installed on the substrate 4838, for example.

Figure 51:
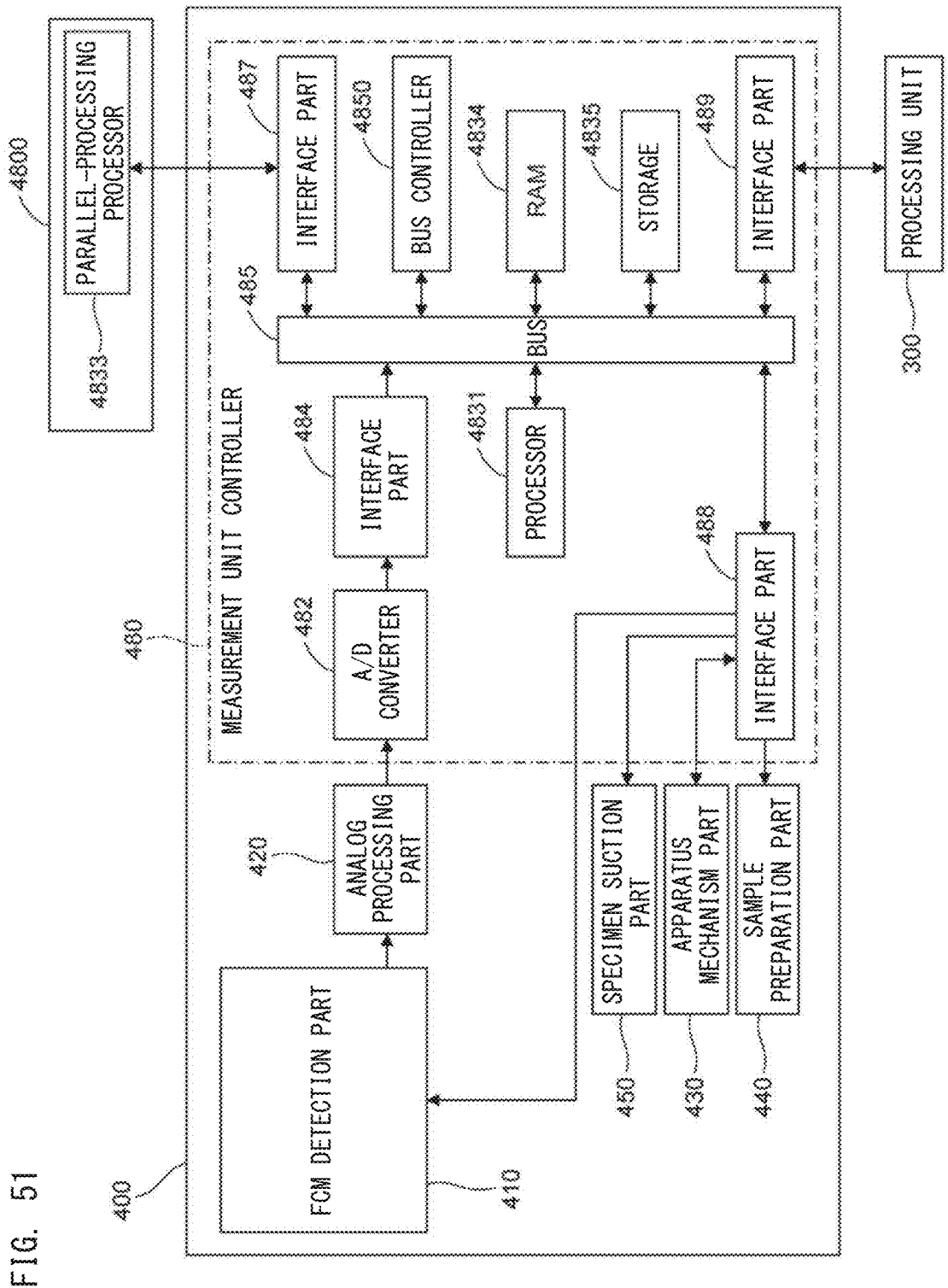
FIG. 51 shows an installation example of the parallel-processing processor to the measurement unit.

FIG. 51 shows another installation example of the parallel-processing processor 4833 to the measurement unit 400. FIG. 51 shows an example in which the parallel-processing processor 4833 is installed to the measurement unit 400 by means of an external apparatus 4800 connected to the measurement unit 400. For example, the parallel-processing processor 4833 is mounted on the external apparatus 4800 being a USB (Universal Serial Bus) device, and this USB device is connected to the bus 485 via an interface part 487, whereby the parallel-processing processor 4833 is installed to the cell analyzer 100. The USB device may be a small device such as a USB dongle, for example. The interface part 487 is a USB interface having a transfer rate of several hundred Mbps, for example, and more preferably, is a USB interface having a transfer rate of several Gbps to several ten Gbps or higher. As the external apparatus 4800 having the parallel-processing processor 4833 mounted thereon, Neural Compute Stick 2 manufactured by Intel Corporation may be used, for example.

A plurality of USB devices each having the parallel-processing processor 4833 mounted thereon may be connected to the interface part 487, whereby a plurality of parallel-processing processors 4833 may be installed to the cell analyzer 100. The parallel-processing processor 4833 mounted on one USB device may have a smaller number of arithmetic units 4836 than a GPU or the like in some cases. Therefore, when a plurality of USB devices are connected to the measurement unit 400, scale-up of the number of cores can be realized.

FIG. 52, FIG. 53A, FIG. 53B, and FIG. 54 each show an outline of arithmetic processes executed by the parallel-processing processor 4833 on the basis of control of the analysis software 4835a which operates on the processor 4831.

Figure 52:
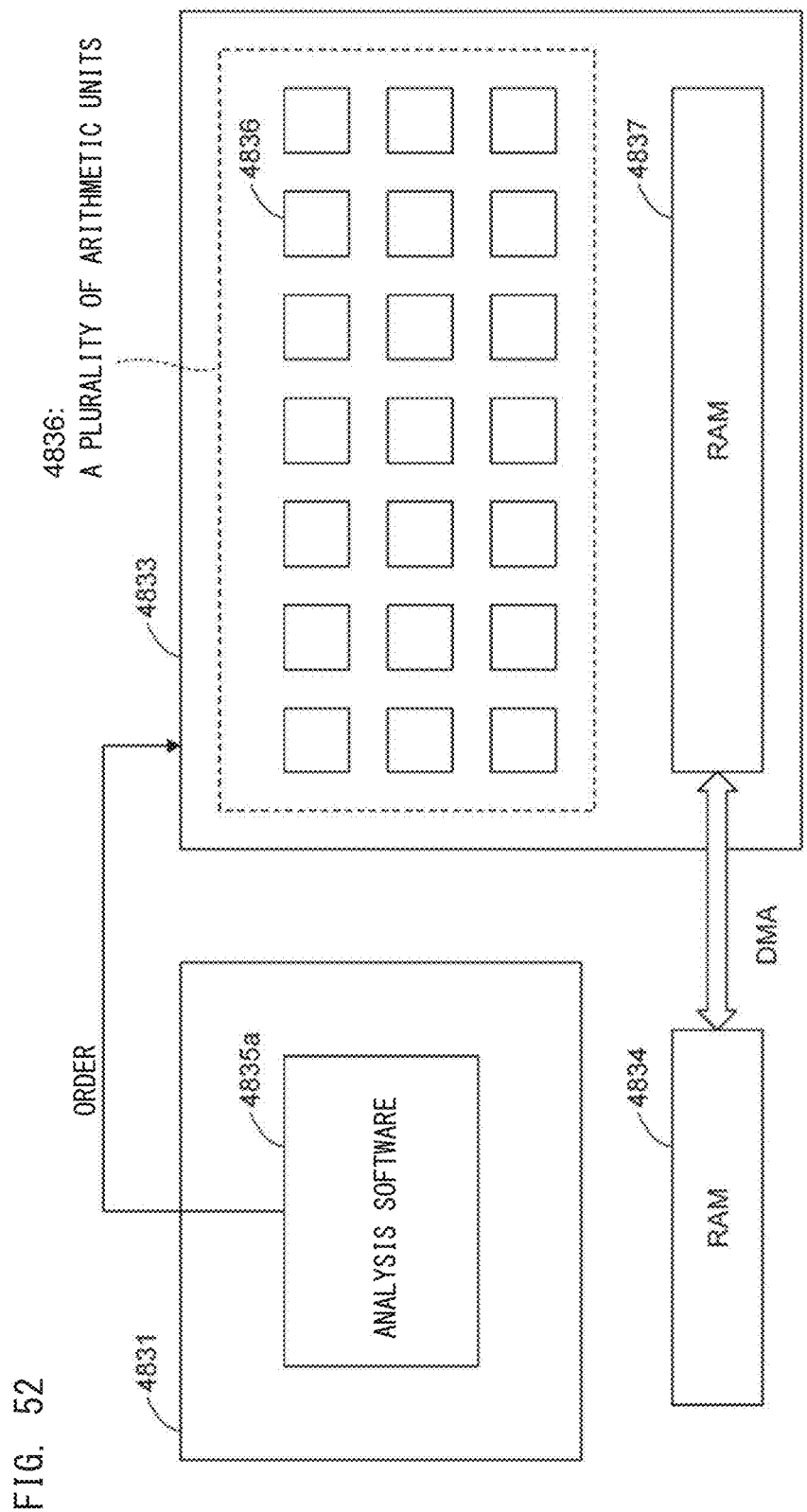
FIG. 52 shows an outline of arithmetic processes executed by a processor and the parallel-processing processor.

FIG. 52 shows a configuration example of the parallel-processing processor 4833 which executes arithmetic processes.

The parallel-processing processor 4833 includes a plurality of the arithmetic units 4836 and the RAM 4837. The processor 4831, which executes the analysis software 4835a, can issue an order to the parallel-processing processor 4833 to cause the parallel-processing processor 4833 to execute at least a part of arithmetic processes necessary for analysis of waveform data performed by the deep learning algorithm 60. The processor 4831 orders the parallel-processing processor 4833 to execute arithmetic processes regarding waveform data analysis based on the deep learning algorithm. All or at least a part of waveform data corresponding to the signals detected by the FCM detection part 410 is stored in the RAM 4834. The data stored in the RAM 4834 is transferred to the RAM 4837 of the parallel-processing processor 4833. The data stored in the RAM 4834 is transferred to the RAM 4837 by a DMA (Direct Memory Access) method, for example. The plurality of the respective arithmetic units 4836 of the parallel-processing processor 4833 execute in parallel arithmetic processes with respect to the data stored in the RAM 4837. Each of the plurality of the arithmetic units 4836 obtains necessary data from the RAM 4837, to execute an arithmetic process. Data corresponding to the arithmetic result is stored into the RAM 4837 of the parallel-processing processor 4833. The data corresponding to the arithmetic result is transferred from the RAM 4837 to the RAM 4834 by a DMA method, for example.

FIG. 53A and FIG. 53B each show an outline of a matrix operation executed by the parallel-processing processor 4833.

Prior to analyzing waveform data in accordance with the deep learning algorithm 60, calculation of the product of a matrix (matrix operation) is executed. The parallel-processing processor 4833 executes in parallel a plurality of arithmetic processes regarding the matrix operation, for example. FIG. 53A shows a calculation formula of the product of a matrix. In the calculation formula shown in FIG. 53A, a matrix c is obtained by a product of a matrix a of n rows×n columns and a matrix b of n rows×n columns. As shown as an example in FIG. 53A, the calculation formula is described in a hierarchical loop syntax. FIG. 53B shows an example of arithmetic processes executed in parallel in the parallel-processing processor 4833. The calculation formula shown as an example in FIG. 53A can be divided into n×n arithmetic processes, n×n being the number of combinations of a loop variable i for the first hierarchical level and a loop variable j for the second hierarchical level, for example. Such divided arithmetic processes are arithmetic processes that are not dependent on each other, and thus can be executed in parallel.

Figure 54:
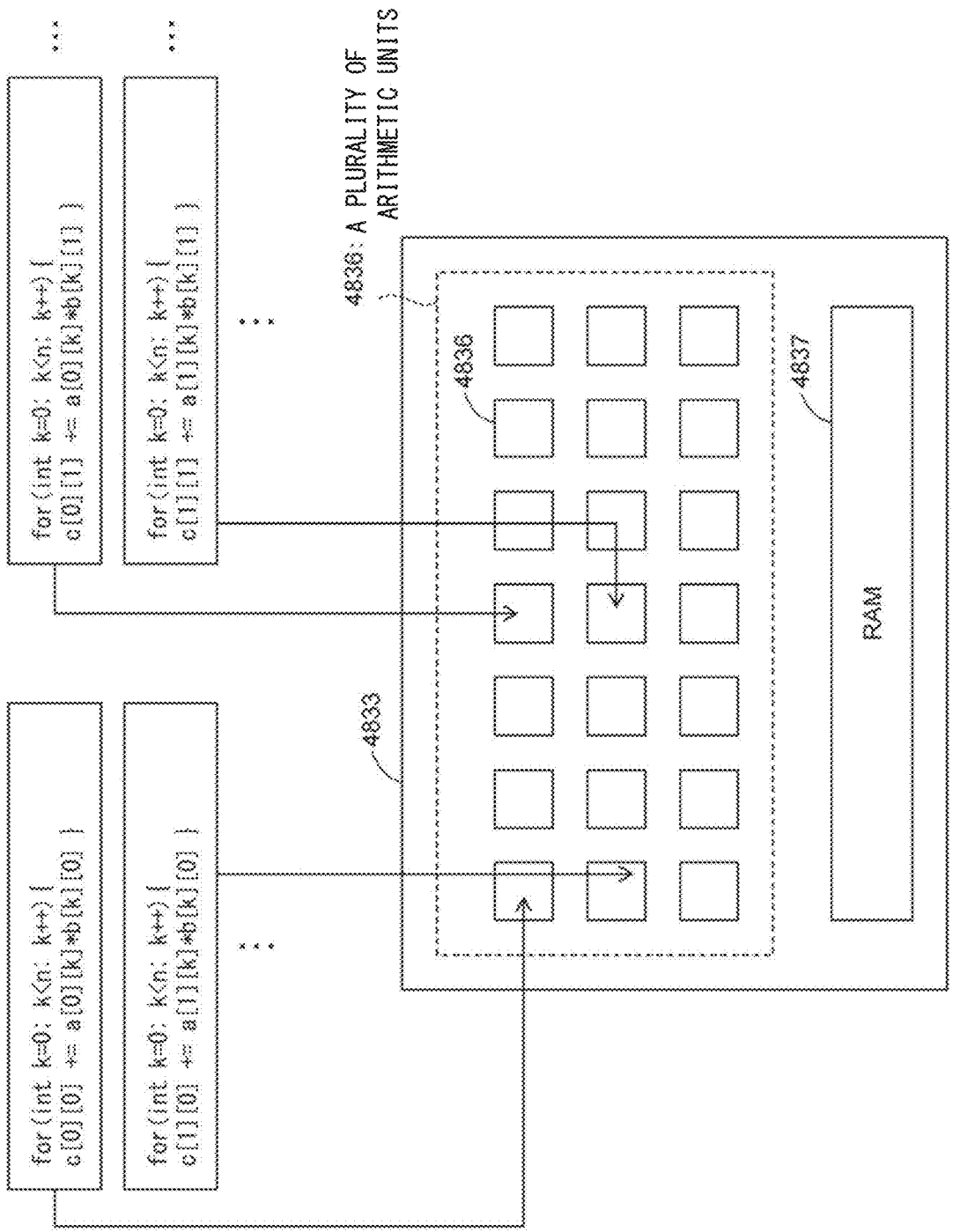
FIG. 54 shows that a plurality of arithmetic processes are executed by the parallel-processing processor.

FIG. 54 is a conceptual diagram showing that a plurality of arithmetic processes shown as an example in FIG. 53B are executed in parallel in the parallel-processing processor 4833.

As shown in FIG. 54, each of the plurality of arithmetic processes is assigned to one of the plurality of the arithmetic units 4836 of the parallel-processing processor 4833. The respective arithmetic units 4836 execute in parallel the assigned arithmetic processes. That is, the respective arithmetic units 4836 simultaneously execute the divided arithmetic processes.

Through the arithmetic operations shown as an example in FIG. 53A, FIG. 53B, and FIG. 54 and performed by the parallel-processing processor 4833, information regarding a probability that a cell corresponding to the waveform data belongs to each of a plurality of cell types is obtained. On the basis of the results of the arithmetic operations, the processor 4831, which executes the analysis software 4835*a*, performs analysis regarding the cell types of the cell that corresponds to the waveform data. The arithmetic results are stored in the RAM 4837 of the parallel-processing processor 4833, to be transferred from the RAM 4837 to the RAM 4834. The processor 4831 transmits a result of analysis performed on the basis of the arithmetic results stored in the RAM 4834, to the processing unit 300 via the bus 485 and the interface part 489.

The arithmetic operations of the probability that a cell belongs to each of a plurality of cell types may be performed by a processor different from the parallel-processing processor 4833. For example, the arithmetic results by the parallel-processing processor 4833 may be transferred from the RAM 4837 to the RAM 4834, and, on the basis of the arithmetic results read out from the RAM 4834, the processor 4831 may perform arithmetic operations on the information regarding the probability that a cell corresponding to each piece of waveform data belongs to each of a plurality of cell types. Alternatively, the arithmetic results by the parallel-processing processor 4833 may be transferred from the RAM 4837 to the processing unit 300, and a processor installed in the processing unit 300 may perform arithmetic operations on the information regarding the probability that a cell corresponding to each piece of waveform data belongs to each of a plurality of cell types.

In the present embodiment, the processes shown in FIG. 53A, FIG. 53B, and FIG. 54 are applied to an arithmetic process (also referred to as a filtering process) regarding a convolution layer in the deep learning algorithm 60, for example.

FIG. 55A and FIG. 55B each show an outline of an arithmetic process regarding a convolution layer.

FIG. 55A shows an example of waveform data of forward scattered light (FSC), as waveform data to be inputted to the deep learning algorithm 60. As described with reference to FIG. 5, the waveform data of the present embodiment is one-dimensional matrix data. To put it more simply, the waveform data is a sequence in which elements are arranged in a line. Here, for convenience of description, the number of elements of the waveform data is assumed to be n (n is an integer 1 or greater). FIG. 55A shows a plurality of filters. Each filter is generated through a learning process of the deep learning algorithm 60. Each of the plurality of filters is one-dimensional matrix data indicating features of the waveform data. Although each filter shown in FIG. 55A is matrix data of 1 row×3 columns, the number of columns is not limited to three. A matrix operation is performed on the waveform data inputted to the deep learning algorithm 60 and each filter, whereby features corresponding to the cell type of the waveform data are calculated. FIG. 55B shows an outline of a matrix operation performed on waveform data and a filter. As shown in FIG. 55B, a matrix operation is executed while each filter is shifted with respect to the elements of the waveform data, one by one. Calculation of the matrix operation is executed according to Formula 1 below.

[Math 1]

$$\sum_{P=0}^{L-1}\sum_{q=0}^{M-1} h_{pq} x_{i+p, j+q}$$ (formula 1)

In Formula 1, the suffixes of x are variables that indicate the row number and the column number of the waveform data. The suffixes of h are variables that indicate the row number and the column number of the filter. In the example shown in FIGS. 55A, 55B, the waveform data is one-dimensional matrix data and the filter is matrix data of 1 row×3 columns, and thus, L=1, M=3, p=0, q=0, 1, 2, i=0, j=0, 1, . . . , n−1.

The parallel-processing processor 4833 executes in parallel the matrix operation represented by Formula 1, by means of the plurality of the respective arithmetic units 4836. On the basis of the arithmetic processes executed by the parallel-processing processor 4833, classification information regarding cell types of each cell is generated. The generated classification information is transmitted to the processing unit 300 which is used in generation and display of a test result of the specimen based on the classification information.

Figure 56:
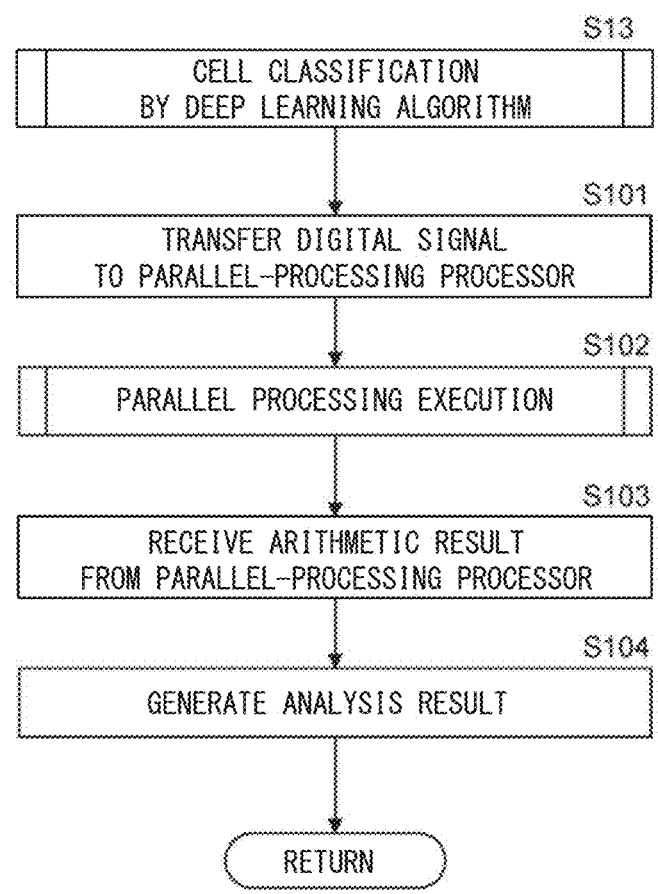
FIG. 56 is a flow chart of cell classification using a deep learning algorithm performed by the processor and the parallel-processing processor.

Next, with reference to FIG. 56, a process of cell classification in step S13 in the flow chart of FIG. 10 is described.

The process of cell classification in step S13 is a process performed by the processor 4831 in accordance with operation of the analysis software 4835*a*. The processor 4831 causes digital signals taken into the RAM 4834 in step S13 to be transferred to the parallel-processing processor 4833 (step S101). As shown in FIG. 52, the processor 4831 causes each digital signal to be transferred from the RAM 4834 to the RAM 4837 through DMA transfer. The processor 4831 controls the bus controller 4850, for example, to cause the digital signal from the RAM 4834 to be DMA-transferred to the RAM 4837.

The processor 4831 instructs the parallel-processing processor 4833 to execute parallel processing onto the waveform data included in the digital signal (step S102). The processor 4831 instructs execution of the parallel processing by calling a kernel function of the parallel-processing processor 4833, for example. The process executed by the parallel-processing processor 4833 will be described later with reference to a flow chart shown as an example in FIG. 57. The processor 4831 instructs the parallel-processing processor 4833 to execute a matrix operation regarding the deep learning algorithm 60, for example. The digital signal is decomposed into a plurality of pieces of waveform data, to be sequentially inputted to the deep learning algorithm 60. An index corresponding to each cell and included in the digital signal is not inputted to the deep learning algorithm 60. The waveform data inputted to the deep learning algorithm 60 is subjected to arithmetic operations performed by the parallel-processing processor 4833.

The processor 4831 receives arithmetic results obtained through execution by the parallel-processing processor 4833 (step S103). The arithmetic results are DMA-transferred from the RAM 4837 to the RAM 4834 as shown in FIG. 52, for example.

On the basis of the arithmetic results by the parallel-processing processor 4833, the processor 4831 generates an analysis result of cell types of each measured cell (step S104).

Figure 57:
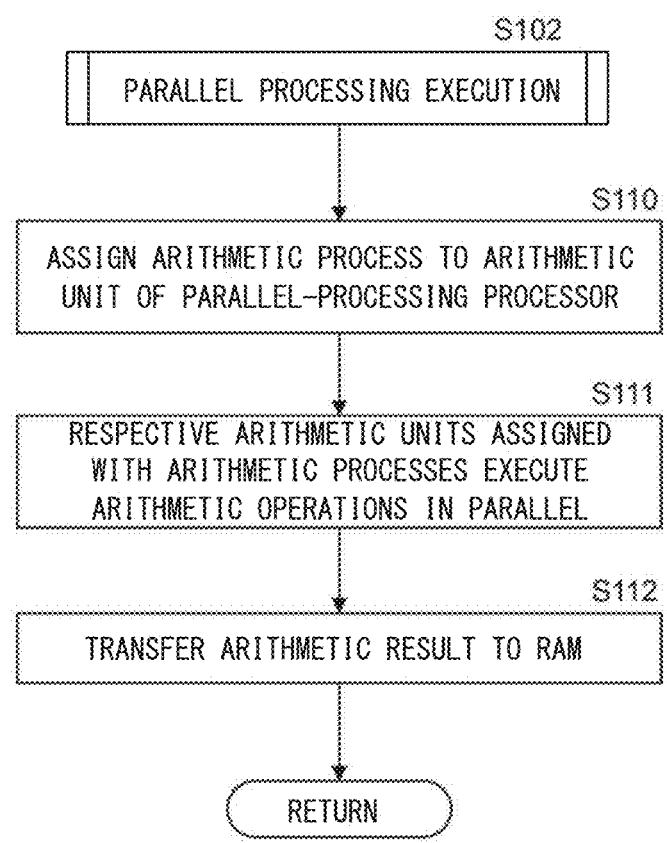
FIG. 57 is a flow chart of parallel processing execution.

FIG. 57 shows an operation example of the arithmetic processes of the parallel-processing processor 4833 executed on the basis of an instruction from the processor 4831 according to operation of the analysis software 4835*a*.

The processor 4831, which executes the analysis software 4835*a*, causes the parallel-processing processor 4833 to execute assignment of arithmetic processes to the arithmetic units 4836 (step S110). The processor 4831 causes the parallel-processing processor 4833 to execute assignment of arithmetic processes to the arithmetic units 4836 by calling a kernel function of the parallel-processing processor 4833. As shown in FIG. 54, for example, a matrix operation regarding the deep learning algorithm 60 is divided into a plurality of arithmetic processes, and the respective divided arithmetic processes are assigned to the arithmetic units 4836. A plurality of pieces of waveform data are sequentially inputted to the deep learning algorithm 60. A matrix operation corresponding to each piece of waveform data is divided into a plurality of arithmetic processes, to be assigned to the arithmetic units 4836.

The arithmetic processes are processed in parallel by a plurality of the arithmetic units 4836 (step S111). The arithmetic processes are executed on the plurality of pieces of waveform data.

Arithmetic results generated through the parallel processing by the plurality of the arithmetic units 4836 are transferred from the RAM 4837 to the RAM 4834 (step S112). For example, the arithmetic results are DMA-transferred from the RAM 4837 to the RAM 4834.

Configuration Example 2

Figure 58:
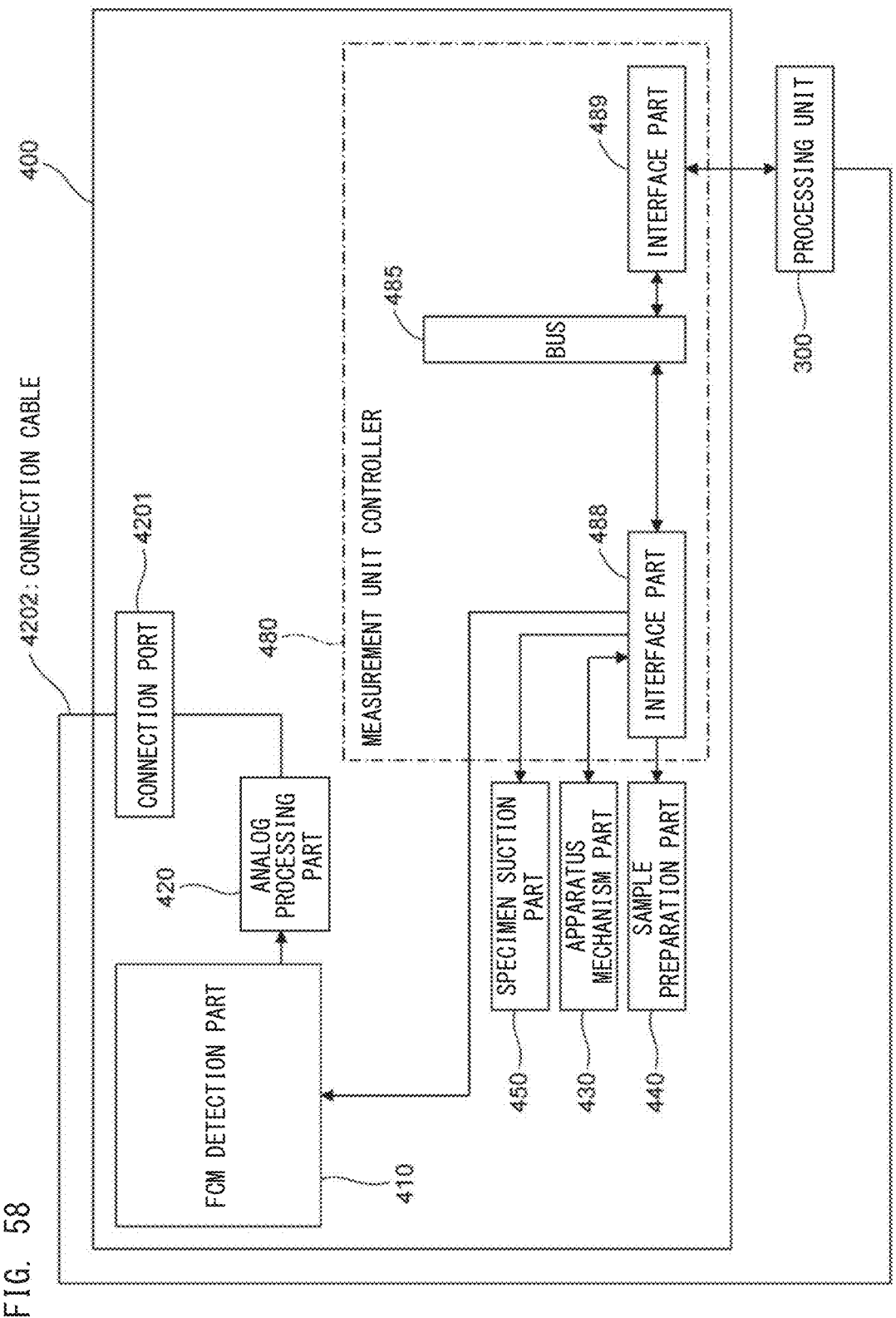
FIG. 58 is a block diagram showing another configuration example of the cell analyzer.
Figure 59:
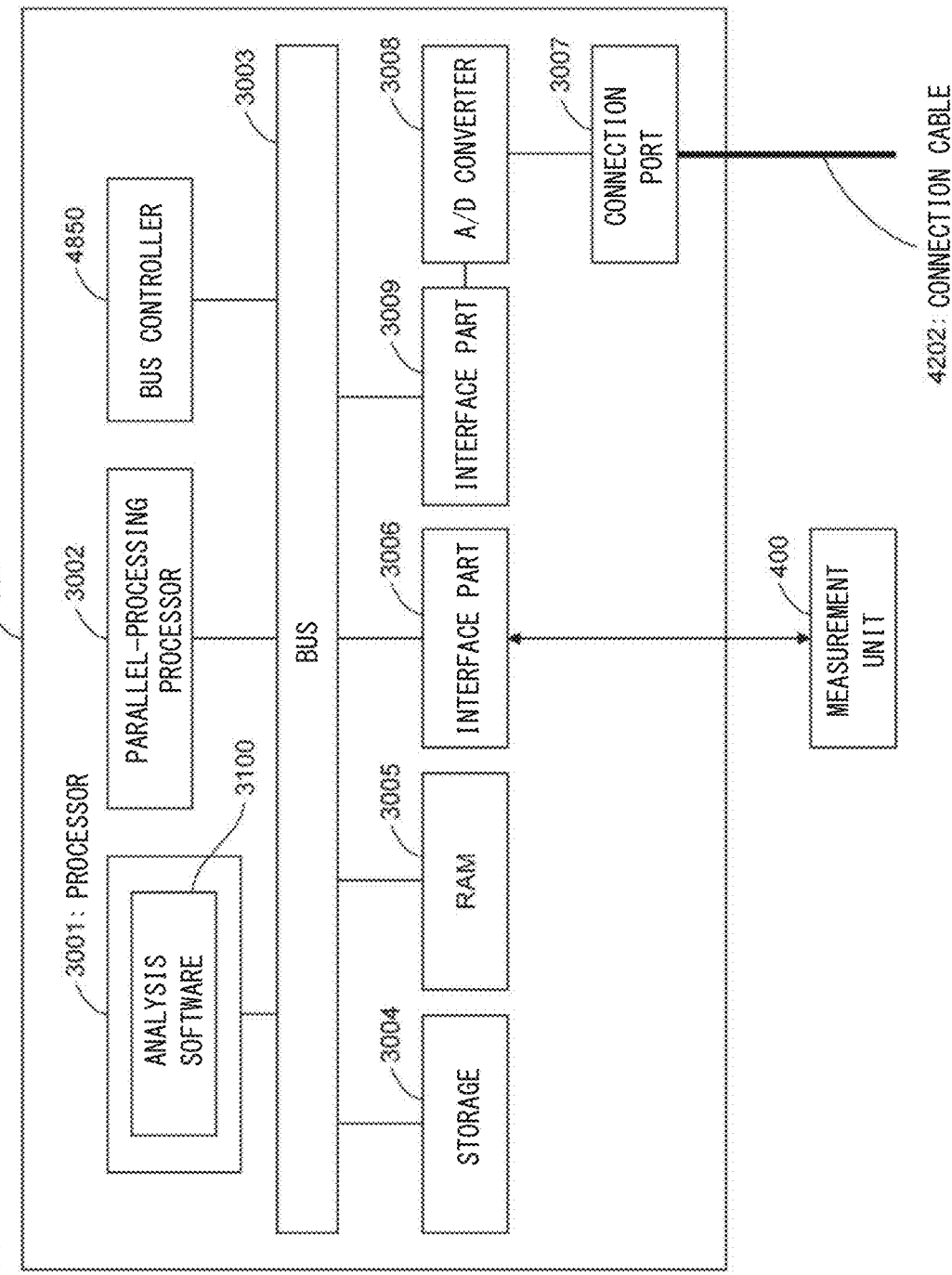
FIG. 59 is a block diagram showing another configuration example of the cell analyzer.

With reference to FIG. 58 and FIG. 59, another configuration example of the cell analyzer 100 composed of the measurement unit 400 and the processing unit 300 is described. In the present configuration example 2, a parallel-processing processor is provided in the processing unit 300.

FIG. 58 shows a block diagram of the measurement unit 400 of configuration example 2.

Except that the measurement unit 400 shown in FIG. 58 is not provided with the A/D converter 482, the processor 4831, the RAM 4834, the storage 4835, and the parallel-processing processor 4833, and is provided with a connection port 4201, the measurement unit 400 shown in FIG. 58 has configurations and functions similar to those of the measurement unit 400 of configuration example 1 described with reference to FIG. 1 to FIG. 57 and in related description thereof. A connection cable 4202 is connected to the connection port 4201.

FIG. 59 shows a block diagram of the processing unit 300 of configuration example 2.

As shown in FIG. 59, the processing unit 300 includes the processor 3001, a parallel-processing processor 3002, the storage 3004, a RAM 3005, the interface part 3006, an A/D converter 3008, the bus controller 4850, and an interface part 3009, and these are connected to the bus 3003. That is, in the example in FIG. 59, the parallel-processing processor 3002 is installed, in the cell analyzer 100, in the form of being incorporated in the processing unit 300.

The bus 3003 is a transmission line having a data transfer rate of not less than several hundred MB/s, for example. The bus 3003 may be a transmission line having a data transfer rate of not less than 1 GB/s. The bus 3003 performs data transfer in accordance with the PCI-Express or PCI-X standard, for example. Configurations of the processor 3001, the parallel-processing processor 3002, the storage 3004, and the RAM 3005, and processes executed by these are similar to the configurations and processes of the processor 4831, the parallel-processing processor 4833, the storage 4835, and the RAM 4834 described with reference to FIG. 47 to FIG. 57 above. The A/D converter 3008 samples each analog signal outputted from the measurement unit 400 as described above, and generates a digital signal including waveform data of cells. The generation method of the digital signal has been described above.

In the example in FIG. 58 and FIG. 59, the connection cable 4202 is provided with transmission paths the number of which corresponds to the types of analog signals transmitted from the measurement unit 400 to the processing unit 300, for example. For example, the connection cable 4202 is implemented as a twisted-pair cable, and has pairs of wires, the number of pairs corresponding to the types of analog signals transmitted to the processing unit 300. The transmission path from a connection port 3007 to the A/D converter 3008 may also have wires of which the number corresponds to the types of analog signals transmitted to the processing unit 300. In the transmission path from the connection port 3007 to the A/D converter 3008, the analog signals are transmitted as differential signals, for example.

Figure 60:
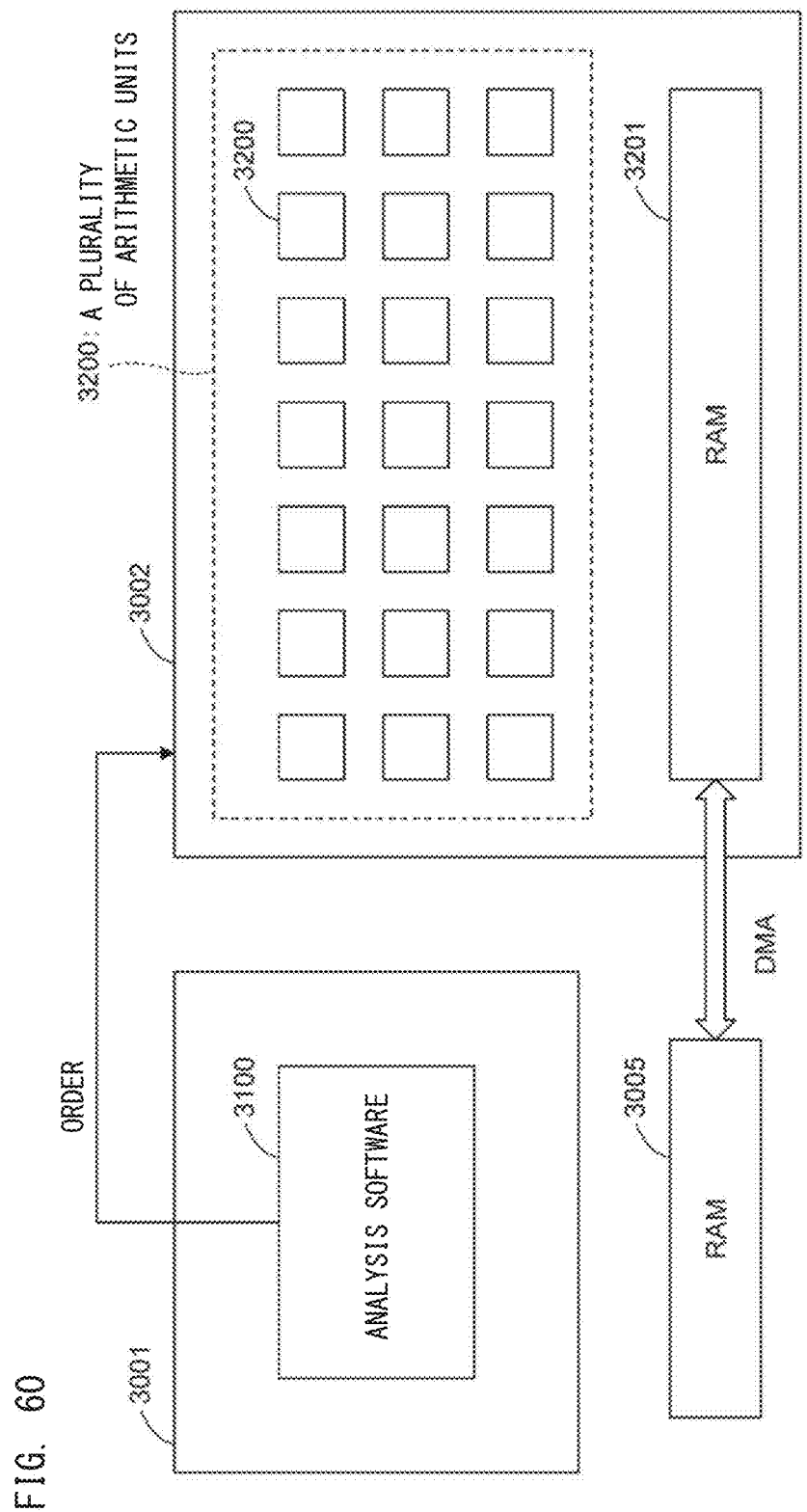
FIG. 60 is a schematic diagram showing control of the parallel-processing processor by the processor in another configuration example of the cell analyzer.

As shown in FIG. 60, the processor 3001 and the parallel-processing processor 3002 have configurations and functions similar to those of the processor 4831 and the parallel-processing processor 4833 described above. The parallel-processing processor 3002 includes a plurality of arithmetic units 3200 and a RAM 3201. Analysis software 3100 for analyzing cell types of each measured cell is executed on the processor 3001. The parallel-processing processor 3002 may not necessarily be directly connected to the bus 3003. For example, the parallel-processing processor 3002 may be mounted to a USB device, and this USB device may be connected to the bus 3003 via an interface part (not shown), whereby the parallel-processing processor 3002 may be installed to the cell analyzer 100 as a part of the processing unit 300. This USB device may be a small device such as a USB dongle, for example.

As shown in FIG. 58 and FIG. 59, the processing unit 300 is connected to the interface part 489 of the measurement unit 400 via the interface part 3006. The processing unit 300 transmits control signals of the apparatus mechanism part 430 and the sample preparation part 440, to the measurement unit 400 via the interface part 3006. The interface part 3006 is a USB interface, for example.

In the example shown in FIG. 58 and FIG. 59, the processing unit 300 is connected to the connection port 4201 of the measurement unit 400 via the connection port 3007 connected to the A/D converter 3008 and the connection cable 4202 connected to the connection port 3007, in addition to the interface part 3006. The connection port 4201 is connected to the analog processing part 420. Each analog signal outputted from the connection port 4201 to the processing unit 300 is a signal obtained as a result of the output of the FCM detection part 410 of the measurement unit 400 being processed by the analog processing part 420, as described above. The analog processing part 420 performs a process including noise removal on the analog signal inputted from the FCM detection part 410. The analog signal having been processed by the analog processing part 420 is transmitted to the processing unit 300 via the connection port 4201 and the connection cable 4202. The connection cable 4202 is formed to have a length of, for example, 1 meter or less in order to reduce noise during signal transmission. The analog signal is transmitted as a differential signal to the processing unit 300 via the connection cable 4202, for example. In this case, the connection cable 4202 is preferably a twisted-pair cable.

The processing unit 300 may include a plurality of the connection ports 3007. The processing unit 300 may obtain analog signals from a plurality of the measurement units 400 via a plurality of the connection ports 3007.

Each analog signal transmitted from the measurement unit 400 via the connection cable 4202 is converted into a digital signal by the A/D converter 3008 of the processing unit 300.

As described with reference to FIG. 5, for example, the A/D converter 3008 samples the analog signal transmitted at a predetermined sampling rate (e.g., sampling at 1024 points at a 10 nanosecond interval, sampling at 128 points at an 80 nanosecond interval, sampling at 64 points at a 160 nanosecond interval, or the like), and generates waveform data for each cell. The waveform data is stored into the storage 3004 or the RAM 3005 via the bus 3003. The waveform data is DMA-transferred to the RAM 3005, for example. The processor 3001 and the parallel-processing processor 3002 execute arithmetic processes on the waveform data stored in the storage 3004 or the RAM 3005.

The analysis software 3100, which operates on the processor 3001, has functions similar to those of the analysis software 4835a shown in FIG. 52. The processor 3001 executes the analysis software 3100, thereby generating classification information regarding cell types of each measured cell, through operations similar to those described with reference to FIG. 52, FIG. 53A, FIG. 53B, FIG. 54, FIG. 56, and FIG. 57 and in related description thereof.

In the case of the cell analyzer 100 of configuration example 2 shown in FIG. 58 and FIG. 59, in the flow chart shown in FIG. 10, generation of waveform data and feature parameters in step S12 and cell classification by the deep learning algorithm in step S13 are performed in the processing unit 300. Step S14 (transmission of classification information) is omitted. The processes in FIG. 56 and FIG. 57 are performed by the processor 3001 and the parallel-processing processor 3002 of the processing unit 300.

Configuration Example 3

Figure 61:
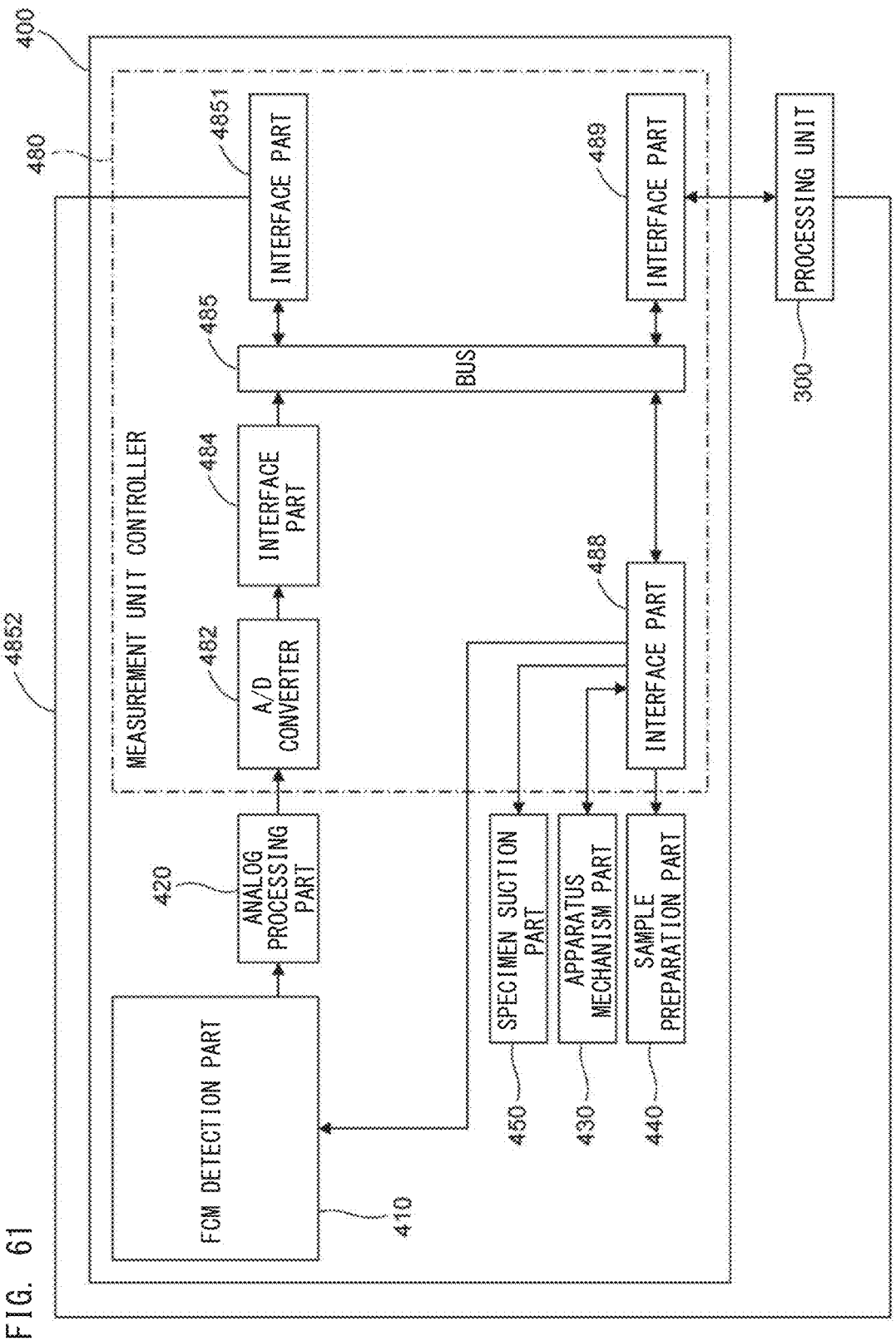
FIG. 61 is a block diagram showing another configuration example of the cell analyzer.
Figure 62:
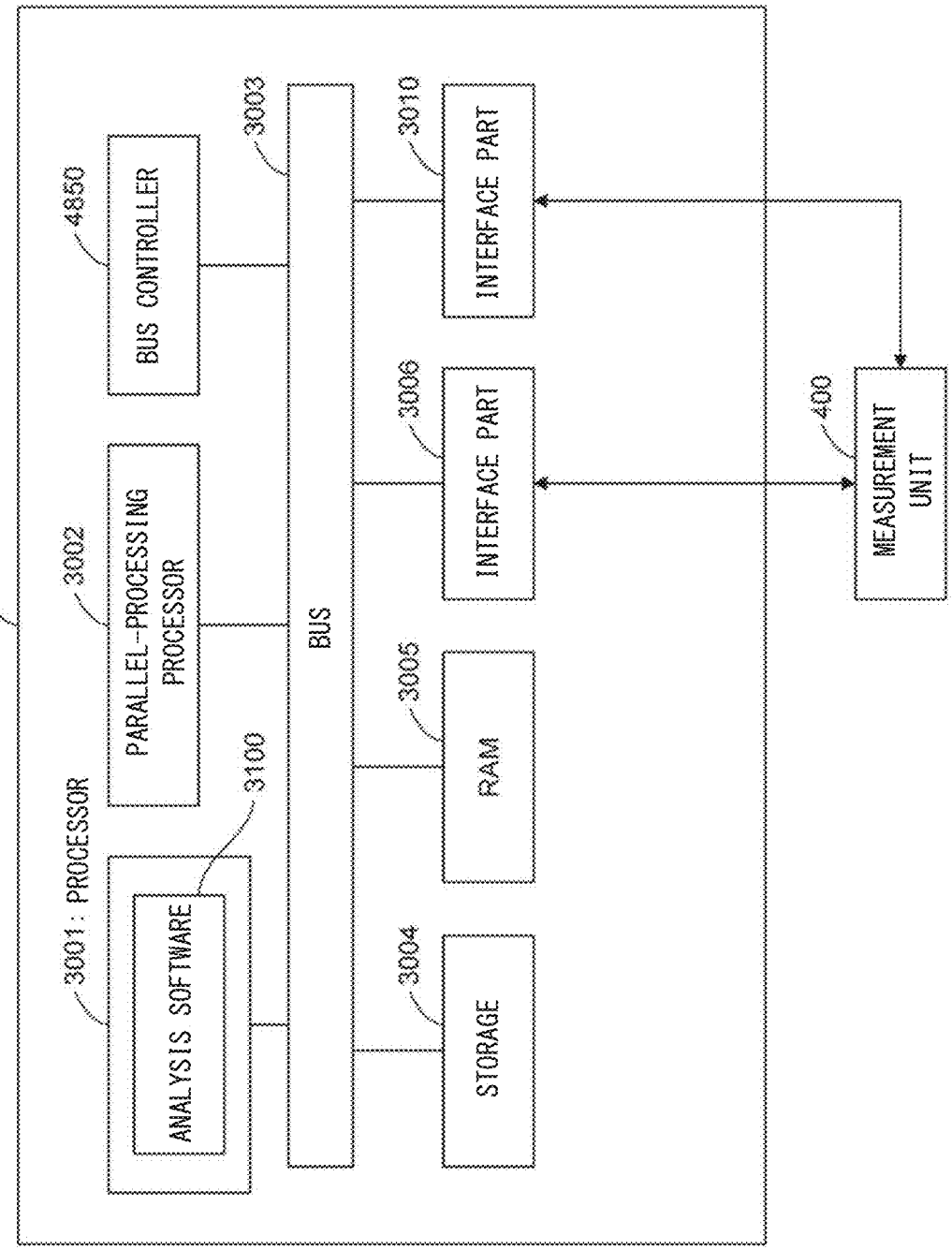
FIG. 62 is a block diagram showing another configuration example of the cell analyzer.

With reference to FIG. 61 and FIG. 62, another configuration example of the cell analyzer 100 composed of the measurement unit 400 and the processing unit 300 is described. In the present configuration example 3 as well, the parallel-processing processor 3002 is installed, in the cell analyzer 100, in the form of being incorporated in the processing unit 300.

FIG. 61 shows a block diagram of the measurement unit 400 of configuration example 3.

Except that the measurement unit 400 shown in FIG. 61 is not provided with the processor 4831, the RAM 4834, the storage 4835, and the parallel-processing processor 4833, and is provided with an interface part 4851 and a transmission line 4852 for transmitting the digital signals generated in the A/D converter 482 to the processing unit 300, the measurement unit 400 shown in FIG. 61 has configurations and functions similar to those of the measurement unit 400 of configuration example 1 described with reference to FIG. 2 and FIG. 47 and in related description thereof.

The interface part 4851 is an interface serving as a dedicated line having a communication band of not less than 1 gigabit/second, for example. For example, the interface part 4851 is an interface according to Gigabit Ethernet, USB 3.0, or Thunderbolt 3. When the interface part 4851 is according to Gigabit Ethernet, the transmission line 4852 is a LAN cable, for example. When the interface part 4851 is according to USB 3.0, the transmission line 4852 is a USB cable according to USB 3.0. The transmission line 4852 is a dedicated transmission line for transmitting the digital signals between the measurement unit 400 and the processing unit 300, for example.

FIG. 62 shows a block diagram of the processing unit 300 of configuration example 3.

Except that the processing unit 300 shown in FIG. 62 is not provided with the A/D converter 3008 and the connection port 3007, and is provided with an interface part 3010, the processing unit 300 shown in FIG. 62 has configurations and functions similar to those of the processing unit 300 of configuration example 2 described with reference to FIG. 59 and in related description thereof. The processing unit 300 may be connected to a plurality of the measurement units 400 via a plurality of the interface parts 3010 and a plurality of the interface parts 3006.

The processor 3001 and the parallel-processing processor 3002 have configurations and functions similar to those of the processor 3001 and the parallel-processing processor 3002 described with reference to FIG. 60 and in related description thereof. In FIG. 62, the parallel-processing processor 3002 may not necessarily be directly connected to the bus 3003. For example, the parallel-processing processor 3002 may be mounted to a USB device, and this USB device may be connected to the bus 3003 via an interface part (not shown). This USB device may be a small device such as a USB dongle, for example.

The analysis software 3100, which operates on the processor 3001, has functions similar to those of the analysis software 4835a shown in FIG. 52. The analysis software 3100 analyzes cell types of each measured cell, through operations similar to those described with reference to FIG. 52, FIG. 53A, FIG. 53B, FIG. 54, FIG. 56, and FIG. 57 and in related description thereof.

In the case of the cell analyzer 100 of configuration example 3 shown in FIG. 61 and FIG. 62, in the flow chart shown in FIG. 10, step S13 (cell classification) is performed in the processing unit 300. Step S14 (transmission of classification information) is omitted. The processes in FIG. 56 and FIG. 57 are performed by the processor 3001 and the parallel-processing processor 3002 of the processing unit 300.

In the configuration in FIG. 61 and FIG. 62, analog signals (forward scattered light signal, side scattered light signal, side fluorescence signal) of each cell generated in the FCM detection part 410 are converted into digital signals by the A/D converter 482 in the measurement unit 400. The digital signals are sent to the processing unit 300 via the interface part 484, the bus 485, the interface part 4851, and the transmission line 4852. The transmission line 4852 is a dedicated transmission line for transmitting the digital signals between the measurement unit 400 and the processing unit 300 as described above. For example, the measurement unit 400 and the processing unit 300 are connected in a one-to-one relationship via the transmission line 4852. In other words, the transmission line 4852 is a transmission line that provides no transmission of data related to an apparatus other than components (e.g., the measurement unit 400 and the processing unit 300) forming the cell analyzer 100, for example. The transmission line 4852 is a transmission line different from an intranet or the internet, for example. Accordingly, even when digital signals generated through A/D conversion in the measurement unit 400 are transmitted to the processing unit 300, bottleneck in the communication speed of transmission of the digital signals can be avoided.

Configuration Example 4

With reference to FIG. 63, FIG. 64, FIG. 65, FIG. 66, and FIG. 67, configuration example 4 of the cell analyzer 100 is described.

Figure 63:
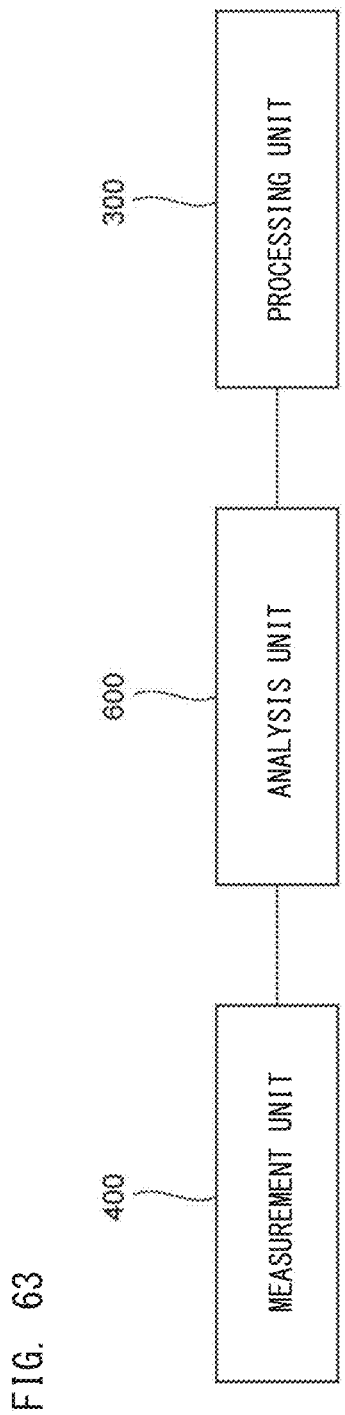
FIG. 63 is a block diagram showing another configuration example of the cell analyzer.

In the present configuration example 4, as shown as an example in FIG. 63, an analysis unit 600 is provided between the measurement unit 400 and the processing unit 300. That is, in the configuration in FIG. 63, FIG. 64, FIG.

Figure 66:
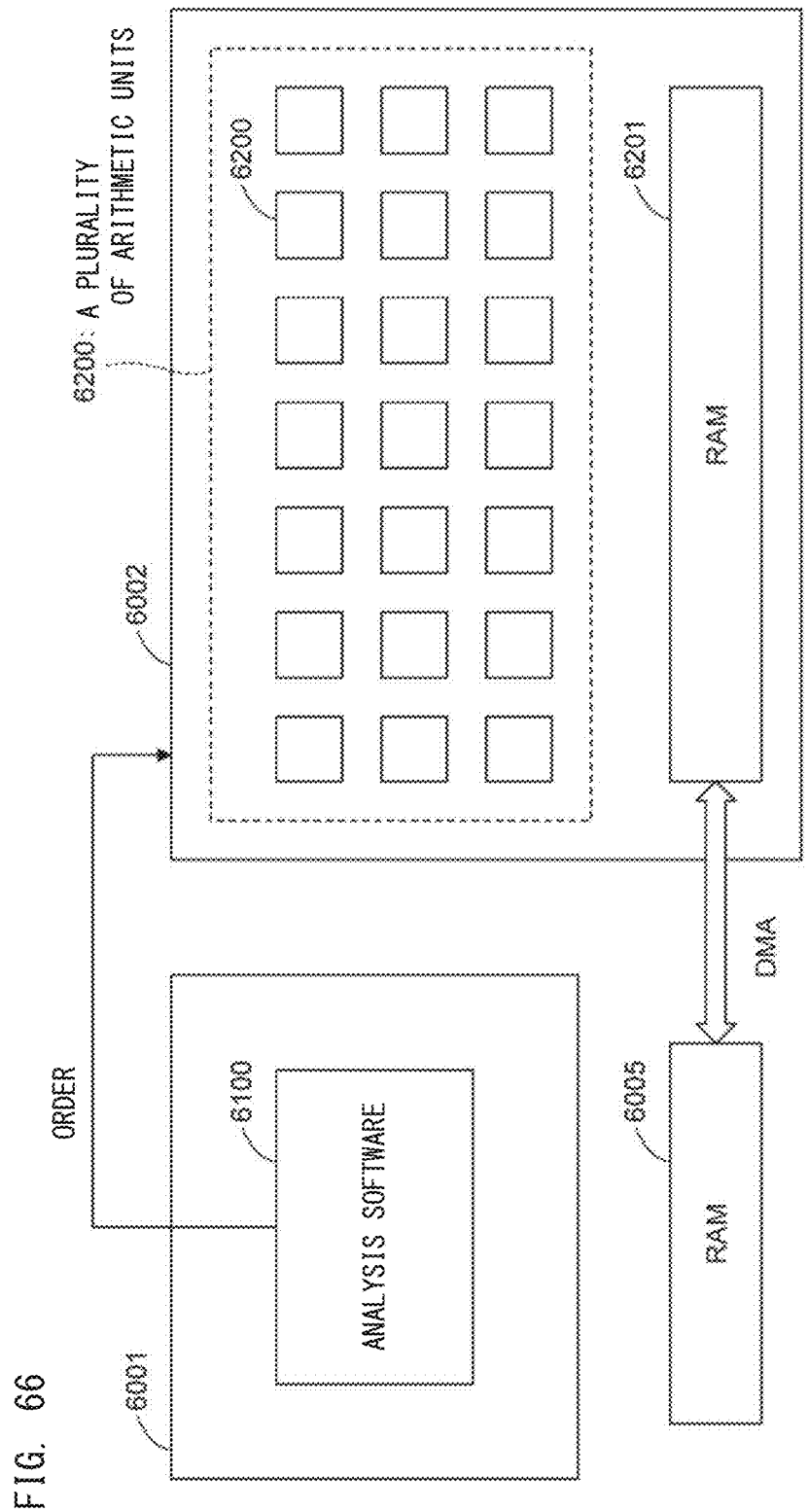
FIG. 66 is a schematic diagram showing control of the parallel-processing processor by the processor in another configuration example of the cell analyzer.
Figure 67:
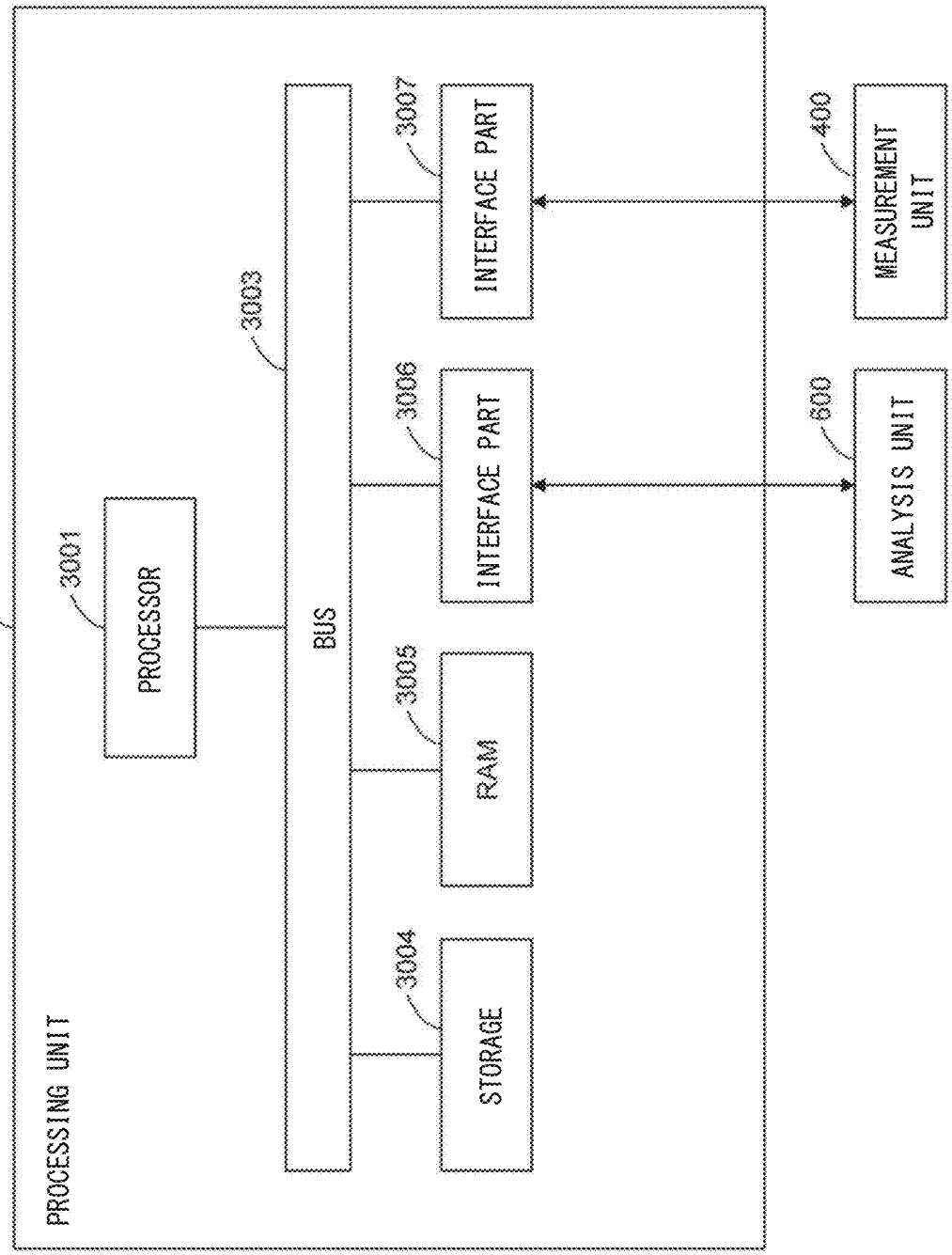
FIG. 67 is a block diagram showing another configuration example of the cell analyzer.

65, FIG. 66, and FIG. 67, the cell analyzer 100 is composed of the measurement unit 400, the processing unit 300, and the analysis unit 600. The analysis unit 600 analyzes cell types of each measured cell. As described later, in the present configuration example, a parallel-processing processor 6002 is installed, in the cell analyzer 100, in the form of being incorporated in the analysis unit 600.

Figure 64:
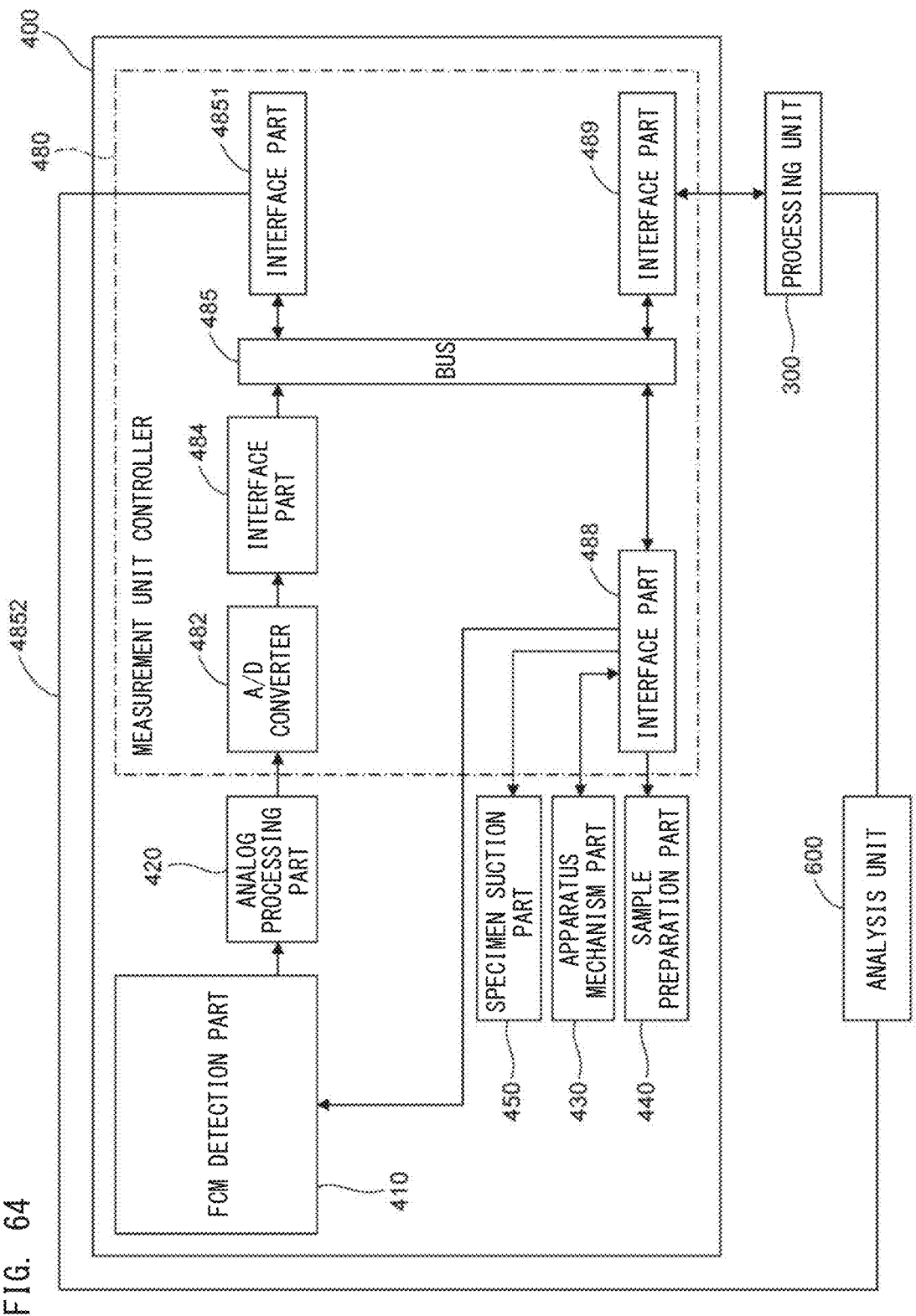
FIG. 64 is a block diagram showing another configuration example of the cell analyzer.

FIG. 64 shows a configuration of the measurement unit 400 of configuration example 4.

The measurement unit 400 shown as an example in FIG. 64 has configurations and functions similar to those of the measurement unit 400 of configuration example 3 described with reference to FIG. 61 and in related description thereof. The analysis unit 600 is provided between the measurement unit 400 and the processing unit 300. The analysis unit 600 may be connected to a plurality of the measurement units 400. The analysis unit 600 may be connected to a plurality of the processing units 300. The interface part 4851 is an interface having a communication band of not less than 1 gigabit/second, for example. For example, the interface part 4851 is an interface according to Gigabit Ethernet, USB 3.0, or Thunderbolt 3. When the interface part 4851 is according to Gigabit Ethernet, the transmission line 4852 is a LAN cable, for example. When the interface part 4851 is according to USB 3.0, the transmission line 4852 is a USB cable according to USB 3.0. The transmission line 4852 is a dedicated transmission line for transmitting the digital signals between the measurement unit 400 and the processing unit 300 as described above. For example, the measurement unit 400 and the processing unit 300 are connected in a one-to-one relationship via the transmission line 4852.

Figure 65:
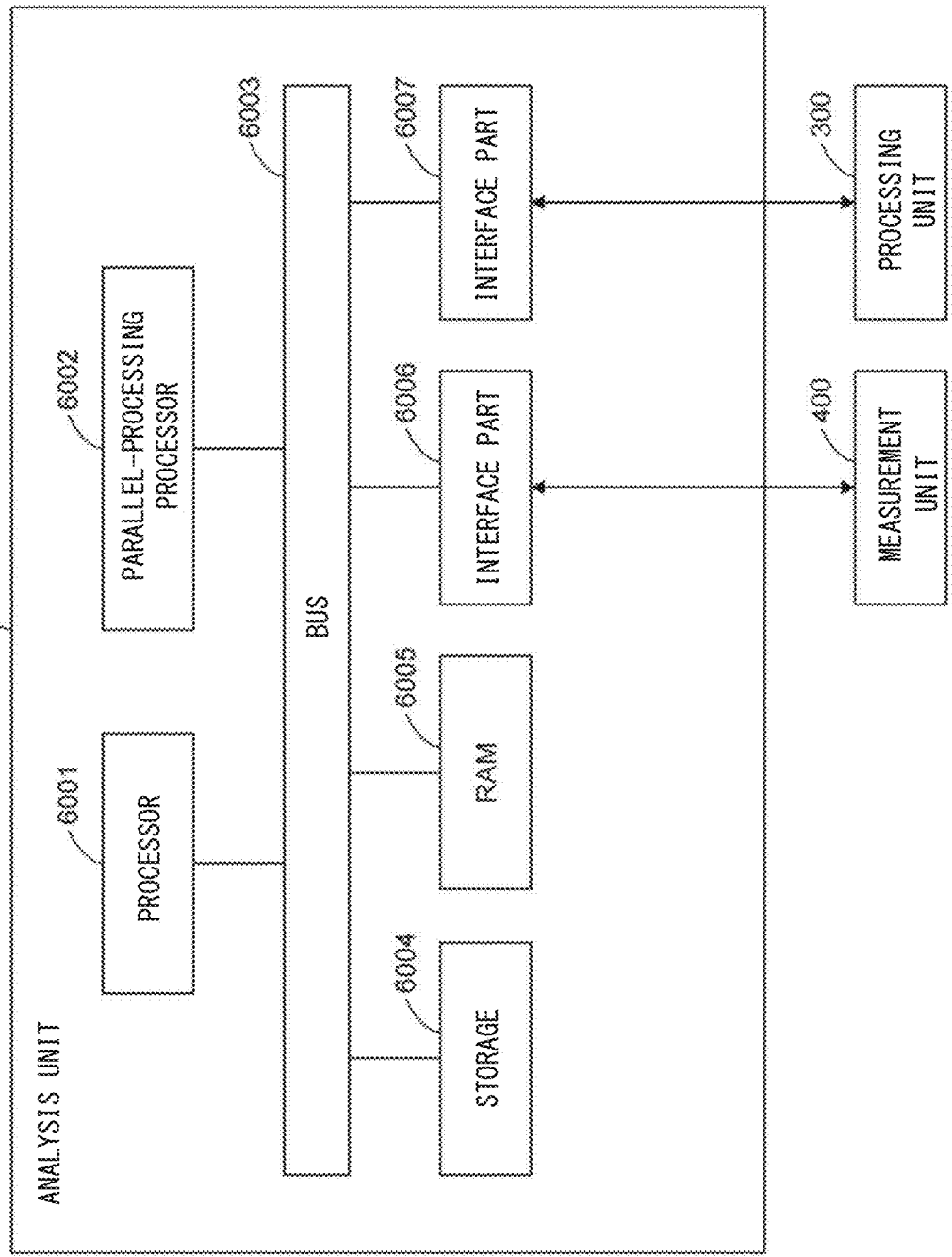
FIG. 65 is a block diagram showing another configuration example of the cell analyzer.

FIG. 65 shows a configuration example of the analysis unit 600.

The analysis unit 600 includes a processor 6001, the parallel-processing processor 6002, a bus 6003, a storage 6004, a RAM 6005, an interface part 6006, and an interface part 6007, for example, and these are connected to the bus 6003. The bus 6003 is a transmission line having a data transfer rate of not less than several hundred MB/s, for example. The bus 6003 may be a transmission line having a data transfer rate of not less than 1 GB/s. The bus 6003 performs data transfer in accordance with the PCI-Express or PCI-X standard, for example. The analysis unit 600 may be connected to a plurality of the measurement units 400 via a plurality of the interface parts 6006. When a plurality of the measurement units 400 are provided, an analysis unit 600 may be connected to each of the measurement units 400 (e.g., a plurality of the measurement units 400 and a plurality of the analysis units 600 are connected in a one-to-one relationship).

As shown in FIG. 66, the processor 6001 and the parallel-processing processor 6002 have configurations and functions similar to those of the processor 4831 and the parallel-processing processor 4833 described above. The parallel-processing processor 6002 includes a plurality of arithmetic units 6200 and a RAM 6201. Analysis software 6100, which analyzes cell types of each measured cell, operates on the processor 6001. The analysis software 6100, which operates on the processor 6001, has functions similar to those of the analysis software 4835a shown in FIG. 52. The analysis software 6100 analyzes cell types of each measured cell through operations similar to those described with reference to FIG. 52, FIG. 53A, FIG. 53B, FIG. 54, FIG. 55A, FIG. 55B, FIG. 56, and FIG. 57, and in related description thereof. The analysis software 6100 transmits classification information of each measured cell to the processing unit 300 via the interface part 6007. The interface part 6007 is of Ethernet (registered trademark) or USB, for example. The interface part 6007 may be an interface capable of performing wireless communication (e.g., WiFi (registered trademark), Bluetooth (registered trademark)).

FIG. 67 shows a configuration of the processing unit 300 of configuration example 4.

The processing unit 300 shown in FIG. 67 may not necessarily include the parallel-processing processor 3002, unlike the processing unit 300 shown in FIG. 59 and FIG. 62. In addition, the analysis software 3100 shown in FIG. 59 and FIG. 62 may not necessarily operate on the processor 3001 shown in FIG. 67. The processing unit 300 receives analysis results of the analysis unit 600 via the interface part 3006. The interface part 3006 is of Ethernet or USB, for example. The interface part 3006 may be an interface capable of performing wireless communication (e.g., WiFi, Bluetooth).

In the configuration in FIG. 64, FIG. 65, FIG. 66, and FIG. 67, analog signals (forward scattered light signal, side scattered light signal, side fluorescence signal) of each cell generated in the FCM detection part 410 are converted into digital signals by the A/D converter 482 in the measurement unit 400. Waveform data is sent to the analysis unit 600 via the interface part 484, the bus 485, the interface part 4851, and the transmission line 4852. The interface part 4851 is a dedicated interface that connects the measurement unit 400 and the analysis unit 600 to each other as described above, and the interface part 4851 connects the measurement unit 400 and the analysis unit 600 in a one-to-one relationship. In other words, the transmission line 4852 is a transmission line that provides no transmission of data related to an apparatus other than components (e.g., the measurement unit 400 and the processing unit 300) forming the cell analyzer 100, for example. The transmission line 4852 is a transmission line different from an intranet or the internet, for example. Accordingly, even when digital signals generated through A/D conversion in the measurement unit 400 are transmitted to the processing unit 300, bottleneck in the communication speed of transmission of the digital signals can be avoided.

In the case of the cell analyzer 100 of configuration example 4 shown in FIG. 64, FIG. 65, FIG. 66, and FIG. 67, in the flow chart shown in FIG. 10, step S13 (cell classification) and step S14 (transmission of classification information) are performed in the analysis unit 600. That is, the digital signals generated in step S13 are transmitted from the measurement unit 400 to the analysis unit 600, and classification information is transmitted to the processing unit 300 in step S14. The processes in FIG. 56 and FIG. 57 are performed by the processor 6001 and the parallel-processing processor 6002 of the analysis unit 600.

Configuration Example 5

Figure 68:
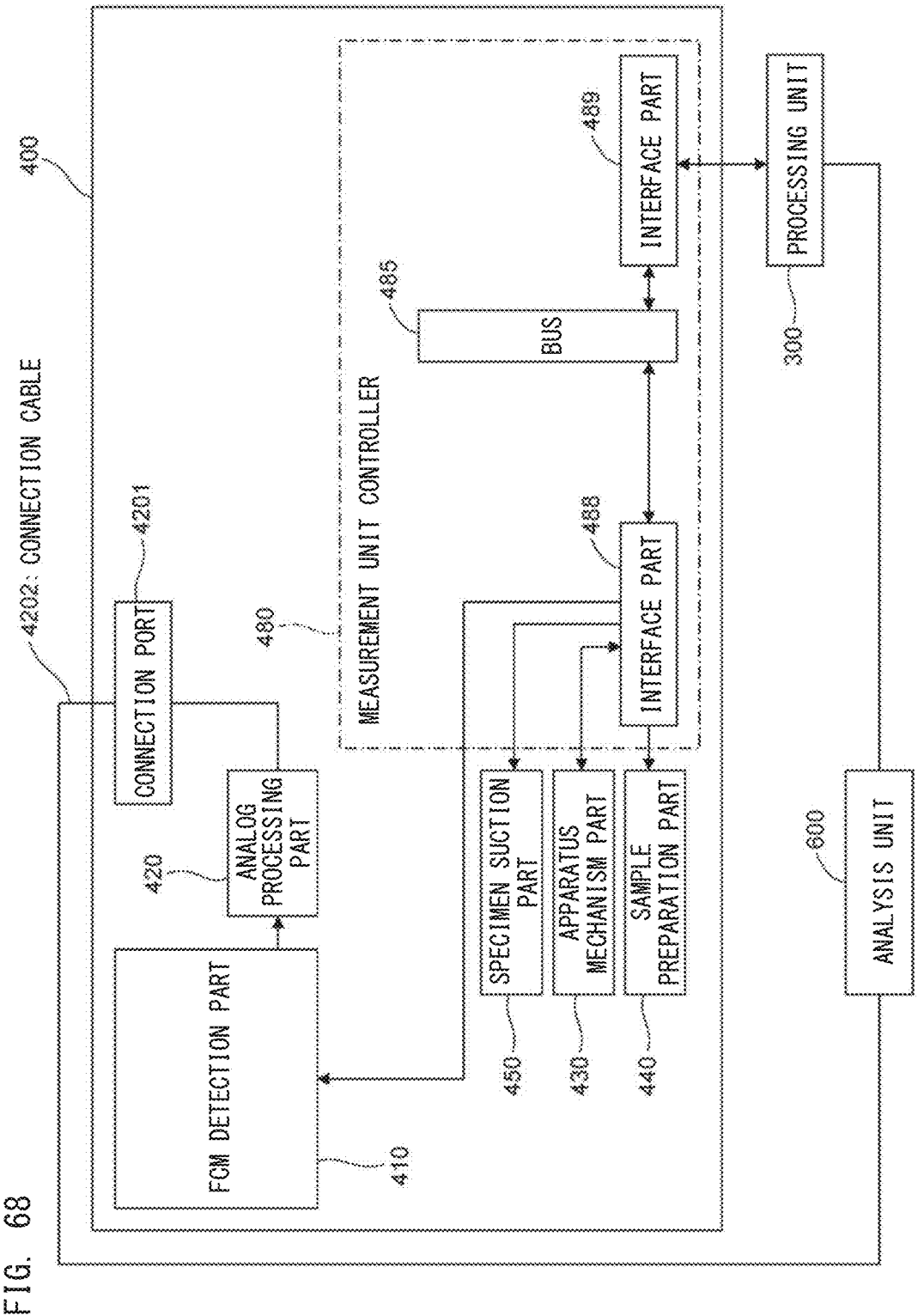
FIG. 68 is a block diagram showing another configuration example of the cell analyzer.

With reference to FIG. 63, FIG. 67, and FIG. 68, configuration example 5 of the cell analyzer 100 is described.

The cell analyzer 100 of this configuration example 5 also includes the measurement unit 400, the processing unit 300, and the analysis unit 600, as in the case of configuration example 4 described above. The measurement unit 400 of configuration example 5 shown in FIG. 68 has functions and configurations similar to those of the measurement unit 400 described with reference to FIG. 58 and in related description thereof. The measurement unit 400 of configuration example 5 shown in FIG. 68 is connected to the analysis unit 600 via the connection cable 4202. For example, the connection cable 4202 is implemented as a twisted-pair cable, and has pairs of wires, the number of pairs corresponding to the types of analog signals transmitted to the processing unit 300. The connection cable 4202 is formed to have a length of, for example, 1 meter or less in order to reduce noise during signal transmission. The measurement unit 400 transmits analog signals to the analysis unit 600 via the connection cable 4202.

The analysis unit 600 shown in FIG. 69 has functions and configurations similar to those of the analysis unit 600 described with reference to FIG. 65 and in related description thereof. That is, in the example in FIG. 69, the parallel-processing processor 6002 is installed, in the cell analyzer 100, in the form of being incorporated in the analysis unit 600. The analysis unit 600 shown in FIG. 69 further includes a connection port 6008 and an A/D converter 6009. Analog signals transmitted from the measurement unit 400 via the connection cable 4202 are inputted to the A/D converter 6009 via the connection port 6008. The A/D converter 6009 converts the analog signals into digital signals through a process similar to that performed by the A/D converter 482.

The analysis unit 600 may be connected to a plurality of the measurement units 400 via a plurality of the connection ports 6008. When a plurality of the measurement units 400 are provided, an analysis unit 600 may be connected to each of the measurement units 400 (e.g., a plurality of the measurement units 400 and a plurality of the analysis units 600 are connected in a one-to-one relationship).

As shown in FIG. 66, the processor 6001 and the parallel-processing processor 6002 have configurations and functions similar to those of the processor 4831 and the parallel-processing processor 4833 described above. The analysis software 6100, which analyzes cell types of each measured cell, operates on the processor 6001. The analysis software 6100, which operates on the processor 6001, has functions similar to those of the analysis software 4835*a* shown in FIG. 52. The analysis software 6100 analyzes cell types of each measured cell through operations similar to those described with reference to FIG. 52, FIG. 53A, FIG. 53B, FIG. 54, FIG. 55A, FIG. 55B, FIG. 56, and FIG. 57, and in related description thereof. The analysis software 6100 transmits analysis results of cell types of each measured cell to the processing unit 300 via the interface part 6007. The interface part 6007 is of Ethernet or USB, for example. The interface part 6007 may be an interface capable of performing wireless communication (e.g., WiFi, Bluetooth).

Figure 69:
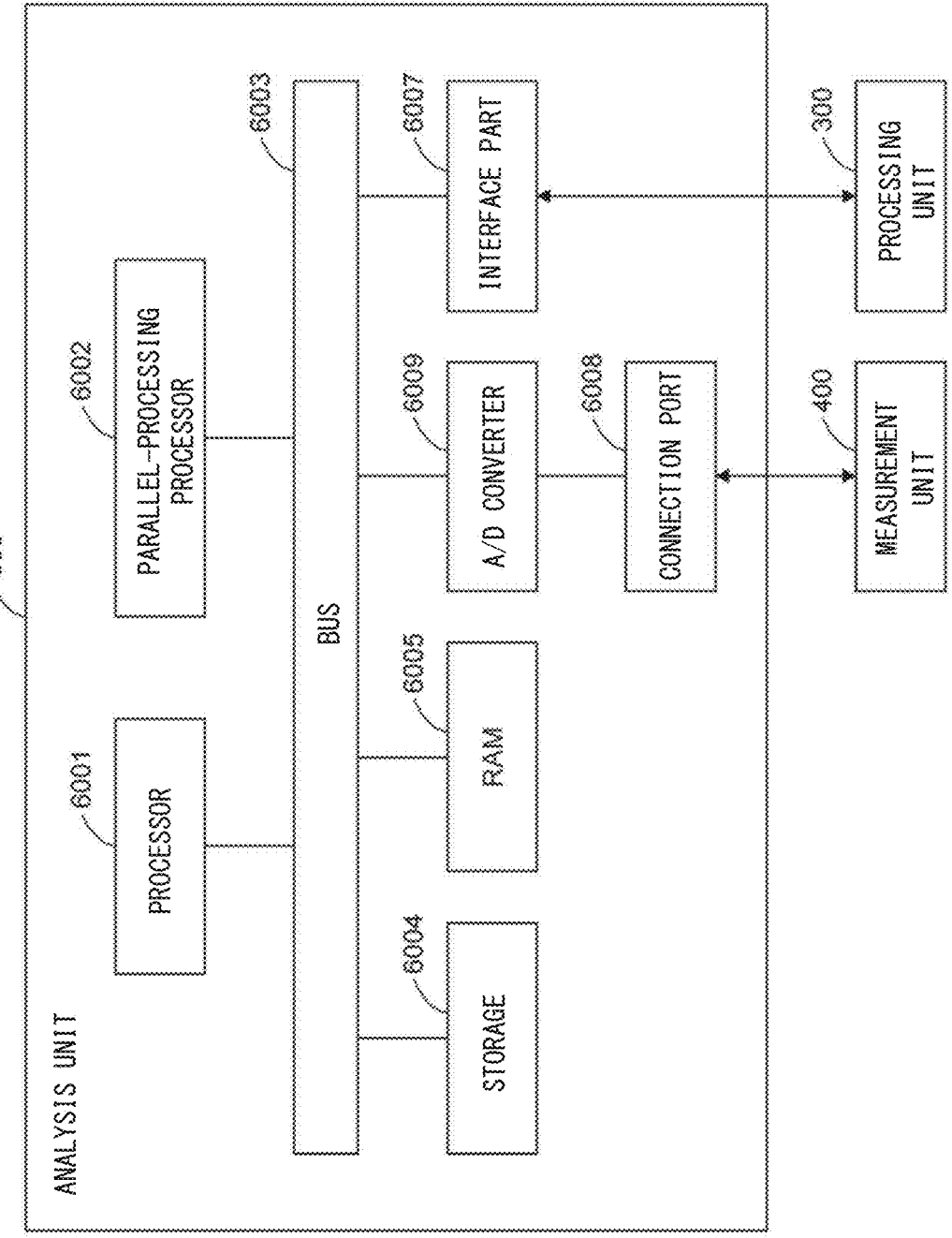
FIG. 69 is a block diagram showing another configuration example of the cell analyzer.

In the case of the cell analyzer 100 of configuration example 5 shown in FIG. 68 and FIG. 69, in the flow chart shown in FIG. 10, generation of waveform data and feature parameters in step S12, step S13 (cell classification), and step S14 (transmission of classification information) are performed in the analysis unit 600. That is, generation of waveform data (step S12) is performed in the A/D converter 6009 of the analysis unit 600, cell classification based on digital signals (step S13) is performed by the processor 6001 and the parallel-processing processor 6002 of the analysis unit 600, and classification information is transmitted from the analysis unit 600 to the processing unit 300 (step S14). The processes in FIG. 56 and FIG. 57 are performed by the processor 6001 and the parallel-processing processor 6002 of the analysis unit 600.

9. Neural Network Structure and Training of Deep Learning Algorithm 60

(Structure of Neural Network)

Figure 70A:
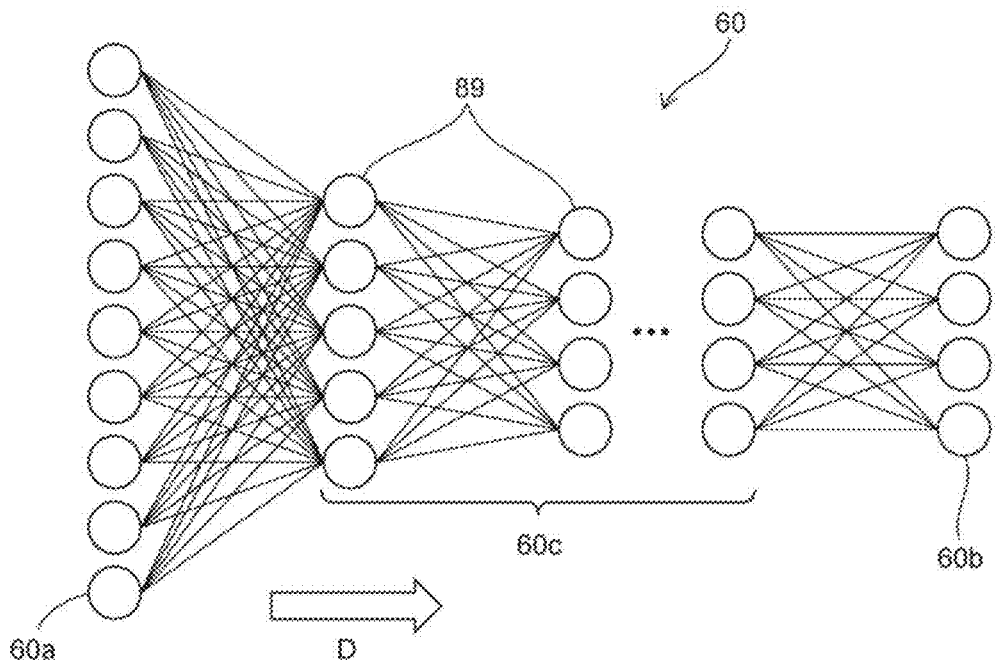
FIG. 70A illustrates a structure of a neural network.

FIG. 70A shows, as an example, a structure of a convolution neural network which realizes the deep learning algorithm 60.

The neural network includes an input layer 60*a*, an output layer 60*b*, and a middle layer 60*c* between the input layer 60*a* and the output layer 60*b*. The middle layer 60*c* is composed of a plurality of layers. The number of layers forming the middle layer 60*c* may be, for example, not less than 5, preferably not less than 50, and more preferably not less than 100.

In the neural network, a plurality of nodes 89 arranged in a layered manner are connected between the layers. Accordingly, information is propagated only in one direction indicated by an arrow D in the drawing, from the input-side input layer 60*a* to the output-side the output layer 60*b*.

(Arithmetic Operation at Each Node)

Figure 70B:
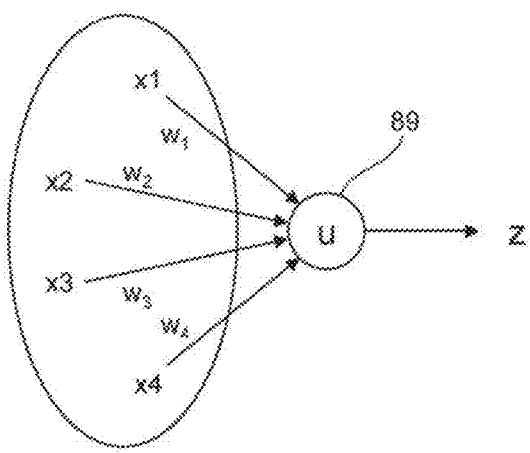
FIG. 70B illustrates a structure of the neural network.

FIG. 70B is a schematic diagram showing arithmetic operations performed at each node.

Each node 89 receives a plurality of inputs, and calculates one output (z). In the case of the example shown in FIG. 70B, the node 89 receives four inputs. The total input (u) received by the node 89 is expressed by Formula 2 below, for example. In the present embodiment, one-dimensional matrix data is used as training input data and analysis input data. Therefore, when variables of the arithmetic expression correspond to two-dimensional matrix data, a process of converting the variables so as to correspond to one-dimensional matrix data is performed.

$$u = w_1 x_1 + w_2 x_2 + w_3 x_3 + w_4 x_4 + b \quad \text{(Formula 2)[Math 2]}$$

Each input is multiplied by a different weight. In Formula 2, b is a value called bias. The output (z) of the node serves as an output of a predetermined function f with respect to the total input (u) expressed by Formula 2, and is expressed by Formula 3 below. The function f is called an activation function.

$$z = f(u) \quad \text{(Formula 3)[Math 3]}$$

Figure 70C:
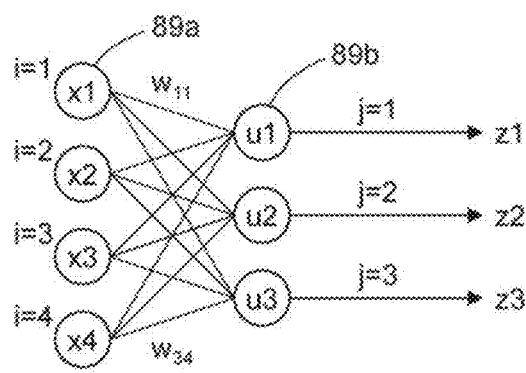
FIG. 70C illustrates a structure of the neural network.

FIG. 70C is a schematic diagram showing arithmetic operations between nodes.

In the neural network, with respect to the total input (u) of each node 89 expressed by Formula 2, nodes that output results (z) each expressed by Formula 3 are arranged in a layered manner. Outputs of the nodes of the previous layer serve as inputs to nodes of the next layer. In the example shown in FIG. 70C, the outputs from nodes 89*a* in the left layer in FIG. 70C serve as inputs to nodes 89*b* in the right layer. Each node 89*b* receives outputs from the nodes 89*a*. The connection between each node 89*a* and each node 89*b* is multiplied by a different weight. When the respective outputs from the plurality of nodes 89*a* are defined as x1 to x4, the inputs to the respective three nodes 89*b* are expressed by Formula 4-1 to Formula 4-3 below.

$$u_1 = w_{11} x_1 + w_{12} x_2 + w_{13} x_3 + w_{14} x_4 + b_1 \quad \text{(Formula 4-1)}$$

$$u_2 = w_{21} x_1 + w_{22} x_2 + w_{23} x_3 + w_{24} x_4 + b_2 \quad \text{(Formula 4-2)}$$

$$u_3 = w_{31} x_1 + w_{32} x_2 + w_{33} x_3 + w_{34} x_4 + b_3 \quad \text{(Formula 4-3)[Math 4]}$$

When Formula 4-1 to Formula 4-3 are generalized, Formula 4-4 below is obtained. Here, i=1, . . . , I, j=1, . . . , J. I is the total number of inputs, and J is the total number of outputs.

$$u_j = \Sigma_{i=1}^{I} w_{ji} x_i + b_j \quad \text{(Formula 4-4)[Math 5]}$$

When Formula 4-4 is applied to the activation function, an output is obtained. The output is expressed by Formula 5 below.

$$z_j = f(u_j) (j=1,2,3) \quad \text{(Formula 5)[Math 6]}$$

(Activation Function)

In the cell type analysis method according to the embodiment, a rectified linear unit function is used as the activation function. The rectified linear unit function is expressed by Formula 6 below.

$$f(u)=\max(u,0) \qquad \text{(Formula 6)[Math 7]}$$

Formula 6 is a function obtained by setting u=0 to the part u<0 in the linear function with z=u. In the example shown in FIG. 70C, using Formula 6, the output from the node of j=1 is expressed by the formula below.

$$z_1=\max((w_{11}x_1+w_{12}x_2+w_{13}x_3+w_{14}x_4+b_1),0) \qquad \text{[Math 8]}$$

(Neural Network Learning)

If the function expressed by use of a neural network is defined as y(x:w), the function y(x:w) varies when a parameter w of the neural network is varied. Adjusting the function y(x:w) such that the neural network selects a more suitable parameter w with respect to the input x is referred to as neural network learning. It is assumed that a plurality of pairs of an input and an output of the function expressed by use of the neural network have been provided. If a desirable output for an input x is defined as d, the pairs of the input/output are given as {(x1,d1), (x2,d2), . . . , (xn,dn)}. The set of pairs each expressed as (x,d) is referred to as training data.

The neural network learning means adjusting the weight w by use of an error function such that, with respect to any input/output pair (xn,dn), the output y(xn:w) of the neural network when given an input xn becomes as close to the output dn as much as possible.

$$y(x_n:w) \approx d_n \qquad \text{[Math 9]}$$

The error function is a measure for the closeness between the training data and the function expressed by use of the neural network. The error function is also called a loss function. An error function E(w) used in the cell type analysis method according to the embodiment is expressed by Formula 7 below. Formula 7 is called cross entropy.

$$E(w)=-\Sigma_{n=1}^{N}\Sigma_{k=1}^{K}d_{nk}\log y_k(x_n:w) \qquad \text{(Formula 7)[Math 10]}$$

A method for calculating the cross entropy of Formula 7 is described. In the output layer of the neural network used in the cell type analysis method according to the embodiment, i.e., in the last layer of the neural network, an activation function for classifying inputs x into a finite number of classes according to the contents, is used. The activation function is called a softmax function, and expressed by Formula 8 below. It is assumed that, in the output layer 60b, the nodes are arranged by the same number as the number of classes k. It is assumed that the total input u of each node k (k=1, . . . , K) of an output layer L is given as $uk^{(L)}$ from the outputs of the previous layer L−1. Accordingly, the output of the k-th node in the output layer is expressed by Formula 8 below.

[Math 11]

$$y_k \equiv z_k^{(L)} = \frac{\exp(u_k^{(L)})}{\sum_{j=1}^{K}\exp(u_j^{(L)})} \qquad \text{(Formula 8)}$$

Formula 8 is the softmax function. The sum of output y1, . . . , yk determined by Formula 8 is always 1.

When each class is expressed as C1, . . . , Ck, output yk of node k in the output layer L (i.e., $uk^{(L)}$) represents the probability that the given input x belongs to class Ck. The input x is classified into a class in which the probability expressed by Formula 9 below becomes largest.

$$p(C_k|x)=y_k=z_k^{(L)} \qquad \text{(Formula 9)[Math 12]}$$

In the neural network learning, a function expressed by the neural network is considered as a model of the posterior probability of each class, the likelihood of the weight w with respect to the training data is evaluated under such a probability model, and a weight w that maximizes the likelihood is selected.

It is assumed that target output dn by the softmax function of Formula 8 is 1 only if the output is a correct class, and otherwise, target output dn is 0. When the target output is expressed in a vector format dn=[dn1, . . . , dnk], if, for example, the correct class of input xn is C3, only target output dn3 becomes 1, and the other target outputs become 0. When coding is performed in this manner, the posterior distribution is expressed by Formula 10 below.

$$p(d|x)=\Pi_{k=1}^{K}p(C_k|x)^{d_k} \qquad \text{(Formula 10)[Math 13]}$$

Likelihood L(w) of weight w with respect to the training data {(xn,dn)}(n=1, . . . , N) is expressed by Formula 11 below. When the logarithm of likelihood L(w) is taken and the sign is inverted, the error function of Formula 7 is derived.

[Math 14]

$$L(w) = \prod_{n=1}^{N} p(d_n | x_n:w) \qquad \text{(Formula 11)}$$
$$= \prod_{n=1}^{N} \prod_{k=1}^{K} p(C_k | x_n)^{d_{nk}}$$
$$= \prod_{n=1}^{N} \prod_{k=1}^{K} (y_k(x:w))^{d_{nk}}$$

Learning means minimizing the error function E(w) calculated on the basis of the training data, with respect to parameter w of the neural network. In the cell type analysis method according to the embodiment, the error function E(w) is expressed by Formula 7.

Minimizing the error function E(w) with respect to parameter w has the same meaning as finding a local minimum point of the function E(w). Parameter w is a weight of connection between nodes. The local minimum point of weight w is obtained by iterative calculation of repeatedly updating parameter w from an arbitrary initial value used as a starting point. An example of such calculation is the gradient descent method.

In the gradient descent method, a vector expressed by Formula 12 below is used.

[Math 15]

$$\nabla E = \frac{\partial E}{\partial w} = \left[\frac{\partial E}{\partial w_1}, \ldots, \frac{\partial E}{\partial w_M}\right]^T \qquad \text{(Formula 12)}$$

In the gradient descent method, a process of moving the value of the current parameter w in the negative gradient direction (i.e., −∇E) is repeated many times. When the current weight is $w^{(t)}$ and the weight after the moving is $w^{(t+1)}$, the arithmetic operation according to the gradient descent method is expressed by Formula 13 below. Value t means the number of times the parameter w is moved.

$$w^{(t+1)}=w^{(t)}-\epsilon\nabla E \qquad \text{(Formula 13)[Math 16]}$$

The symbol shown in Formula 14 below used in Formula 13 is a constant that determines the magnitude of the update amount of parameter w, and is called a learning coefficient.

$$\epsilon \qquad \text{(Formula 14)[Math 17]}$$

As a result of repetition of the arithmetic operation expressed by Formula 13, error function $E(w^{(t)})$ decreases in association with increase of value t, and parameter w reaches a local minimum point.

It should be noted that the arithmetic operation according to Formula 13 may be performed on all of the training data (n=1, ..., N) or may be performed on only a part of the training data. The gradient descent method performed on only a part of the training data is called a stochastic gradient descent method. In the cell type analysis method according to the embodiment, the stochastic gradient descent method is used.

Figure 71:
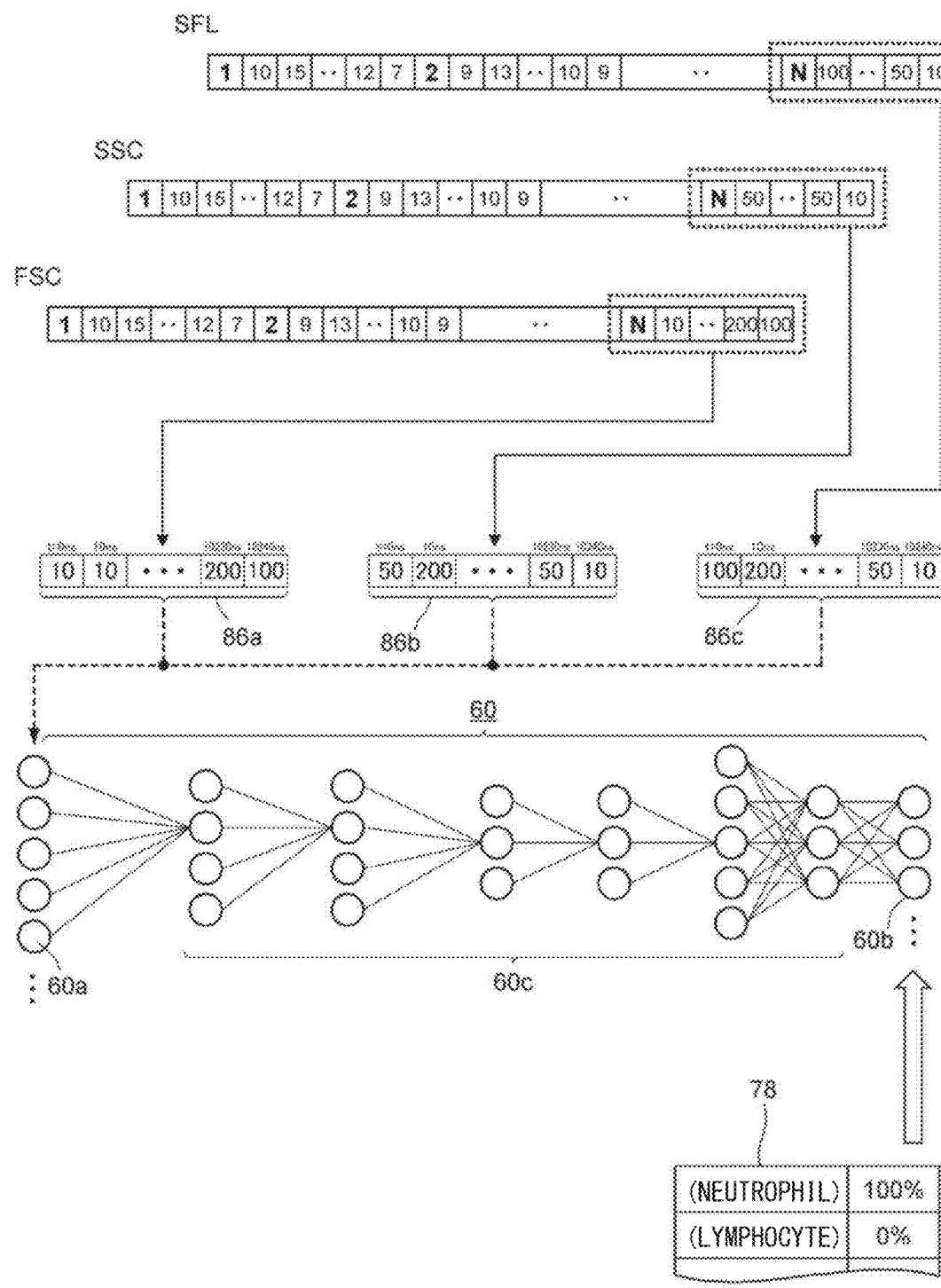
FIG. 71 illustrates training of the neural network.

An outline of training of the deep learning algorithm 60 is described using FIG. 71 as an example. As described above, the deep learning algorithm 60 is implemented as a neural network that includes a multi-layered middle layer. As the training data, waveform data of a cell of which the cell type has been identified in advance is inputted to the input layer 60a of the neural network. As the training data, probability data 78 is inputted to the output layer 60b of the neural network. When the number of cell types to be classified by the deep learning algorithm 60 is nine as shown in FIG. 8, the number of nodes of the output layer 60b is nine, and one of the cell types is assigned to each node. The probability data 78 is a data group in which the probability of the label value of the cell type that has been identified in advance and that corresponds to the waveform data inputted to the input layer 60a is set to 100% and the probabilities of the other cell types are set to 0%. In this manner, the training data is inputted to each of the input layer 60a and the output layer 60b, whereby the neural network is trained.

10. Effects of Embodiment

According to the embodiment described above, as representatively shown in FIG. 20, for example, a result in which each individual cell is classified into a plurality of cell types is displayed. In a conventional cell classification method, a cell that has features of a neutrophil and an immature granulocyte, for example, is alternatively classified into either one of these types. However, in the embodiment described above, with respect to such a cell, the probabilities of belonging to neutrophil and immature granulocyte are obtained by the deep learning algorithm, and the values of the probabilities corresponding to the respective cell types are displayed. Thus, the user can take an action of conducting more detailed analysis such as, for example, performing a retest or a visual inspection for detection of abnormal cells, on a specimen containing a cell that has a probability of being an abnormal cell.

Further, according to the embodiment described above, when the user has confirmed the result as shown in FIG. 20, and then performs a validation operation, output data as representatively shown in FIG. 44 is generated, and transmitted to the host computer. In the output data, at least a part of the generated classification information is removed, and thus, increase in the communication load to the host computer can be avoided.

11. Remarks

The present disclosure includes following items 1-20.

Item 1: An analysis method for analyzing a specimen containing cells, the analysis method comprising: applying light to a measurement sample prepared from the specimen and detecting light generated from cells; obtaining, with respect to each of a plurality of cells contained in the specimen, feature data of the cell on the basis of the detected light; analyzing the feature data with use of an artificial intelligence algorithm, thereby classifying each of the cells into a plurality of cell types; and displaying information based on a result of the classifying.

Item 2: The analysis method of item 1, wherein the classifying includes specifying, on the basis of the feature data, a plurality of cell types to each of which each of the cells has a possibility of morphologically belonging, among a plurality of cell types determined in advance.

Item 3: The analysis method of item 2, wherein the plurality of cell types include at least one normal cell and at least one abnormal cell, and the classifying includes obtaining a probability that each of the cells belongs to the abnormal cell.

Item 4: The analysis method of any one of items 1 to 3, wherein the plurality of cell types include lymphocyte, monocyte, eosinophil, neutrophil, basophil, and abnormal blood cell.

Item 5: The analysis method of item 3 or 4, wherein the abnormal blood cell includes at least one of immature granulocyte, blast, and abnormal lymphocyte.

Item 6: The analysis method of any one of items 1 to 5, further comprising counting cells on the basis of the result of the classifying and displaying a result of the counting of the cells.

Item 7: The analysis method of any one of items 1 to 6, wherein the analyzing of the data includes inputting the feature data of one cell into a deep learning algorithm, and obtaining, as an output from the deep learning algorithm, a result of classifying the cell into a plurality of cell types.

Item 8: The analysis method of item 7, wherein the deep learning algorithm has been trained using, as teaching data, feature data of cells and information regarding types of the cells.

Item 9: The analysis method of any one of items 1 to 8, wherein the detecting includes detecting light generated as a result of a cell passing through a flow cell to which light is applied, and the obtaining of the feature data includes obtaining a waveform signal that changes over time in accordance with the detected light.

Item 10: The analysis method of item 9, wherein the feature data is waveform data generated by sampling the waveform signal at a plurality of time points.

Item 11: The analysis method of any one of items 1 to 10, wherein the analyzing of the data is performed by using a processor and a parallel-processing processor that operates under an order of the processor.

Item 12: The analysis method of any one of items 1 to 11, further comprising: displaying a graph on which a plurality of cells contained in the specimen are plotted on the basis of the feature data; and displaying, in accordance with one or a plurality of cells having been selected on the graph, a result of classifying the selected cell.

Item 13: The analysis method of any one of items 1 to 12, wherein the analyzing of the data includes obtaining a probability that one cell corresponds to each of a plurality of the cell types.

Item 14: The analysis method of item 13, wherein the displaying of the result of the classifying includes displaying the probability.

Item 15: The analysis method of item 14, wherein the displaying of the result of the classifying includes displaying a cell type that has a highest probability.

Item 16: The analysis method of item 15, wherein displaying of information based on the result of the classifying includes displaying statistic information generated on the basis of the probability.

Item 17: The analysis method of any one of items 1 to 16, further comprising: displaying a graph on which a plurality of cells contained in the specimen are plotted on the basis of the feature data; and displaying, in accordance with one or a plurality of cells having been selected on the graph, a result of classifying the selected one or plurality of cells.

Item 18: The analysis method of any one of items 1 to 17, further comprising: displaying a graph on which a plurality of cells contained in the specimen are plotted on the basis of the feature data; and displaying, in accordance with a plurality of cells having been selected on the graph, statistic information based on a result of classifying the selected plurality of cells.

Item 19: The analysis method of any one of items 1 to 18, further comprising: displaying a graph on which a plurality of cells contained in the specimen are plotted on the basis of the feature data; receiving an input of an extraction condition of a cell; extracting a cell that satisfies the extraction condition on the basis of classification information; and displaying, among the cells displayed on the graph, the extracted cell so as to be distinguished from other cells.

Item 20: An analyzer configured to analyze a specimen containing cells, the analyzer comprising: a sample preparation part configured to prepare a measurement sample from the specimen; a detection part configured to apply light to the measurement sample prepared by the sample preparation part, and to detect light generated from cells; a signal processing part configured to obtain, with respect to each of a plurality of cells contained in the specimen, feature data of the cell on the basis of the detected light; a display part; and at least one processor configured to analyze the feature data with use of an artificial intelligence algorithm, thereby classifying each of the cells into a plurality of cell types, the at least one processor being configured to cause the display part to display information based on a result of the classifying.

What is claimed is:

1. An analysis method for a specimen using an analyzer connected to a host computer, the analysis method comprising:
    preparing a measurement sample by mixing the specimen and a reagent in a chamber of the analyzer;
    optically interrogating the measurement sample with an optical detector of the analyzer to obtain feature data of individual cells contained in the measurement sample;
    analyzing the feature data with a deep learning algorithm trained to output a set of values of probabilities in response to an input of the feature data of the individual cell, wherein each of the values corresponds to one cell type of multiple cell types and the value represents a probability that the individual cell belongs to the corresponding cell type;
    generating classification information for the individual cells, wherein the classification information comprises at least following information:
        (i) a primary cell type to which the individual cell belongs with the highest probability,
        (ii) a secondary cell type to which the individual cell belongs with the second highest probability, and
        (iii) the values of probabilities for the primary and secondary cell types;
    generating a measurement result of the specimen on the basis of the primary cell type in the classification information;
    displaying, on a display part of the analyzer, the measurement result and at least a part of the classification information;
    validating the measurement result; and
    transmitting, upon the validation, output data to the host computer, wherein the output data includes the measurement result and the classification information from which the information (ii) or the information (iii) is removed.

2. The analysis method of claim 1, wherein
    the multiple cell types include abnormal cell, and
    the classification information in the output data includes a probability that the individual cell belongs to the abnormal cell.

3. The analysis method of claim 2, wherein
    the abnormal cell is a cell other than a monocyte, a lymphocyte, a neutrophil, an eosinophil, and a basophil.

4. The analysis method of claim 3, wherein
    the abnormal cell includes an abnormal lymphocyte, a blast, and an immature granulocyte.

5. The analysis method of claim 1, wherein
    the measurement result includes a number of cells for each of the multiple cell types, wherein the number of cells is obtained by counting cells on the basis of the primary cell type.

6. The analysis method of claim 1, wherein
    the deep learning algorithm has been trained using, as teaching data, feature data regarding morphology of cells and information regarding types of the cells.

7. The analysis method of claim 1, wherein
    the analyzing of the feature data is performed by using a processor and a parallel-processing processor that operates under an order of the processor.

8. The analysis method of claim 1, wherein
    the feature data is a matrix data digitally representing the morphological feature of the optically interrogated cells.

9. The analysis method of claim 1, wherein
    the optical detector includes:
    (i) a flow cell through which the cells in the measurement sample flows;
    (ii) at least one light source configured to irradiate the cells flowing through the flow cell for optical interrogation; and
    (iii) at least one light detector each configured to sense light from a respective one of optically interrogated cells, the sensed light carrying an analog waveform signal indicative of a morphological feature of the respective one of the optically interrogated cells.

10. The analysis method of claim 9, wherein
    the feature data is a matrix data digitally representing the morphological feature of the optically interrogated cells, the matrix data being obtainable by digitally converting the analog waveform signal at a plurality of time points.

11. The analysis method of claim 9, wherein the analyzer is further configured to sample the analog waveform signal at a predetermined sampling rate to convert the analog waveform signal to obtain the matrix data.

12. An analyzer communicably connected to a host computer, the analyzer comprising:
    a preparator configured to prepare a measurement sample by mixing a specimen and a reagent in a chamber;

an optical detector configured to optically interrogate the measurement sample to obtain feature data of individual cells contained in the measurement sample;
at least one processor programmed to analyze the feature data to generate a measurement result; and
a display configured to display the measurement result, wherein the processor is programmed to:
  analyze the feature data with a deep learning algorithm trained to output a set of values of probabilities in response to an input of the feature data of the individual cell, wherein each of the values corresponds to one cell type of multiple cell types and the value represents a probability that the individual cell belongs to the corresponding cell type;
  generate classification information for the individual cell, wherein the classification information includes at least the following information:
    (i) a primary cell type to which the individual cell belongs with the highest probability;
    (ii) a secondary cell type to which the individual cell belongs with the second highest probability; and
    (iii) the values of probabilities for the primary and secondary cell types;
  generate a measurement result of the specimen on the basis of the primary cell type in the classification information;
  cause the display to display the measurement result and at least a part of the classification information,
  validate the measurement result; and
  transmit, upon receiving the validation, output data to the host computer, wherein the output data includes the measurement result and the classification information from which the information (ii) or the information (iii) is removed.

13. The analyzer of claim 12, wherein
the multiple cell types include abnormal cell, and
the classification information in the output data includes a probability that the individual cell belongs to the abnormal cell.

14. The analyzer of claim 13, wherein
the abnormal cell is a cell other than a monocyte, a lymphocyte, a neutrophil, an eosinophil, and a basophil.

15. The analyzer of claim 14, wherein
the abnormal cell includes an abnormal lymphocyte, a blast, and an immature granulocyte.

16. The analyzer of claim 12, wherein the measurement result includes a number of cells for each of the multiple cell types. wherein the number of cells is obtained by counting cells on the basis of the primary cell type.

17. The analyzer of claim 12, wherein
the deep learning algorithm has been trained using, as teaching data, data regarding morphology of cells and information regarding types of the cells.

18. The analyzer of claim 12, wherein
the at least one processor includes a processor and a parallel-processing processor that operates under an order of the processor.

19. The analyzer of claim 12, wherein
the feature data is a matrix data digitally representing the morphological feature of the optically interrogated cells.

20. The analyzer of claim 12, wherein
the optical detector includes:
  (i) a flow cell through which the cells in the measurement sample flows;
  (ii) at least one light source configured to irradiate the cells flowing through the flow cell for optical interrogation; and
  (iii) at least one light detector each configured to sense light from a respective one of optically interrogated cells, the sensed light carrying an analog waveform signal indicative of a morphological feature of the respective one of the optically interrogated cells.

21. The analyzer of claim 20, wherein
the feature data is a matrix data digitally representing the morphological feature of the optically interrogated cells, the matrix data being obtainable by digitally converting the analog waveform signal at a plurality of time points.

22. The analyzer of claim 20, wherein the analyzer is further configured to sample the analog waveform signal at a predetermined sampling rate to convert the analog waveform signal to obtain the matrix data.

* * * * *